US012578510B2

(12) United States Patent
Hart et al.

(10) Patent No.: US 12,578,510 B2
(45) Date of Patent: *Mar. 17, 2026

(54) ARTICLE HAVING OPTICAL COATING WITH GREATER THICKNESS ON PLANAR PORTION RELATIVE TO CURVED OR FACETED PORTION

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US); Thien An Thi Nguyen, Mountain View, CA (US); Charles Andrew Paulson, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 589 days.

This patent is subject to a terminal disclaimer.

(21) Appl. No.: 17/955,737

(22) Filed: Sep. 29, 2022

(65) Prior Publication Data

US 2023/0034541 A1 Feb. 2, 2023

Related U.S. Application Data

(63) Continuation of application No. 16/831,714, filed on Mar. 26, 2020, now Pat. No. 11,500,130.
(Continued)

(51) Int. Cl.
G02B 1/11 (2015.01)
G02B 1/115 (2015.01)
G02B 1/14 (2015.01)

(52) U.S. Cl.
CPC .................. G02B 1/14 (2015.01); G02B 1/11 (2013.01); G02B 1/115 (2013.01)

(58) Field of Classification Search
CPC ........ G02B 1/10; G02B 1/11–118; G02B 1/14
See application file for complete search history.

(56) References Cited

U.S. PATENT DOCUMENTS 8,312,739 B2 11/2012 Lee et al.
9,079,802 B2 7/2015 Bellman et al.
(Continued)

FOREIGN PATENT DOCUMENTS

WO 2014/124206 A1 8/2014

OTHER PUBLICATIONS

International Search Report and Written Opinion of the International Searching Authority; PCT/US2020/024578; Mailed Nov. 20, 2020; 16 Pages; European Patent Office.
(Continued)

*Primary Examiner* — Ryan S Dunning

(57) ABSTRACT

A coated article is described herein with a substrate having a major surface that comprises a first portion and a second portion that is curved or faceted; and an optical coating on the major surface that forms an anti-reflective surface. A first direction is normal to the first portion and is not equal to a plurality of second directions that are normal to the second portion, and the angle between the first direction and each of the second directions is from about 10 degrees to 60 degrees. Further, the coated article exhibits at the first and second portion a hardness of about 8 GPa or greater at an indentation depth of about 100 nm or greater. Further, the coated article exhibits a single side maximum reflectance of about 3% or less as the first and second portion, wherein the reflectance is measured in a range from about 425 nm to about 950 nm.

10 Claims, 25 Drawing Sheets

Related U.S. Application Data

(60) Provisional application No. 62/853,501, filed on May 28, 2019, provisional application No. 62/824,687, filed on Mar. 27, 2019.

(56) References Cited

U.S. PATENT DOCUMENTS

| | | | |
|---|---|---|---|
| 9,335,444 B2 | 5/2016 | Hart et al. | |
| 9,359,261 B2 | 6/2016 | Bellman et al. | |
| 9,366,784 B2 | 6/2016 | Bellman et al. | |
| 9,411,180 B2 | 8/2016 | Gollier et al. | |
| 9,573,842 B2 | 2/2017 | Gollier et al. | |
| 9,701,579 B2 | 7/2017 | Gollier et al. | |
| 9,703,011 B2 | 7/2017 | Adib et al. | |
| 2003/0103271 A1* | 6/2003 | Ohta | G02B 3/02 359/719 |
| 2014/0113083 A1 | 4/2014 | Lee et al. | |
| 2017/0199307 A1* | 7/2017 | Hart | G02B 1/115 |
| 2018/0011225 A1 | 1/2018 | Bellman et al. | |

OTHER PUBLICATIONS

Invitation to Pay Additional Fees of the International Searching Authority; PCT/US2020/024578; Mailed Sep. 30, 2020; 10 Pages; European Patent Office.

Oliver et al; "An Improved Technique for Determining Hardness and Elastic Modulus Usign Load and Displacement Sensing Indentation Experiments," J. Mater. Res., vol. 7, No. 6, 1992, 1564-1583.

Oliver et al; "Measurement of Hardness and Elastic Modulus By Instrument Indentation: Advances in Understanding and Refinements to Methodology," J. Mater. Res., vol. 19, No. 1, 2004, 3-20.

Corning Inc., "Information Related to Coatings on Commercially Available Tablet Devices—Supplying data related to the Apple ipad Air 2 (released Oct. 2014), Apple ipad Pro 2nd Generation (released Jun. 2017), and Apple ipad Air 4th Generation (released Oct. 2020)" 28 pages. This document has not been published in a book, magazine, journal, etc.

* cited by examiner

ARTICLE HAVING OPTICAL COATING WITH GREATER THICKNESS ON PLANAR PORTION RELATIVE TO CURVED OR FACETED PORTION

CLAIM OF PRIORITY

This application is a continuation application of U.S. patent application Ser. No. 16/831,714, filed Mar. 26, 2020, now U.S. Pat. No. 11,500,130, issued Nov. 15, 2022, which claims the benefit of priority under 35 U.S.C § 119 of U.S. Provisional Application Ser. No. 62/853,501, filed on May 28, 2019, and U.S. Provisional Application Ser. No. 62/824, 687, filed on Mar. 27, 2019 the contents of which are relied upon and incorporated herein by reference in its entirety.

FIELD OF THE DISCLOSURE

This disclosure relates to durable and/or scratch-resistant articles and methods for making the same and, more particularly, to durable and/or scratch-resistant optical coatings on non-planar substrates.

BACKGROUND

Cover articles are often used to protect critical devices within electronic products, to provide a user interface for input and/or display, and/or many other functions. Such products include mobile devices, such as smart phones, mp3 players, and computer tablets. Cover articles also include architectural articles, transportation articles (e.g., articles used in automotive applications, trains, aircraft, sea craft, etc.), appliance articles, or any article that requires some transparency, scratch-resistance, abrasion resistance, or a combination thereof. These applications often demand scratch-resistance and strong optical performance characteristics, in terms of maximum light transmittance and minimum reflectance. Furthermore, some cover applications require that the color exhibited or perceived, in reflection and/or transmission, does not change appreciably as the viewing angle is changed. In display applications, this is because if the color in reflection or transmission changes with viewing angle to an appreciable degree, the user of the product will perceive a change in color or brightness of the display, which can diminish the perceived quality of the display. In other applications, changes in color may negatively impact the aesthetic requirements or other functional requirements.

The optical performance of cover articles can be improved by using various anti-reflective coatings; however, known anti-reflective coatings are susceptible to wear, abrasion and/or scratch damage. Such wear, abrasion and scratch damage can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles. Nitrides and diamond-like coatings may exhibit high hardness values but such materials typically do not exhibit the transmittance needed for such applications.

Some electronics incorporate non-planar cover articles. For example, some smart phone touch screens may be non-planar, where at least a portion of the cover article is curved on its surface. Similarly, some smart watches may be non-planar, where at least a portion of the cover article is curved on its surface. With the incorporation of non-planar articles, optical performance of coatings on cover articles may be altered. For example, a coating will be viewed at two different angles on different portions of a substrate if the substrate includes one or more curved, faceted, or otherwise shaped, non-planar surfaces in addition to a planar surface portion.

Accordingly, there is a need for non-planar cover articles, and methods for their manufacture, which are abrasion resistant, scratch-resistant, and/or have improved optical performance. There is also a need for optical coating configurations with these properties that are suitable for non-planar cover articles and the various line-of-sight processes for forming such coatings.

SUMMARY

According to an aspect of the disclosure, a coated article is provided that includes: a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 60 degrees; and an optical coating disposed on at least the first portion and the second portion of the major surface. The optical coating forms an anti-reflective surface, wherein: (a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; and (b) the coated article exhibits a single side maximum light reflectance of about 3% or less as measured at the anti-reflective surface at the first portion and the second portion of the substrate. The single side maximum light reflectance of the first portion is measured at a first incident illumination angle relative to the first direction, wherein the first incident illumination angle comprises an angle in the range from about 0 degrees to about 45 degrees from the first direction. The single side maximum light reflectance of the second portion is measured at two or more second incident illumination angles, each of the second incident illumination angles relative to a respective second direction of the plurality of second directions, wherein each of the second incident illumination angles comprises an angle in the range from about 0 degrees to about 45 degrees from the respective second direction. Further, the single side maximum light reflectance at the first portion is measured over an optical wavelength regime in a range of from about 425 nm to about 950 nm.

According to an aspect of the disclosure, a coated article is provided that includes: a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 50 degrees; and an optical coating disposed on at least the first portion and the second portion of the major surface. The optical coating forms an anti-reflective surface, wherein: (a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; and (b) the first surface reflected color of the coated article at the first portion and the second portion of the major surface is b*<about 5, as measured by the reflectance color coordinates in the (L*, a*, b*) colorimetry system under an International Commission on Illumination D65 illuminant. The reflected color at the first portion is measured at a first incident illumination angle relative to the first direction, wherein the first incident illumination angle comprises an angle in the range from about 0 degrees to about 90 degrees from the first direction. The reflected color at the second portion is measured at two or more second incident illumination angles, each of the second incident illumination angles relative to a respective second direction of the plurality of second directions, wherein each of the second incident illumination angles comprises an angle in a range from about 0 degrees to about 90 degrees from the respective second direction and the second illumination angles differ from one another by at least 10 degrees.

According to an aspect of the disclosure, a coated article is provided that includes: a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 50 degrees; and an optical coating disposed on at least the first portion and the second portion of the major surface. The optical coating forms an anti-reflective surface, wherein (a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; (b) the coated article exhibits a photopic average light reflectance of about 2% or less as measured at the anti-reflective surface at the first portion and the second portion of the substrate; and (c) the first surface reflected color of the coated article at the first portion and the second portion of the major surface is b*<about 5, as measured by the reflectance color coordinates in the (L*, a*, b*) colorimetry system under an International Commission on Illumination D65 illuminant. The single side maximum light reflectance of the first portion is measured at a first incident illumination angle relative to the first direction, wherein the first incident illumination angle comprises an angle in the range from about 0 degrees to about 45 degrees from the first direction. The single side maximum light reflectance of the second portion is measured at two or more second incident illumination angles, each of the second incident illumination angles relative to a respective second direction of the plurality of second directions, wherein each of the second incident illumination angles comprises an angle in the range from about 0 degrees to about 45 degrees from the respective second direction. Further, the photopic average light reflectance at the first portion and second portion is measured over an optical wavelength regime in a range of from about 425 nm to about 950 nm. In addition, the reflected color at the first portion is measured at a first incident illumination angle relative to the first direction, wherein the first incident illumination angle comprises an angle in the range from about 0 degrees to about 90 degrees from the first direction. Further, the reflected color at the second portion is measured at two or more second incident illumination angles, each of the second incident illumination angles relative to a respective second direction of the plurality of second directions, wherein each of the second incident illumination angles comprises an angle in a range from about 0 degrees to about 90 degrees from the respective second direction and the second illumination angles differ from one another by at least 10 degrees.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
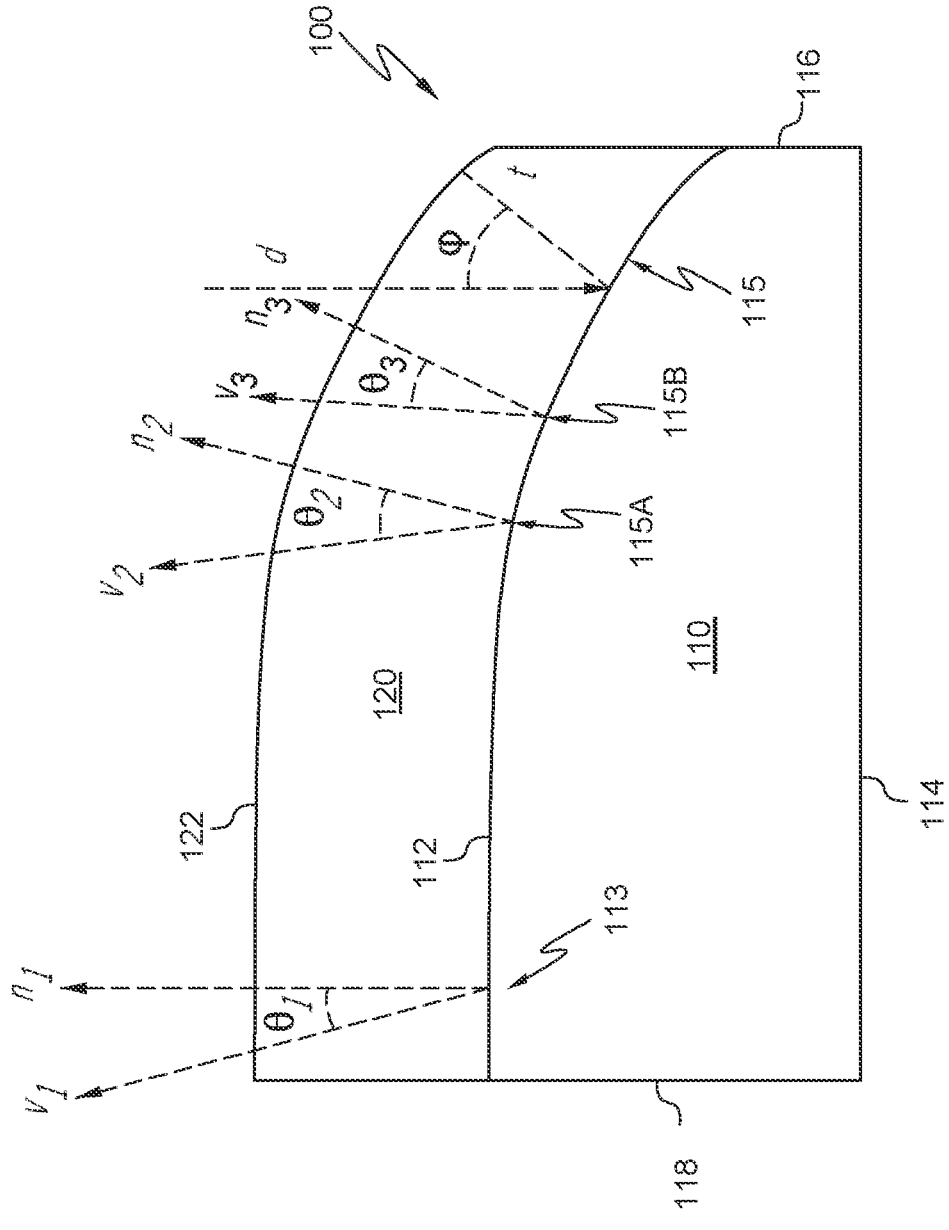
FIG. 1 is a cross-sectional side view of a coated article, according to one or more embodiments described herein.

Reference will now be made in detail to various embodiments of coated articles, examples of which are illustrated in the accompanying drawings. Referring to FIG. 1, a coated article 100, according to one or more embodiments disclosed herein, may include a non-planar substrate 110, and an optical coating 120 disposed on the substrate. The non-planar substrate 110 may include opposing major surfaces 112, 114 and opposing minor surfaces 116, 118. The optical coating 120 is shown in FIG. 1 as being disposed on a first opposing major surface 112; however, the optical coating 120 may be disposed on the second opposing major surface 114 and/or one or both of the opposing minor surfaces, in addition to or instead of being disposed on the first opposing major surface 112. The optical coating 120 forms an anti-reflective surface 122. The anti-reflective surface 122 forms an air-interface and generally defines the edge of the optical coating 120 as well as the edge of the overall coated article 100. The substrate 110 may be substantially transparent, as described herein.

According to the embodiments described herein, the substrate 110 is non-planar. As used herein, non-planar substrates refer to substrates where at least one of the major surfaces 112, 114 of the substrate 110 is not geometrically flat in shape. For example, as shown in FIG. 1, a portion of major surface 112 may comprise a curved geometry. The degree of curvature of a major surface 112 may vary. For example, embodiments may have a curvature measured by an approximate radius of about 1 mm to several meters (i.e., nearly planar), such as from about 3 mm to about 30 mm, or from about 5 mm to about 10 mm. In embodiments, the non-planar substrate may comprise planar portions, as shown in FIG. 1. For example, a touch screen for a portable electronic device may comprise a substantially planar surface at or near its center and curved (i.e., non-planar) portions around its edges. Examples of such substrates include the cover glass from an Apple iPhone 6 smartphone or a Samsung Galaxy S6 Edge smartphone. While some embodiments of non-planar substrates are depicted, it should be understood that non-planar substrates may take on a wide variety of shapes, such as curved sheets, faceted sheets, sheets with angular surfaces, or even tubular sheets.

The non-planar substrate 110 comprises a major surface 112 which comprises at least two portions, a first portion 113 and a second portion 115, which are not flat relative to one another (i.e., the portions 113, 115 are not in the same plane or otherwise parallel to one another). According to some embodiments, the second portion 115 is curved or faceted in shape. A direction $n_1$ is normal to the first portion 113 of major surface 112 and a direction $n_2$ is normal to the second portion 115 at position 115A of major surface 112. Further, a direction $n_3$ is normal to the second portion 115 at position 115B of major surface 112. The direction $n_1$ normal to the first portion 113 and the directions $n_2$ and $n_3$ normal to the second portion 115 at positions 115A and 115B, respectively, are not the same. It should be understood that, depending on the curvature of portion 115, various directions $n_2$ $n_3$, and numerous other directions $n_x$ (where x>2) etc., may be normal to the second portion 115 and differ from the direction $n_1$, i.e., the direction that is normal to the first portion 113. In embodiments, the angle between $n_1$ and $n_2$ (and/or $n_3$) may be at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 70 degrees, at least about 80 degrees, at least about 90 degrees, at least about 120 degrees, at least about 150 degrees, or even at least about 180 degrees (e.g., the angle between $n_1$ and $n_2$ may be 180 degrees for a tubular substrate. For example, the angle between $n_1$ and $n_2$ (and/or $n_3$) may be in a range from about 10 degrees to about 30 degrees, from about 10 degrees to about 45 degrees, from about 10 degrees to about 60 degrees, from about 10 degrees to about 75 degrees, from about 10 degrees to about 90 degrees, from about 10 degrees to about 120 degrees, from about 10 degrees to about 150 degrees, or from about 10 degrees to about 180 degrees. In additional embodiments, the angle between $n_1$ and $n_2$ (and/or $n_3$) may be in a range from about 10 degrees to about 80 degrees, from about 20 degrees to about 80 degrees, from about 30 degrees to about 80 degrees, from about 40 degrees to about 80 degrees, from about 50 degrees to about 80 degrees, from about 60 degrees to about 80 degrees, from about 70 degrees to about 80 degrees, from about 20 degrees to about 180 degrees, from about 30 degrees to about 180 degrees, from about 40 degrees to about 180 degrees, from about 50 degrees to about 180 degrees, from about 60 degrees to about 180 degrees, from about 70 degrees to about 150 degrees, or from about 80 degrees to about 180 degrees.

Light transmitted through or reflected by the coated article 100 may be measured in a viewing direction v (i.e., $v_1$ for $n_1$, $v_2$ for $n_2$ $v_3$ for $n_3$, etc.), as shown in FIG. 1, which may be non-normal to the major surface 112 of the substrate 110. The viewing direction may be referred to as an incident illumination angle as measured from the normal direction at each surface. For example, and as will be explained herein, reflected color, transmitted color, average light reflectance, average light transmission, photopic reflectance, and photopic transmission. The viewing direction v defines an incident illumination angle θ which is the angle between the direction normal to a substrate surface n and the viewing direction v (i.e., $θ_1$ is the incident illumination angle between normal direction $n_1$ and viewing direction $v_1$, $θ_2$ is the incident illumination angle between normal direction $n_2$ and viewing direction $v_2$ and $θ_3$ is the incident illumination angle between normal direction $n_3$ and viewing direction $v_3$, etc.). It should be understood that while FIG. 1 depicts incident illumination angles that are not equal to 0 degrees, in some embodiments, the incident illumination angle may be equal to about 0 degrees such that the v is equal to n. Optical properties of a portion of the coated article 100 may be different when varying the incident illumination angle θ.

Still referring to FIG. 1, in some embodiments, the thickness of the optical coating 120, as measured in the direction normal to the substrate major surface 112, may differ between portions of the optical coating 120 disposed over the first portion 113 and the second portion 115 of the substrate 110. For example, the optical coating 120 may be deposited onto the non-planar substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (PVD) (e.g., reactive or nonreactive sputtering or laser ablation), thermal or e-beam evaporation and/or atomic layer deposition. Liquid-based methods may also be used such as spraying, dipping, spin coating, or slot coating (for example, using sol-gel materials). In some embodiments, a PVD technique can be employed that relies on "metal-mode" reactive sputtering in which a thin metallic layer is deposited in one portion of a deposition chamber, and the film is reacted with gases such as oxygen or nitrogen in a different portion of the deposition chamber. In some embodiments, a PVD technique can be employed that relies on "in-line" reactive sputtering in which a material deposition and reaction occur in the same section of the deposition chamber. Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. These deposition processes, particularly the PVD methods, may have a "line-of-sight" character in which deposited materials move in a uniform direction during deposition onto the substrate regardless of the angle between the deposition direction and the angle normal to the substrate surface.

Referring to FIG. 1, arrow d shows a line-of-sight deposition direction. The deposition direction din FIG. 1 is normal to major surface 114 of the substrate 110, such as may be common in a system where the substrate rests on major surface 114 during deposition of the optical coating 120. The arrow of line d points in the direction of the line-of-sight deposition. Line t shows the direction normal to the major surface 112 of the substrate 110. The normal thickness of the optical coating 120, as measured in the direction normal to the major surface 112 is represented by the length of line t. The deposition angle φ is defined as the angle between the deposition direction d and the direction normal to the major surface 112 (i.e., line t). If the optical coating 120 is deposited with a line-of-sight deposition character, the thickness of a portion of the optical coating 120 has been observed for some vapor deposition processes to generally follow the square root of cosine of φ (see FIG. 9 and corresponding description). Thus, as φ increases, the thickness of the optical coating 120 decreases. While the actual thickness of optical coatings 120 deposited by vapor deposition may be different from that determined by the scalar of the square root of cosine φ, it provides an estimate useful for modeling optical coating designs which may have good performance when applied onto non-planar substrates 110. Additionally, while $n_1$ and d are in the same direction in FIG. 1, they need not be in the same direction in all embodiments. Without being bound by theory, it has also been observed that the physical vapor deposition processes of the disclosure do not always follow a completely line-of-sight character, as complex interactions between the sputtered atoms and molecules can interact with one another during deposition with the sputtering plasma as they travel from the sputtering target to the glass substrate 110. Nevertheless, one can tune the physical vapor deposition processes to achieve a square root of cosine of φ relationship (see FIG. 9 and corresponding description), which can then be advantageously employed in configuring the structure of the optical coating 120 to have desirable optical and mechanical properties at both of the first and second portions 113, 115.

It should be understood that throughout this disclosure, unless specified otherwise, thickness of the optical coating 120 is measured in the normal direction n.

According to embodiments, as described herein, various portions of the coated article 100 (e.g., first portion 113 and second portion 115) may have optical characteristics such as light reflectivity, light transmittance, reflected color, and/or transmitted color, which appear similar to one another. For example, the optical characteristics at the first portion 113 may be similar to those at the second portion 115 when each is viewed in a direction about normal to the substrate 110 at the respective portion 113, 115 (i.e., $\theta_1$ is equal to about 0 degrees and $\theta_2$ is equal to about 0 degrees). In other embodiments, the optical characteristics at the first portion 113 may be similar to those at the second portion 115 when each is viewed at an incident illumination angle in a specified range relative to the normal direction at the respective portion 113, 115 (e.g., $\theta_1$ is from about 0 degrees to about 60 degrees, $\theta_2$ is from about 0 degrees to about 60 degrees, and $\theta_3$ is from about 0 degrees to about 60 degrees). In additional embodiments, the optical characteristics at the first portion 113 may be similar to those at the second portion 115 when each is viewed in about the same direction (e.g., the angle between $v_1$ and $v_2$ is about equal to 0 degrees).

The optical coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

The thickness of the optical coating 120 may be about 1 µm or greater in the direction of deposition while still providing an article that exhibits the optical performance described herein. In some examples, the optical coating thickness in the direction of deposition may be in the range from about 1 µm to about 20 µm, from about 1 µm to about 10 µm, from about 1 µm to about 5 µm, from about 2 µm to about 10 µm, from about 2 µm to about 5 µm, from about 2 µm to about 4 µm, and all thickness values of the optical coating 120 between these thickness values. For example, the thickness of the optical coating 120 can be about 0.2 µm, 0.3 µm, 0.4 µm, 0.5 µm, 0.6 µm, 0.7 µm, 0.8 µm, 0.9 µm, 1 µm, 2 µm, 3 µm, 4 µm, 5 µm, 6 µm, 7 µm, 8 µm, 9 µm, 10 µm, 12 µm, 14 µm, 16 µm, 18 µm, 20 µm, and all thickness values between these thicknesses.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein. Additionally, it should be understood that while FIGS. 2-8 schematically depict planar substrates, FIGS. 2-8 should be considered as having non-planar substrates such as shown in FIG. 1, and are depicted as planar to simplify the conceptual teachings of the respective figures.

Figures 2, 3, 4, 5:
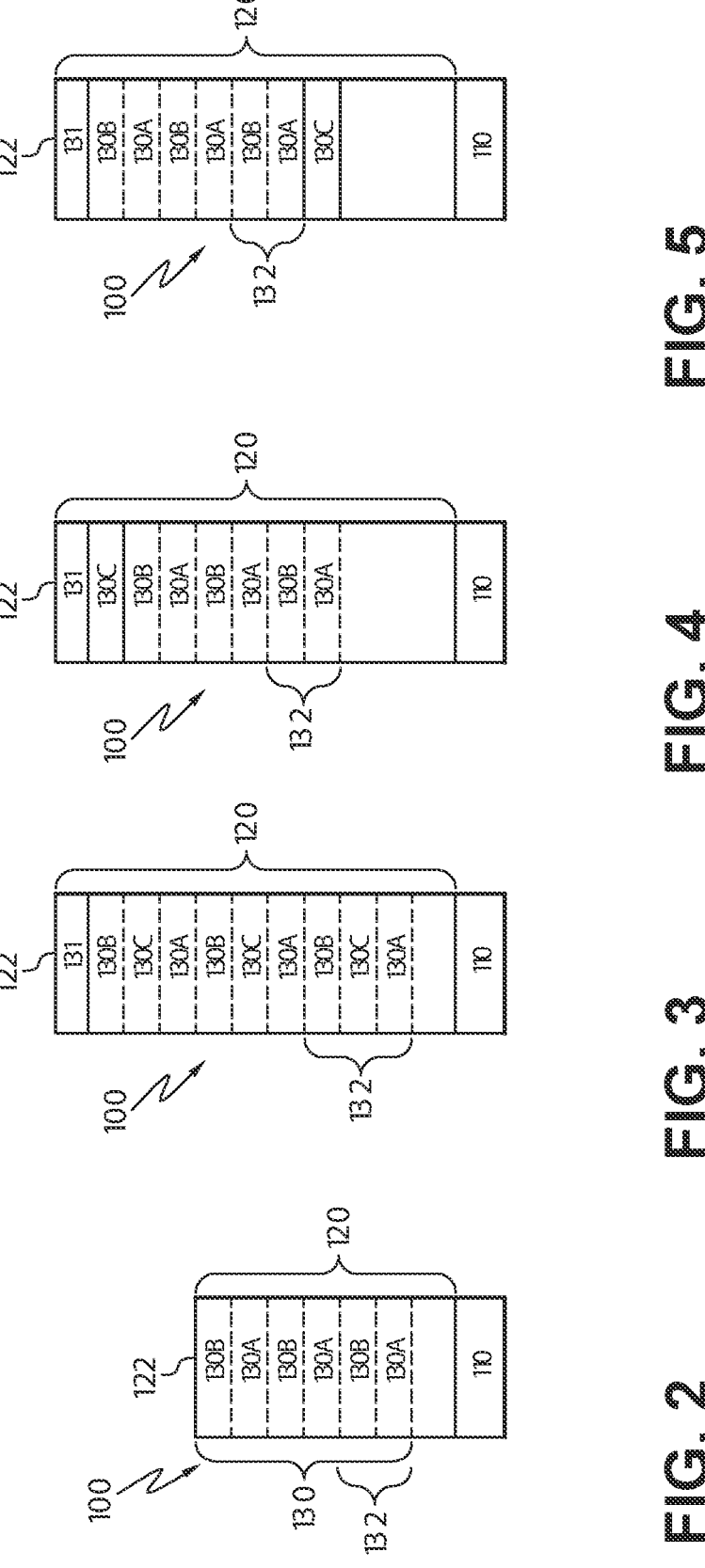
FIG. 2 is a cross-sectional side view of a coated article, according to one or more embodiments described herein.
FIG. 3 is a cross-sectional side view of a coated article, according to one or more embodiments described herein.
FIG. 4 is a cross-sectional side view of a coated article, according to one or more embodiments described herein.
FIG. 5 is a cross-sectional side view of a coated article, according to one or more embodiments described herein.

As shown in FIG. 2, the optical coating 120 may include an anti-reflective coating 130, which may include a plurality of layers (130A, 130B). In one or more embodiments, the anti-reflective coating 130 may include a period 132 comprising two or more layers. In one or more embodiments, the two or more layers may be characterized as having different refractive indices from each another. In one embodiment, the period 132 includes a first low RI layer 130A and a second high RI layer 130B. The difference in the refractive index of the first low RI layer and the second high RI layer may be about 0.01 or greater, about 0.05 or greater, about 0.1 or greater, or even about 0.2 or greater.

As shown in FIG. 2, the anti-reflective coating 130 may include a plurality of periods 132. A single period 132 may include a first low RI layer 130A and a second high RI layer 130B, such that when a plurality of periods 132 are provided, the first low RI layer 130A (designated for illustration as "L") and the second high RI layer 130B (designated for illustration as "H") alternate in the following sequence of layers: L/H/L/H or H/L/H/L, such that the first low RI layer 130A and the second high RI layer 130B appear to alternate along the physical thickness of the optical coating 120. In the example in FIG. 2, the anti-reflective coating 130 includes three (3) periods 132. In some embodiments, the anti-reflective coating 130 may include up to twenty-five (25) periods 132 (also referred herein as "N" periods, in which N is an integer). For example, the anti-reflective coating 130 may include from about 2 to about 20 periods 132, from about 2 to about 15 periods 132, from about 2 to about 12 periods 132, from about 2 to about 10 periods 132, from about 2 to about 12 periods 132, from about 3 to about 8 periods 132, from about 3 to about 6 periods 132, or any other period 132 within these ranges. For example, the anti-reflective coating 130 may include 1, 2, 3, 4, 5, 6, 7, 8, 9, 10, 11, 12, 13, 14, 15, 16, 17, 18, 19, 20, 21, 22, 23, 24 or 25 period(s) 132.

In the embodiment shown in FIG. 3, the anti-reflective coating 130 may include an additional capping layer 131, which may include a lower refractive index material than the second high RI layer 130B. In some embodiments, the period 132 may include one or more third layers 130C, as shown in FIG. 3. The third layer(s) 130C may have a low RI, a high RI or a medium RI. In some embodiments, the third layer(s) 130C may have the same RI as the first low RI layer 130A or the second high RI layer 130B. In other embodiments, the third layer(s) 130C may have a medium RI that is between the RI of the first low RI layer 130A and the RI of the second high RI layer 130B. Alternatively, the third layer(s) 130C may have a refractive index greater than the second high RI layer 130B. The third layer 130C may be provided in the optical coating 120 in the following exemplary configurations: $L_{third\ layer}$/H/L/H/L; $H_{third\ layer}$/L/H/L/ H; L/H/L/H/$L_{third\ layer}$; H/L/H/L/H/$H_{third\ layer}$; $L_{third\ layer}$/H/L/ H/L/$H_{third\ layer}$; $H_{third\ layer}$/L/H/L/H/$L_{third\ layer}$; $L_{third\ layer}$/L/ H/L/H; $H_{third\ layer}$/H/L/H/L; H/L/H/L/$L_{third\ layer}$; L/H/L/H/ $H_{third\ layer}$; $L_{third}$ layer/L/H/L/H/H$_{third\ layer}$; $H_{third\ layer}$/H/L/ H/L/$L_{third\ layer}$; L/Mthird layer/H/L/M/H; H/M/L/H/M/L; M/L/H/L/M; as well as other combinations. In these configurations, "L" without any subscript refers to the first low RI layer and "H" without any subscript refers to the second high RI layer. Reference to "$L_{third\ sub-layer}$" refers to a third layer having a low RI, "$H_{third\ sub-layer}$" refers to a third layer having a high RI and "M" refers to a third layer having a medium RI, all relative to the first layer and the second layer.

As used herein, the terms "low RI", "high RI" and "medium RI" refer to the relative values for the RI to another (e.g., low RI<medium RI<high RI). In one or more embodiments, the term "low RI" when used with the first low RI layer or with the third layer, includes a range from about 1.3 to about 1.7 or 1.75. In one or more embodiments, the term "high RI" when used with the second high RI layer or with the third layer, includes a range from about 1.7 to about 2.6 (e.g., about 1.85 or greater). In some embodiments, the term "medium RI" when used with the third layer, includes a range from about 1.55 to about 1.8. In some instances, the ranges for low RI, high RI, and medium RI may overlap; however, in most instances, the layers of the anti-reflective coating 130 have the general relationship regarding RI of: low RI<medium RI<high RI.

Figures 6, 7, 8:
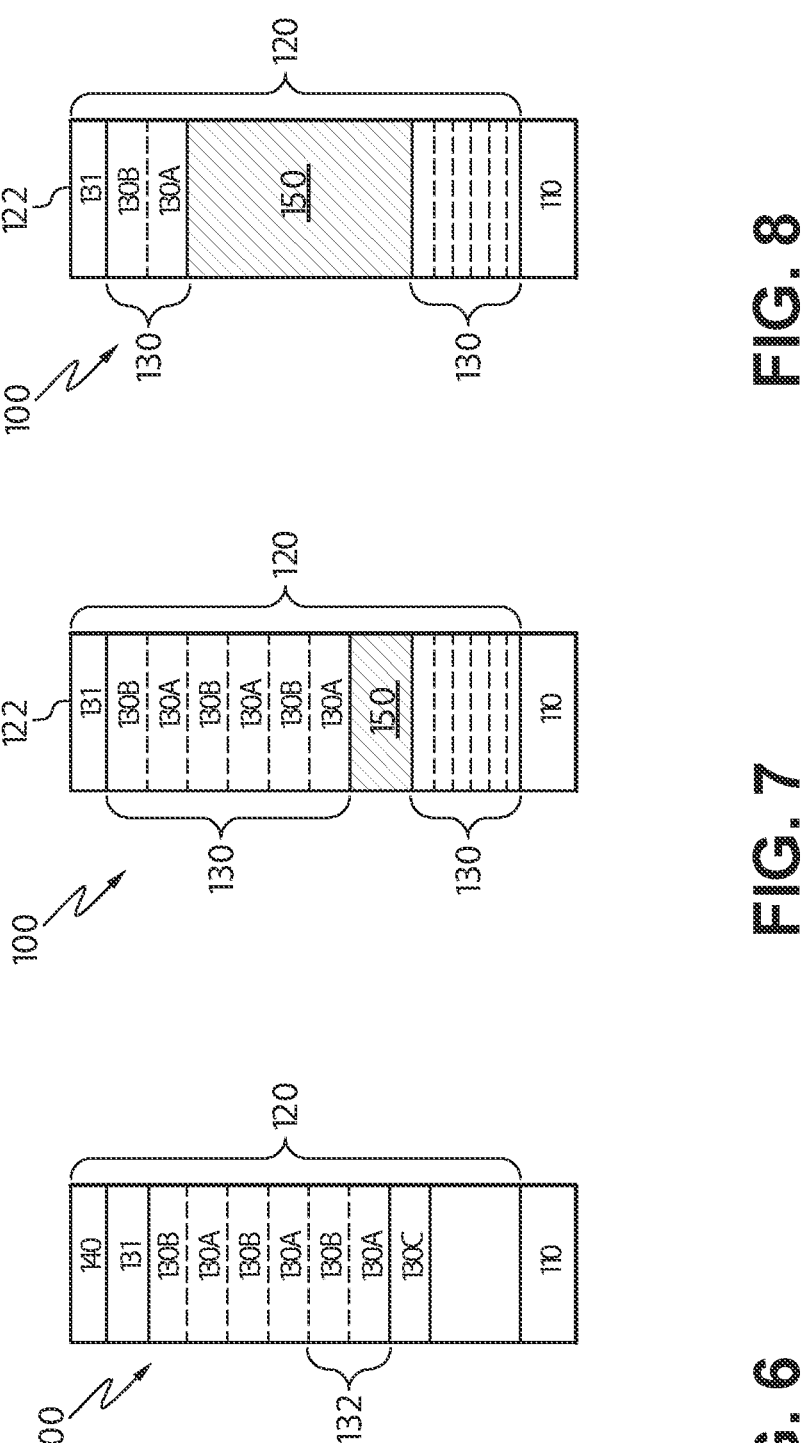
FIG. 6 is a cross-sectional side view of a coated article, according to one or more embodiments described herein.
FIG. 7 is a cross-sectional side view of a coated article, according to one or more embodiments described herein.
FIG. 8 is a cross-sectional side view of a coated article, according to one or more embodiments described herein.

The third layer(s) 130C may be provided as a separate layer from a period 132 and may be disposed between period 132 or plurality of periods 132 and the capping layer 131, as shown in FIG. 4. The third layer(s) may also be provided as a separate layer from a period 132 and may be disposed between the substrate 110 and the plurality of periods 132, as shown in FIG. 5. The third layer(s) 130C may be used in addition to an additional coating 140 instead of the capping layer 131 or in addition to the capping layer 131, as shown in FIG. 6. In some implementations, a third layer(s) 130C (not shown) is disposed adjacent to the scratch-resistant layer 150 or the substrate 110 in the configurations depicted in FIGS. 7 and 8.

Materials suitable for use in the anti-reflective coating 130 include: $SiO_2$, $Al_2O_3$, $GeO_2$, SiO, AlOxNy, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI layer include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$). Some examples of suitable materials for use in the second high RI layer include $Si_uAl_vO_xN_y$, $Ta_2O_5$, $Nb_2O_5$, AlN, $Si_3N_4$, $AlO_xN_y$, $SiO_xN_y$, $SiN_x$, $SiN_x{:}H_y$, $HfO_2$, $TiO_2$, $ZrO_2$, $Y_2O_3$, $Al_2O_3$, $MoO_3$ and diamond-like carbon. In examples, the high RI layer may also be a high hardness layer or a scratch-resistant layer, and the high RI materials listed above may also comprise high hardness or scratch resistance. The oxygen content of the materials for the second high RI layer and/or the scratch-resistant layer may be minimized, especially in $SiN_x$ or $AlN_x$ materials. $AlO_xN_y$ materials may be considered to be oxygen-doped $AlN_x$, that is they may have an $AlN_x$ crystal structure (e.g. wurtzite) and need not have an AlON crystal structure. Exemplary $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary $Si_uAl_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. In some implementations, the $Si_uAl_vO_xN_y$ high RI materials comprise from 45 atom % to 50 atom % silicon, 45 atom % to 50 atom % nitrogen, and 3 atom % to 10 atom % oxygen. In further implementations, the $Si_uAl_vO_xN_y$ high RI materials comprise from 45 atom % to 50 atom % silicon, 35 atom % to 50 atom % nitrogen, and 3 atom % to 20 atom % oxygen. Where a material having a medium refractive index is desired, some embodiments may utilize MN and/or $SiO_xN_y$. The hardness of the second high RI layer and/or the scratch-resistant layer may be characterized specifically. In some embodiments, the maximum hardness of the second high RI layer 130B and/or a scratch-resistant layer 150 (see FIGS. 7 and 8, and their corresponding description below), as measured by the Berkovich Indenter Hardness Test at an indentation depth of about 100 nm or greater, may be about 8 GPa or greater, about 10 GPa or greater, about 12 GPa or greater, about 15 GPa or greater, about 18 GPa or greater, or about 20 GPa or greater. In some cases, the second high RI layer 130B material may be deposited as a single layer and may be characterized as a scratch-resistant layer (e.g., scratch-resistant layer 150 depicted in FIGS. 7 and 8, and further described below), and this single layer may have a thickness between about 200 nm and 5000 nm for repeatable hardness determination. In other embodiments in which the second high RI layer 130B is deposited as a single layer in the form of a scratch-resistant layer (e.g., scratch resistant layer 150 as depicted in FIGS. 7 and 8), this layer may have a thickness from about 200 nm to about 5000 nm, from about 200 nm to about 3000 nm, from about 500 nm to about 5000 nm, from about 1000 nm to about 4000 nm, from about 1500 nm to about 4000 nm, from about 1500 nm to about 3000 nm, and all thickness values between these thicknesses.

In one or more embodiments, at least one of the layer(s) of the anti-reflective coating 130 may include a specific optical thickness range. As used herein, the term "optical thickness" is determined by the sum of the physical thickness and the refractive index of a layer. In one or more embodiments, at least one of the layers of the anti-reflective coating 130 may include an optical thickness in the range from about 2 nm to about 200 nm, from about 10 nm to about 100 nm, from about 15 nm to about 100 nm, from about 15 to about 500 nm, or from about 15 to about 5000 nm. In some embodiments, all of the layers in the anti-reflective coating 130 may each have an optical thickness in the range from about 2 nm to about 200 nm, from about 10 nm to about 100 nm, from about 15 nm to about 100 nm, from about 15 nm to about 500 nm, or from about 15 to about 5000 nm. In some cases, at least one layer of the anti-reflective coating 130 has an optical thickness of about 50 nm or greater. In some cases, each of the first low RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In other cases, each of the second high RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In yet other cases, each of the third layers have an optical thickness in the range from about 2 nm to about 200 nm, from about 10 nm to about 100 nm, from about 15 nm to about 100 nm, from about 15 nm to about 500 nm, or from about 15 nm to about 5000 nm.

In some embodiments, the top-most air-side layer may comprise a high RI layer 130B (see FIG. 2) that also exhibits high hardness. In some embodiments, an additional coating 140 (see FIG. 6 and its corresponding description below) may be disposed on top of this top-most air-side high RI layer (e.g., the additional coating may include a low-friction coating, an oleophobic coating, or an easy-to-clean coating). The addition of a low RI layer having a very low thickness (e.g., about 10 nm or less, about 5 nm or less, or about 2 nm or less) has minimal influence on the optical performance when added to the top-most air-side layer comprising a high RI layer. The low RI layer having a very low thickness may include $SiO_2$, an oleophobic or low-friction layer, or a combination of $SiO_2$ and an oleophobic material. Exemplary low-friction layers may include diamond-like carbon, such materials (or one or more layers of the optical coating) may exhibit a coefficient of friction less than 0.4, less than 0.3, less than 0.2, or even less than 0.1.

In one or more embodiments, the anti-reflective coating 130 may have a physical thickness of about 800 nm or less. The anti-reflective coating 130 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 300 nm to about 800 nm, from about 400 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 nm to about 300 nm, and all ranges and sub-ranges therebetween. In some embodiments, the anti-reflective coating 130 may have a physical thickness in the range from about 250 nm to about 1000 nm, from about 500 nm to about 1000 nm, and all ranges and sub-ranges therebetween. For example, the anti-reflective coating 130 may have a physical thickness of about 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, and all thicknesses between these thickness values.

In one or more embodiments, the combined physical thickness of the second high RI layer(s) may be characterized. For example, in some embodiments, the combined thickness of the second high RI layer(s) may be about 100 nm or greater, about 150 nm or greater, about 200 nm or greater, about 250 nm or greater, about 300 nm or greater, about 350 nm or greater, about 400 nm or greater, about 450 nm or greater, about 500 nm or greater, about 550 nm or greater, about 600 nm or greater, about 650 nm or greater, about 700 nm or greater, about 750 nm or greater, about 800 nm or greater, about 850 nm or greater, about 900 nm or greater, about 950 nm or greater, or even about 1000 nm or greater. The combined thickness is the calculated combination of the thicknesses of the individual high RI layer(s) in the anti-reflective coating 130, even when there are intervening low RI layer(s) or other layer(s). In some embodiments, the combined physical thickness of the second high RI layer(s), which may also comprise a high-hardness material (e.g., a nitride or an oxynitride material), may be greater than 30% of the total physical thickness of the anti-reflective coating. For example, the combined physical thickness of the second high RI layer(s) may be about 40% or greater, about 50% or greater, about 60% or greater, about 70% or greater, about 75% or greater, or even about 80% or greater, of the total physical thickness of the anti-reflective coating 130 or the total physical thickness of the optical coating 120. Additionally or alternatively, the amount of the high refractive index material (which may also be a high-hardness material) included in the optical coating may be characterized as a percentage of the physical thickness of the upper most (i.e., user side or side of the optical coating opposite the substrate) 500 nm of the article or optical coating 120. Expressed as a percentage of the upper most 500 nm of the article or optical coating, the combined physical thickness of the second high RI layer(s) (or the thickness of the high refractive index material) may be about 50% or greater, about 60% or greater, about 70% or greater, about 80% or greater, or even about 90% or greater. In some embodiments, greater proportions of hard and high-index material within the anti-reflective coating can also simultaneously be made to also exhibit low reflectance, low color, and high abrasion resistance as further described elsewhere herein. In one or more embodiments, the second high RI layers may include a material having a refractive index greater than about 1.85 and the first low RI layers may include a material having a refractive index less than about 1.75. In some embodiments, the second high RI layers may include a nitride or an oxynitride material. In some instances, the combined thickness of all the first low RI layers in the optical coating (or in the layers that are disposed on the thickest second high RI layer of the optical coating) may be about 200 nm or less (e.g., about 150 nm or less, about 100 nm or less, about 75 nm or less, or about 50 nm or less).

The coated article 100 may include one or more additional coatings 140 disposed on the anti-reflective coating, as shown in FIG. 6. In one or more embodiments, the additional coating may include an easy-to-clean coating. An example of a suitable easy-to-clean coating is described in U.S. patent application Ser. No. 13/690,904, entitled "Process for Making of Glass Articles with Optical and Easy-to-Clean Coatings," filed on Nov. 30, 2012, and published as U.S. Patent Application Publication No. 2014/0113083 on Apr. 24, 2014, the salient portions of each are incorporated by reference herein in their entirety. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g. fluorosilanes), phosphonates, alkenes, and alkynes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch-resistant layer or layers. In some embodiments, the additional coating 140 includes a combination of easy-to-clean material and scratch-resistant material. In one example, the combination includes an easy-to-clean material and diamond-like carbon. Such additional coatings 140 may have a thickness in the range from about 5 nm to about 20 nm. The constituents of the additional coating 140 may be provided in separate layers. For example, the diamond-like carbon may be disposed as a first layer and the easy-to clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C:H, and/or a-C—H.

As mentioned herein, the optical coating 120 may include a scratch-resistant layer 150, which may be disposed between the anti-reflective coating 130 and the substrate 110. In some embodiments, the scratch-resistant layer 150 is disposed between the layers of the anti-reflective coating 130 (such as the scratch-resistant layer 150 as shown in FIGS. 7 and 8). The two sections of the anti-reflective coating 130 (i.e., a first section disposed between the scratch-resistant layer 150 and the substrate 110, and a second section disposed on the scratch-resistant layer) may have a different thickness from one another or may have essentially the same thickness as one another. The layers of the two sections of the anti-reflective coating 130 may be the same in composition, order, thickness and/or arrangement as one another or may differ from one another. In addition, the layers of the two sections of the anti-reflective coating 130 may comprise the same number of periods 132 (N) or the number of periods 132 in each of these sections may differ from one another (see periods 132 shown in FIGS. 2-6 and described earlier). In addition, one or more optional layers 130C (not shown) can be disposed in either or both of the two sections (e.g., directly on the substrate 110, at the top of the first anti-reflective coating 130 section in contact with the scratch-resistant layer 150, at the bottom of the second anti-reflective coating 130 section in contact with the scratch-resistant layer 150, and/or at the bottom of the second anti-reflective coating in contact with the substrate 110).

Exemplary materials used in the scratch-resistant layer 150 (or the scratch-resistant layer used as an additional coating 140) may include an inorganic carbide, nitride, oxide, diamond-like material, or combination of these. Examples of suitable materials for the scratch-resistant layer 150 include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layer 150 or coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. The scratch-resistant layer 150 may also comprise nanocomposite materials, or materials with a controlled microstructure to improve hardness, toughness, or abrasion/wear resistance. For example, the scratch-resistant layer 150 may comprise nanocrystallites in the size range from about 5 nm to about 30 nm. In embodiments, the scratch-resistant layer 150 may comprise transformation-toughened zirconia, partially stabilized zirconia, or zirconia-toughened alumina. In embodiments, the scratch-resistant layer 150 exhibits a fracture toughness value greater than about 1 MPa √m and simultaneously exhibits a hardness value greater than about 8 GPa.

The scratch-resistant layer 150 may include a single layer (as shown in FIGS. 7 and 8), or multiple sub-layers or single layers that exhibit a refractive index gradient. Where multiple layers are used, such layers form a scratch-resistant coating. For example, a scratch-resistant layer 150 may include a compositional gradient of $Si_uAl_vO_xN_y$ where the concentration of any one or more of Si, Al, O and N are varied to increase or decrease the refractive index. The refractive index gradient may also be formed using porosity. Such gradients are more fully described in U.S. patent application Ser. No. 14/262,224, entitled "Scratch-Resistant Articles with a Gradient Layer", filed on Apr. 28, 2014, and now issued as U.S. Pat. No. 9,703,011 on Jul. 11, 2017, the salient portions of each are hereby incorporated by reference in their entirety.

The scratch-resistant layer 150 may have a thickness from about 200 nm to about 5000 nm, according to some embodiments. In some implementations, the scratch-resistant layer 150 has a thickness from about 200 nm to about 5000 nm, from about 200 nm to about 3000 nm, from about 500 nm to about 5000 nm, from about 500 nm to 3000 nm, from about 500 nm to about 2500 nm, from about 1000 nm to about 4000 nm, from about 1500 nm to about 4000 nm, from about 1500 nm to about 3000 nm, and all thickness values between these thicknesses. For example, the thickness of the scratch-resistant layer 150 can be 200 nm, 300 nm, 400 nm, 500 nm, 600 nm, 700 nm, 800 nm, 900 nm, 1000 nm, 1100 nm, 1200 nm, 1300 nm, 1400 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm, 3000 nm, 3500 nm, 4000 nm, 4500 nm, 5000 nm, and all thickness sub-ranges and thickness values between the foregoing thicknesses.

In one embodiment, depicted in FIG. 8, the optical coating 120 may comprise a scratch-resistant layer 150 that is integrated as a high RI layer, and one or more low RI layers 130A and high RI layers 130B may be positioned over the scratch-resistant layer 150, with an optional capping layer 131 positioned over the low RI layers 130A and high RI layers 130B, where the capping layer 131 comprises a low RI material. The scratch-resistant layer 150 may be alternately defined as the thickest hard layer or the thickest high RI layer in the overall optical coating 120 or in the overall coated article 100. Without being bound by theory, it is believed that the coated article 100 may exhibit increased hardness at indentation depths when a relatively thin amount of material is deposited over the scratch-resistant layer 150. However, the inclusion of low RI and high RI layers over the scratch-resistant layer 150 may enhance the optical properties of the coated article 100. In some embodiments, relatively few layers (e.g., only 1, 2, 3, 4, or 5 layers) may positioned over the scratch-resistant layer 150 and these layers may each be relatively thin (e.g., less than 100 nm, less than 75 nm, less than 50 nm, or even less than 25 nm). In other embodiments, a larger quantity of layers (e.g., 3 to 15 layers) may be positioned over the scratch-resistant layer 150 and each of these layers may also be relatively thin (e.g., less than 200 nm, less than 175 nm, less than 150 nm, less than 125 nm, less than 100 nm, less than 75 nm, less than 50 nm, and even less than 25 nm). In one implementation of the embodiment depicted in FIG. 8, the anti-reflective coating 130 may include a period 132 comprising four periods 132 above the scratch-resistant layer 150, four periods 132 below the scratch-resistant layer (i.e., N=8), a layer 130C disposed adjacent to the scratch-resistant layer 150 or substrate 110 (not shown), and a capping layer 131 (as shown in FIG. 8). In another implementation of the embodiment depicted in FIG. 8, the anti-reflective coating 130 may include a period 132 comprising five periods 132 above the scratch-resistant layer 150, five periods 132 below the scratch-resistant layer (i.e., N=8), a layer 130C disposed adjacent to the scratch-resistant layer 150 or substrate 110 (not shown), and a capping layer 131 (as shown in FIG. 8).

In embodiments, the layers deposited over the scratch-resistant layer 150 (i.e., on the air side of the scratch-resistant layer 150) may have a total thickness (i.e., in combination) of less than or equal to about 1000 nm, less than or equal to about 500 nm, less than or equal to about 450 nm, less than or equal to about 400 nm, less than or equal to about 350 nm, less than or equal to about 300 nm, less than or equal to about 250 nm, less than or equal to about 225 nm, less than or equal to about 200 nm, less than or equal to about 175 nm, less than or equal to about 150 nm, less than or equal to about 125 nm, less than or equal to about 100 nm, less than or equal to about 90 nm, less than or equal to about 80 nm, less than or equal to about 70 nm, less than or equal to about 60 nm, or even less than or equal to about 50 nm.

In embodiments (e.g., the coated article 100 depicted in FIGS. 7 and 8), the total thickness of low RI layer(s) (the sum of thickness of all low RI layers 130A, even if they are not in contact) that are positioned over the scratch-resistant layer 150 (i.e., on the air side of the scratch-resistant layer 150) may be less than or equal to about 500 nm, less than or equal to about 450 nm, less than or equal to about 400 nm, less than or equal to about 350 nm, less than or equal to about 300 nm, less than or equal to about 250 nm, less than or equal to about 225 nm, less than or equal to about 200 nm, less than or equal to about 175 nm, less than or equal to about 150 nm, less than or equal to about 125 nm, less than or equal to about 100 nm, less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, less than or equal to about 20 nm, or even less than or equal to about 10 nm.

The optical coating 120 and/or the coated article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the coated article 100 (see FIGS. 1-8) or the surface of any one or more of the layers in the optical coating 120 with the diamond Berkovich indenter to form an indent to an indentation depth in the range from about 50 nm to about 1000 nm (or the entire thickness of the optical coating 120 or layer thereof, whichever is less) and measuring the maximum hardness from this indentation along the entire indentation depth range ora segment of this indentation depth (e.g., in the range from about 100 nm to about 600 nm, e.g., at an indentation depth of 100 nm or greater, etc.), generally using the methods set forth in Oliver, W. C.; Pharr, G. M., "An improved technique for determining hardness and elastic modulus using load and displacement sensing indentation experiments," *J. Mater. Res.*, Vol. 7, No. 6, 1992, 1564-1583; and Oliver, W. C.; Pharr, G. M., "Measurement of Hardness and Elastic Modulus by Instrument Indentation: Advances in Understanding and Refinements to Methodology," *J. Mater. Res.*, Vol. 19, No. 1, 2004, 3-20, the salient portions of which are incorporated by reference within this disclosure in their entirety. As used herein, "hardness" refers to a maximum hardness, and not an average hardness.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical coating 120 thickness or the layer thickness.

In some embodiments, the coated article 100 (e.g., as depicted in FIGS. 1-8) may exhibit a hardness of about 8 GPa or greater, about 10 GPa or greater, or about 12 GPa or greater (e.g., about 14 GPa or greater, about 16 GPa or greater, about 18 GPa or greater, or about 20 GPa or greater) when measured at the anti-reflective surface 122. The hardness of the coated article 100 may even be up to about 20 GPa or 30 GPa. Such measured hardness values may be exhibited by the optical coating 120 and/or the coated article 100 along an indentation depth of about 50 nm or greater, or about 100 nm or greater (e.g., from about 50 nm to about 300 nm, from about 50 nm to about 400 nm, from about 50 nm to about 500 nm, from about 50 nm to about 600 nm, from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the coated article 100 exhibits a hardness that is greater than the hardness of the substrate 110 (which can be measured on the opposite surface from the anti-reflective surface).

According to embodiments, the hardness may be measured at different portions of the coated article 100. For example, the coated article may exhibit a hardness of at least 8 GPa or greater at an indentation depth of at least about 100 nm or greater at the anti-reflective surface 122 at the first portion 113 and at the second portion 115. For example, the hardness at the first portion 113 and at second portion 115 may be about 8 GPa or greater, about 10 GPa or greater, or about 12 GPa or greater (e.g., about 14 GPa or greater, about 16 GPa or greater, about 18 GPa or greater, or about 20 GPa or greater).

According to embodiments, the coated articles described herein may have desirable optical properties (such as low reflectance and neutral color) at various portions of the coated article 100, such as the first portion 113 and the second portion 115. For example, light reflectance may be relatively low (and transmittance may be relatively high) at the first portion 113 and at the second portion 115 when each is viewed at an incident illumination angle near normal to the respective portions. In another embodiment, when each portion is viewed at a near normal incident illumination angle, the difference in color between the two portions may be insignificant to the naked eye. In another embodiment, when the portions are viewed at incident illumination angles that have the same direction, the color may be insignificant to the naked eye and there may be relatively low reflectance at each portion (i.e., the incident illumination angles relative to the surfaces of each portion are different because the portions are at an angle to one another, but the illumination direction is the same). Optical properties may include average light transmittance, average light reflectance, photopic reflectance, maxium photopic reflectance, photopic transmittance, reflected color (i.e., in L*a*b* color coordinates), and transmitted color (i.e., in L*a*b* color coordinates).

As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Reflectance may be measured as a single side reflectance (also referred herein as "first surface reflectance") when measured at the anti-reflective surface 122 only (e.g., when removing the reflections from an uncoated back surface (e.g., 114 in FIG. 1) of the article, such as through using index-matching oils on the back surface coupled to an absorber, or other known methods). In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmission may also play a factor in color shift in reflection and vice versa. Factors in angular color shifts in transmission and/or reflection may also include angular color shifts due to viewing angle or angular color shifts away from a certain white point that may be caused by material absorption (somewhat independent of angle) defined by a particular illuminant or test system.

The average light reflectance and average light transmittance may be measured over a wavelength regime of from about 400 nm to about 800 nm, from about 400 nm to about 1000 nm, or any wavelength regime or sub-regime between these wavelength range endpoints. In additional embodiments, the optical wavelength regime may comprise wavelength ranges such as from about 450 nm to about 650 nm, from about 420 nm to about 680 nm, from about 420 nm to about 700 nm, from about 420 nm to about 740 nm, from about 420 nm to about 850 nm, from about 420 nm to about 950 nm, or from about 425 nm to about 950 nm.

The coated article 100 may also be characterized by its photopic transmittance and reflectance at various portions. As used herein, photopic reflectance mimics the response of the human eye by weighting the reflectance versus wavelength spectrum according to the human eye's sensitivity. Photopic reflectance may also be defined as the luminance, or tristimulus Y value of reflected light, according to known conventions such as CIE color space conventions. The average photopic reflectance is defined in the below equation as the spectral reflectance, $R(\lambda)$ multiplied by the illuminant spectrum, $I(\lambda)$ and the CIE's color matching function $\bar{y}(\lambda)$, related to the eye's spectral response:

$$\langle R_p \rangle = \int_{380nm}^{720nm} R(\lambda) \times I(\lambda) \times \bar{y}(\lambda) d\lambda$$

The average photopic transmittance is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$\langle T_p \rangle = \int_{380nm}^{720nm} T(\lambda) \times I(\lambda) \times \bar{y}(\lambda) d\lambda$$

It should also be understood that the photopic transmittance and/or reflectance can be reported as the maximum photopic transmittance and/or reflectance within a given spectral range (e.g., from 425 nm to 950 nm).

According to one embodiment, the coated article 100 may exhibit a single side average, photopic average, or maximum light reflectance as measured at the anti-reflective surface 122 at the first portion 113 of the substrate 110 of about 8% or less, about 7% or less, about 6% or less, about 5% or less, about 4% or less, about 3% or less, about 2% or less, about 1.5% or less, about 1.2% or less, or about 1% or less, wherein the single side average light reflectance of the first portion 113 is measured at a first incident illumination angle $\theta_1$ relative to $n_1$, and wherein the first incident illumination angle $\theta_1$ comprises an angle in the range from about 0 degrees to about 60 degrees from the $n_1$. In additional embodiments, the first incident illumination angle $\theta_1$ may comprise angles in the range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$. In additional embodiments, the coated article 100 may exhibit a single side average light reflectance as measured at the anti-reflective surface 122 at the first portion 113 of the substrate 110 of about 8% or less, about 7% or less, about 6% or less, about 5% or less, about 4% or less, about 3% or less, about 2% or less, about 1.5% or less, about 1.2% or less, or about 1% or less, for all incident illumination angles $\theta_1$ in a range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$. In additional embodiments, given any of the described ranges of incident illumination angles $\theta_1$, the single side average or maximum light reflectance as measured at the anti-reflective surface 122 at the first portion 113 of the substrate 110 may be about 10% or less, about 9% or less, about 8% or less, about 7% or less, about 6% or less, about 5% or less, about 4% or less, about 3% or less, about 2% or less, about 1% or less, or about 0.8% or less over the optical wavelength regime. For example, the single side average or maximum light reflectance may be in the range from about 0.4% to about 9%, from about 0.4% to about 8%, from about 0.4% to about 7%, from about 0.4% to about 6%, or from about 0.4% to about 5% and all ranges therebetween.

According to one embodiment, the coated article 100 may exhibit a single side average or maximum light reflectance as measured at the anti-reflective surface 122 at the second portion 115 of the substrate 110 of about 8% or less, about 7% or less, about 6% or less, about 5% or less, about 4% or less, about 3% or less, about 2% or less, or about 1% or less, wherein the single side average light reflectance of the second portion 115 is measured at (a) an incident illumination angle $\theta_2$ relative to $n_2$, and wherein the incident illumination angle $\theta_2$ comprises an angle in the range from about 0 degrees to about 60 degrees from the $n_z$ and/or (b) an incident illumination angle $\theta_3$ relative to $n_3$, and wherein the incident illumination angle $\theta_3$ comprises an angle in the range from about 0 degrees to about 60 degrees from the $n_3$. In additional embodiments, the incident illumination angles $\theta_2$ and $\theta_3$, respectively, may comprise angles in the range from about 0 degrees to about 60 degrees, from about 0 degrees to about 50 degrees, from about 0 degrees to about 45 degrees, from about 0 degrees to about 40 degrees, from about 0 degrees to about 30 degrees, from about 0 degrees to about 20 degrees, or from about 0 degrees to about 10 degrees from $n_2$ and $n_3$, respectively. In additional embodiments, the coated article 100 may exhibit a single side average or maximum light reflectance as measured at the anti-reflective surface 122 at the second portion 115 of the substrate 110 of about 8% or less for all incident illumination angles $\theta_2$ in a range from about 0 degrees to about 60 degrees, from about 0 degrees to about 45 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_z$ and/or $n_3$, respectively. In additional embodiments, given any of the described ranges of incident illumination angles $\theta_2$ and $\theta_3$, respectively, the single side average or maximum light reflectance as measured at the anti-reflective surface 122 at the second portion 115 of the substrate 110 may be about 10% or less, about 9% or less, about 8% or less, about 7% or less, about 6% or less, about 5% or less, about 4% or less, about 3% or less, about 2% or less, about 1% or less, or about 0.8% or less over the optical wavelength regime. For example, the single side average or maximum light reflectance may be in the range from about 0.4% to about 9%, from about 0.4% to about 8%, from about 0.4% to about 7%, from about 0.4% to about 6%, or from about 0.4% to about 5% and all ranges therebetween.

In another embodiment, the difference between the single side average or maximum light reflectance as measured at the anti-reflective surface 122 at the first portion 113 of the substrate 110, over any of the disclosed angular ranges, and the single side average light reflectance as measured at the anti-reflective surface 122 at the second portion 115 of the substrate 110, over any of the disclosed angular ranges, is 5% or less, 4% or less, 3% or less, 2% or less, or even 1% or less.

In another embodiment, the photopic reflectance at the first portion 113 and/or the second portion 115 is in a range disclosed with regards to the single-side average or maximum light reflectance over an angular range disclosed.

According to one embodiment, the coated article 100 may exhibit an average light transmittance as measured at the anti-reflective surface 122 at the first portion 113 of the substrate 110 of about 90% or greater, wherein the average light transmittance of the first portion 113 is measured at an incident illumination angle $\theta_1$ relative to $n_1$, and wherein the incident illumination angle $\theta_1$ comprises an angle in the range from about 0 degrees to about 60 degrees from the $n_1$. In additional embodiments, the incident illumination angle $\theta_1$ may comprise angles in the range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$. In additional embodiments, the coated article 100 may exhibit an average light transmittance as measured at the anti-reflective surface 122 at the first portion 113 of the substrate 110 of about 90% or greater for all incident illumination angles $\theta_1$ in a range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$. In additional embodiments, given any of the described ranges of incident illumination angles $\theta_1$, the average light transmittance as measured at the anti-reflective surface 122 at the first portion 113 of the substrate 110 may be about 90% or greater, 91% or greater, 92% or greater, 93% or greater, 94% or greater, 95% or greater, 96% or greater, 97% or greater, or 98% or greater, over the optical wavelength regime. For example, the average light transmittance may be in the range from about 90% to about 95.5%, from about 91% to about 95.5%, from about 92% to about 95.5%, from about 93% to about 95.5%, from about 94% to about 95.5%, from about 95% to about 95.5%, from about 96% to about 96.5%, and all ranges therebetween.

According to one embodiment, the coated article 100 may exhibit an average light transmittance as measured at the anti-reflective surface 122 at the second portion 115 of the substrate 110 of about 90% or greater, wherein the average light transmittance of the second portion 115 is measured at (a) an incident illumination angle $\theta_2$ relative to $n_2$, and wherein the incident illumination angle $\theta_2$ comprises an angle in the range from about 0 degrees to about 60 degrees from the $n_2$ and/or (b) an incident illumination angle $\theta_3$ relative to $n_3$, and wherein the incident illumination angle $\theta_3$ comprises an angle in the range from about 0 degrees to about 60 degrees from the $n_3$. In additional embodiments, the incident illumination angles $\theta_2$ and $\theta_3$, respectively, may comprise angles in the range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_2$ and $n_3$, respectively. In additional embodiments, the coated article 100 may exhibit an average light transmittance as measured at the anti-reflective surface 122 at the second portion 115 of the substrate 110 of about 90% or greater for all incident illumination angles $\theta_2$ and/or $\theta_3$ in a range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_2$ and $n_3$, respectively. In additional embodiments, given any of the described ranges of incident illumination angles $\theta_2$ and $\theta_3$, the average light transmittance as measured at the anti-reflective surface 122 at the second portion 115 of the substrate 110 may be about 90% or greater, 91% or greater, 92% or greater, 93% or greater, 94% or greater, 95% or greater, 96% or greater, 97% or greater, or 98% or greater, over the optical wavelength regime. For example, the average light transmittance may be in the range from about 90% to about 95.5%, from about 91% to about 95.5%, from about 92% to about 95.5%, from about 93% to about 95.5%, from about 94% to about 95.5%, from about 95% to about 95.5%, from about 96% to about 95.5%, and all ranges therebetween.

In another embodiment, the difference between the average light transmittance as measured at the anti-reflective surface 122 at the first portion 113 of the substrate 110, over any of the disclosed angular ranges, and the average light transmittance as measured at the anti-reflective surface 122 at the second portion 115 of the substrate 110, over any of the disclosed angular ranges, is 5% or less, 4% or less, 3% or less, 2% or less, or even 1% or less.

In another embodiment, the photopic transmittance at the first portion 113 and/or the second portion 115 is in a range disclosed with regards to the average light transmittance over an angular range disclosed.

According to another embodiment, one or more of the single side average or maximum light reflectance, the average light transmittance, the photopic reflectance, the photopic transmittance, reflected color, and transmitted color may be measured at the first portion 113 and at the second portion 115, wherein the incident illumination angle $\theta_1$ comprises an angle in the range from about 0 degrees to about 60 degrees from $n_1$, the given optical value (e.g., transmittance, reflectance, etc.) at the second portion 115 is measured at an incident illumination angle $\theta_2$ and/or $\theta_3$, wherein the incident illumination angle $\theta_2$ and $\theta_3$ is in a direction equal to the direction $v_1$ of the incident illumination angle $\theta_1$ such that the optical property at the first portion 113 and at the second portion 115 are measured in the same viewing direction (i.e., $v_1$ is equal to $v_2$ (and $v_3$, as applicable), but $\theta_1$ is not equal to $\theta_2$ (and/or $\theta_3$) because $n_1$ does not equal $n_2$ (and $n_3$, as applicable).

Optical interference between reflected waves from the optical coating 120/air interface and the optical coating 120/substrate 110 interface can lead to spectral reflectance and/or transmittance oscillations that create apparent color in the coated article 100. In one or more embodiments, the coated article 100 at the first portion 113 may exhibit an angular color shift in reflectance and/or transmittance of about 10 or less, or about 5 or less, when measured between normal $n_1$ to the viewing direction $v_1$ at the incident illumination angle of $\theta_1$. Additionally, in one or more embodiments, the coated article 100 at the second portion 115 may exhibit an angular color shift in reflectance and/or transmittance of about 10 or less, or about 5 or less, when measured between normal $n_2$ to the viewing direction $v_2$ at the incident illumination angle of $\theta_2$ and/or normal $n_3$ to the viewing direction $v_3$ at the incident illumination angle of $\theta_3$.

According to one or more embodiments, the reference point color at the first portion 113 and at the second portion 115 may be less than about 10 (such as about 9 or less, about 8 or less, about 7 or less, about 6 or less, about 5 or less, about 4 or less, about 3 or less, or even about 2 or less). As used herein, the phrase "reference point color" refers to the a* and b*, under the CIE L*, a*, b* colorimetry system in reflectance and/or transmittance with respect to a reference color. The reference color may be (a*,b*)=(0,0), (−2,−2), (−4,−4), or the color coordinates of the substrate 110. The reference point color may be measured at varying incident illumination angles $\theta_1$ and $\theta_2$. At (0,0) reference, the reference point color is defined as $\sqrt{((a^*_{article})^2+(b^*_{article})^2)}$, at (−2,−2) reference, the reference point color is defined as $\sqrt{((a^*_{article}+2)^2+(b^*_{article}+2)^2)}$, at (−4,−4) reference, the reference point color is defined as $\sqrt{((a^*_{article}+4)^2+(b^*_{article}+4)^2)}$, at reference as the color of the substrate 110, the reference point color is defined as $\sqrt{((a^*_{article}-a^*_{substrate})^2+(b^*_{article}-b^*_{substrate})^2)}$. In embodiments, the reference point color may be measured at over angular ranges, such that the incident illumination angles $\theta_1$ and $\theta_2$ may comprise angles in the range from about 0 degrees to about 60 degrees, from about 0 degrees to about 50 degrees, from about 0 degrees to about 45 degrees, from about 0 degrees to about 40 degrees, from about 0 degrees to about 30 degrees, from about 0 degrees to about 20 degrees, or from about 0 degrees to about 10 degrees from $n_1$, $n_z$ and/or $n_3$. In another embodiment, for any of the disclosed incident illumination angle ranges, at the first portion 113, at the second portion 115, or both, a* may be about 5 or less and b* may be about 5 or less, or each may be about 4 or less, 3 or less, 2 or less, or even 1 or less.

As used herein, the phrase "angular color shift" refers to the change in both a* and b*, under the CIE L*, a*, b* colorimetry system in reflectance and/or transmittance with shifting incident illumination angles. It should be understood that unless otherwise noted, the L* coordinate of the articles described herein are the same at any angle or reference point and do not influence color shift. For example, angular color shift may be determined at a particular location of the coated substrate 100 using the following equation:

$$\sqrt{((a^*_v-a^*_n)^2+(b^*_v-b^*_n)^2)}$$

with $a^*_v$, and $b^*_v$ representing the a* and b* coordinates of the article when viewed at incidence illumination angle and $a^*_n$, and $b^*_n$ representing the a* and b* coordinates of the article when viewed at or near normal.

In one or more embodiments, the angular color shift at the first portion 113 may be about 10 or less, about 9 or less, about 8 or less, about 7 or less, about 6 or less, about 5 or less, about 4 or less, about 3 or less, or even about 2 or less. Likewise, the angular color shift at the second portion 115 may be about 10 or less, about 9 or less, about 8 or less, about 7 or less, about 6 or less, about 5 or less, about 4 or less, about 3 or less, or even about 2 or less. The respective incident illumination angles $\theta_1$ and $\theta_2$ (and/or $\theta_3$ and any others) may comprise angles in the range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$ and $n_z$ (and/or $n_3$, as applicable). In additional embodiments, the coated article 100 may be characterized by a reflective or transmittance color shift at the first portion 113 and at the second portion 115 of the substrate 110 of about 10 or less for all incident illumination angles $\theta_1$ and $\theta_2$ (and/or $\theta_3$ and any others) in a range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_1$ and $n_z$ (and/or $n_3$, as applicable). In some embodiments, the angular color shift may be about 0.

The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting).

In another embodiment, the difference in reflected color of the coated article 100 between the first portion 113 of the substrate 110 and the second portion 115 of the substrate 110 is less than or equal to about 10, such as about 9 or less, about 8 or less, about 7 or less, about 6 or less, about 5 or less, about 4 or less, about 3 or less, about 2 or less, or even about 1 or less, wherein the difference in reflected color is defined as:

$$\sqrt{((a^*_{first\ portion} - a^*_{second\ portion})^2 + (b^*_{first\ portion} - b^*_{second\ portion})^2)},$$

and wherein the reflected color at the first portion 113 is measured at an incident illumination angle $\theta_1$ relative to $n_1$, and the reflected color at the second portion 115 is measured at an incident illumination angle $\theta_2$ measured relative to $n_2$ and/or at an incident illumination angle $\theta_3$ measured relative to $n_3$ (and any other illumination angles applicable to the second portion 115). The respective incident illumination angles $\theta_1$ and $\theta_2$ (and/or $\theta_3$ and any others) may comprise angles in the range from about 0 degrees to about 60 degrees, from about 0 degrees to about 50 degrees, from about 0 degrees to about 40 degrees, from about 0 degrees to about 30 degrees, from about 0 degrees to about 20 degrees, or from about 0 degrees to about 10 degrees from $n_j$ and $n_2$ (and/or $n_3$, as applicable). In another embodiment, the difference in reflected color as defined by $\approx$ $((a^*_{first\ portion} - a^*_{second\ portion})^2$ $(b^*_{first\ portion} - b^*_{second\ portion})^2)$ may be measured such that the incident illumination angle $\theta_2$ is in a direction equal to the direction $v_1$ of the first incident illumination angle such that the optical property at the first portion 113 and at the second portion 115 are measured in the same viewing direction (i.e., $v_1$ is equal to $v_2$, but $\theta_1$ is not equal to $\theta_2$ because $n_j$ does not equal $n_2$).

The substrate 110 may include an inorganic material and may include an amorphous substrate, a crystalline substrate, or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethylenetere-phthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal materials. The substrate 110 may be characterized as alkali-including substrates (i.e., the substrate includes one or more alkalis). In one or more embodiments, the substrate 110 exhibits a refractive index in the range from about 1.45 to about 1.55. In specific embodiments, the substrate 110 may exhibit an average strain-to-failure at a surface on one or more opposing major surfaces that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surfaces of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of Lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 of one or more embodiments may have a hardness that is less than the hardness of the overall coated article 100 (as measured by the Berkovich Indenter Hardness Test described herein). The hardness of the substrate 110 may be measured using known methods in the art, including but not limited to the Berkovich Indenter Hardness Test or Vickers hardness test.

The substrate 110 may be substantially optically clear, transparent and free from light scattering elements. In such embodiments, the substrate may exhibit an average light transmittance over the optical wavelength regime of about 85% or greater, about 86% or greater, about 87% or greater, about 88% or greater, about 89% or greater, about 90% or greater, about 91% or greater, or about 92% or greater. In one or more alternative embodiments, the substrate 110 may be opaque or exhibit an average light transmittance over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance of the substrate alone is measured at an incident illumination angle of 0 degrees relative to the substrate major surface 112 (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the coated article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110 is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer DOL, or depth of compression DOC) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S.

Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of compression (DOC). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum CT values are measured using a scattered light polariscope (SCALP) technique known in the art. As used herein, DOC means the depth at which the stress in the chemically strengthened alkali aluminosilicate glass article described herein changes from compressive to tensile. DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In one embodiment, a substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC (formerly DOL) of 10 µm or greater, 15 µm or greater, 20 µm or greater (e.g., 25 µm, 30 µm, 35 µm, 40 µm, 45 µm, 50 µm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOC (formerly DOL) greater than 15 µm, and a CT greater than 18 MPa.

Example glasses that may be used in the substrate 110 may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2 + B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate 110 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % ($Li_2O+Na_2O+K_2O$) 20 mol. % and 0 mol. % (MgO+CaO) 10 mol. %.

A still further example glass composition suitable for the substrate 110 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % ($Li_2O+Na_2O+K_2O$)≤18 mol. % and 2 mol. % (MgO+CaO)≤7 mol. %.

In a particular embodiment, an alkali aluminosilicate glass composition suitable for the substrate 110 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio ($Al_2O_3+B_2O_3$)/Σmodifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio ($Al_2O_3+B_2O_3$)/Σmodifiers (i.e., sum of modifiers) is greater than 1.

In still another embodiment, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $SiO_2$+$B_2O_3$+CaO≤69 mol. %; $Na_2O+K_2O+B_2O_3+MgO+CaO+SrO>10$ mol. %; 5 mol. % ≤MgO+CaO+SrO≤8 mol. %; ($Na_2O+B_2O_3$)−$Al_2O_3$ 2 mol. %; 2 mol. % $Na_2O-Al_2O_3$≤6 mol. %; and 4 mol. % ≤($Na_2O+K_2O$)−$Al_2O_3$≤10 mol. %.

In an alternative embodiment, the substrate 110 may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the substrate 110 may be crystalline and include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm in various portions of the substrate 110. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

As noted earlier, embodiments of the coated articles 100 (see FIGS. 1-8) of the disclosure include an optical coating 120 with low reflectance and controlled color. The optical coating 120 in these articles 100 can be optimized to give desirable combinations of hardness, reflectance, color, and color shift over a range of viewing angles. These desirable combinations are maintained when the coating 120 is at its original design thickness, and when all the layers in the coating are thinned by a scale factor that corresponds to the coating thinning that can occur during a variety of vacuum deposition techniques due to line-of-sight effects in the coating process, such as reactive sputtering, thermal evaporation, CVD, PECVD, and the like.

Embodiments of the disclosure also include coated articles 100 (see FIGS. 1-8) having a range of part surface angles (part surface curvature) that are combined with an optical coating 120 in which the coating 120 is designed to be robust to thinning of the coating that occurs from various coating deposition processes. The net result is a coated article 100 having a range of part surface curvature angles with an optical coating 120 having controlled hardness, reflectance, color, and color shift with viewing angle over the entire surface of the article 100, including a portion or all of the curved regions (e.g., at second portion 115). In addition to absolute levels of hardness, reflectance, and color that meet certain targets, the coated articles 100 can also exhibit small changes in these values, particularly small changes in visible reflectance and color, when the thickness of the coating 120 is reduced by a scaling factor corresponding to the actual reduction in coating thickness that occurs in an industrially-scalable reactive sputtering process on a manufactured part with surface curvature angles from 0 to 60 degrees.

An important piece of understanding to create optimal coating designs for a coated article 100 (see FIGS. 1-8) with surface curvature, is an understanding of the particular coating process used to form the layers of the optical coating 120, and the level of line-of-sight coating effects that occur in that process. Some coating deposition processes have no line of sight behavior at all, such as atomic layer deposition, where one monolayer of molecules or atoms is deposited at a time. However, this process can be slow (at least as limited by current processing technology) and is typically too expensive for applications involving large substrates or industries that are cost sensitive, such as the consumer electronics and automotive industries. A more cost-effective process for forming the optical coating 120, reactive sputtering, is readily scalable to large areas and can be relatively low cost. However the nature of industrial reactive sputtering processes generally includes a deposition that has at least some line-of-sight character, meaning that the surfaces of the article directly facing the sputtering targets will receive more deposited material (resulting in a thicker coating), while surfaces of the article tilted at some angle relative to the sputtering targets (e.g., its curved surfaces) will generally receive less material, resulting in a thinner coating.

Accordingly, embodiments of the disclosure include coated articles 100 (see FIGS. 1-8) in which the optical coating 120 has been optimized with regard to the tradeoffs between hardness, reflectance, color, and number of coating layers. Adding an arbitrary number of layers to achieve an optical target (e.g., without consideration to hardness or other mechanical properties) in the optical coating will tend to reduce the hardness of the coating to levels below the required range for applications targeting scratch-resistant chemically strengthened glass for consumer electronics, automotive, and touch screen applications (e.g., to a hardness <<8 GPa, as measured by Berkovich Indenter Hardness Test at an indentation depth of about 100 nm or greater). In the case of coated articles 100 having curved surfaces (e.g., at the second portion 115 of the major surface 112), it can be important to assess how part surface curvature relates to the amount, or scale factor, by which the layers of the optical coating 120 will be reduced or thinned from their target design thicknesses. The target design thickness (e.g., the thickness at 100% scale factor or 1.0 scale factor) is generally the thickness that is coated on the "flat" areas of the article 100 (e.g., at the first portion 113 of the major surface 112), those portions of the article 100 that are closest to directly facing the sputtering targets, or those portions of the article 100 that receive the most material from the sputtering targets. Any part of the article 100 that is curved away from this maximum thickness deposition direction will generally receive less material, resulting in a thinner coating on these curved areas as each of the layers of the coating 120 is formed. For optimal optical coating design for the optical coating 120 of embodiments of the coated articles 100 (see FIGS. 1-8), it can be beneficial to understand the design window in terms of target part curvature, as well as how part curvature corresponds to coating thinning in the deposition process. This can enable optical design of the coating 120 in such a way that optimizes, for example, reflectance and color over the target range of part angles and coating thickness variation, without sacrificing too much in terms of the hardness of the coating, number of layers in the coating, or other metrics. Said another way, without an understanding of the relevant window of part angles and coating thickness scale factors, one can over-design the coating to include too many layers to achieve a desired set of optical properties, thus sacrificing hardness and scratch resistance.

Figure 9:
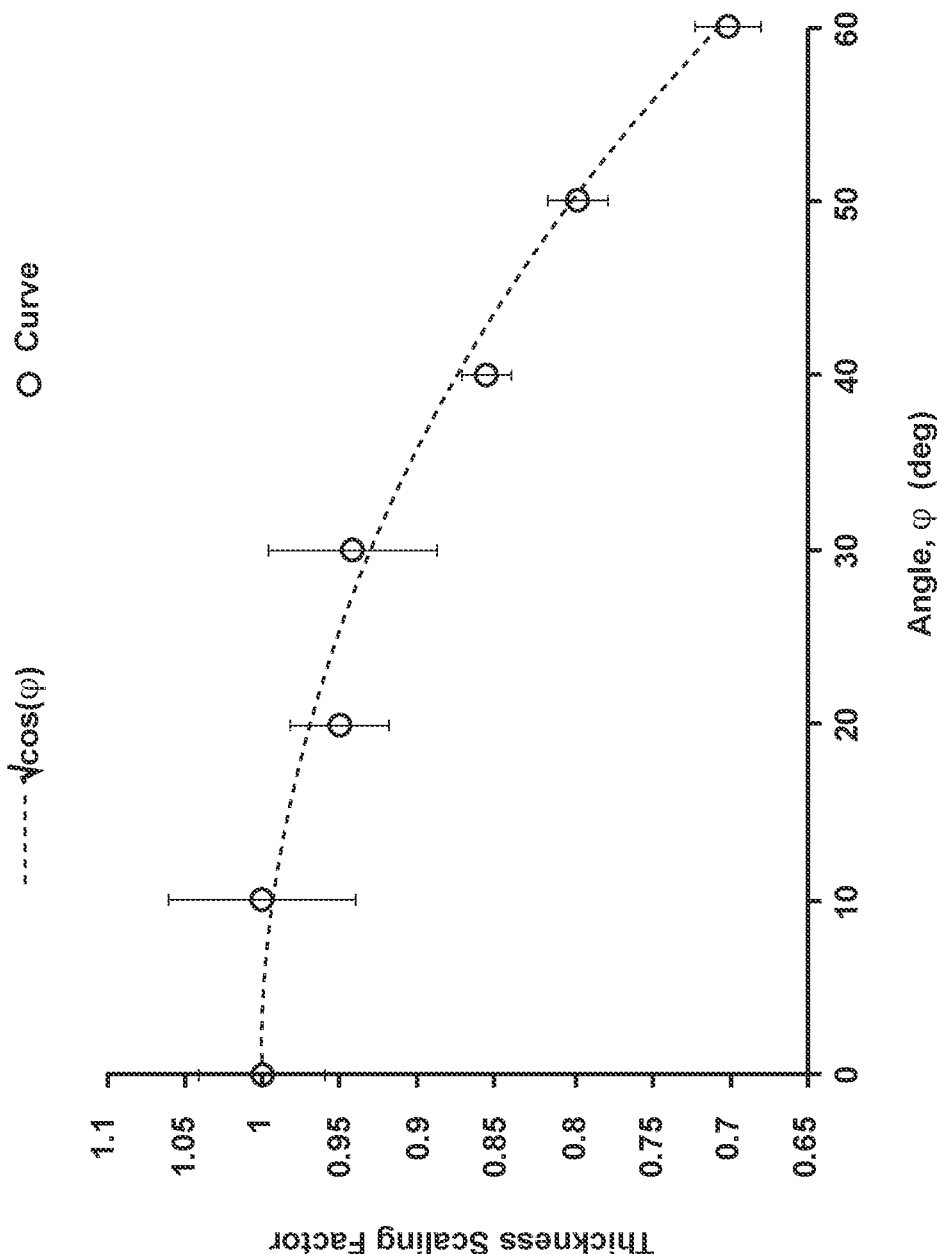
FIG. 9 is a plot of optical coating thickness scaling factor v. part surface curvature for a deposition process, according to one or more embodiments described herein.

Referring now to FIG. 9, a plot is provided of optical coating thickness scaling factor v. part surface curvature for a deposition process. In particular, FIG. 9 shows the experimentally measured correspondence between part surface angle (i.e., at the second portion 115 of the major surface 112) and coating thickness scale factor (i.e., for the optical coating 120) for a reactive sputtering process employed on coated articles 100 (see FIGS. 1-8 and corresponding description above), according to embodiments of the disclosure. FIG. 9 can be employed to establish a target process window to optimize the deposition process employed to form the optical coating of articles of the disclosure. As shown in FIG. 9, the coating thickness scale factor follows a square root $(\cos(\varphi))$ dependence, where $\varphi$ is the part surface angle. The data shown in FIG. 9 were obtained from measurements of sputtered thin films using known optical interference calculation methods with a sample fixture that allows rotation of a curved part and measurement of reflectance spectra along the normal angle at each point along the curvature of the part. As shown in FIG. 9, a part surface angle of 30 degrees corresponds to a coating thickness scaling factor of about 0.95, 40 degrees to about 0.85, 50 degrees to about 0.8, and 60 degrees to about 0.7. For example, a coated article 100 having a non-planar second portion 115 with an angle $\varphi$ of 30 degrees relative to its first portion 113 can experience a thinning in the layers of its optical coating 120 above its second portion 115 by a scaling factor of 0.85. That is, the thickness of the layers of the coating 120 above the first portion 113 and above the second portion 115 can vary based on a thickness scaling factor, as shown in FIG. 9.

Referring again to FIG. 9, the inventive designs of the coated articles 100 of the disclosure can be particularly optimized to with an optical coating 120 characterized by an advantageous combination of low reflectance, controlled color, and controlled color shift with viewing angle (incident light angle) at 100% thickness (1.0 scaling factor) as well as at thickness scaling factors in the range of 0.7 (70%) to 0.85 (85%), which correspond to article surface angles of 0 degrees (for 100% thickness), to 40 degrees (for 85% thickness), and to 60 degrees (for 70% thickness), respectively, along with all surface angles and thickness scaling factors in between. Also referring to FIG. 9, the inventive designs of the coated articles 100 of the disclosure can be particularly optimized to with an optical coating 120 characterized by an advantageous combination of low reflectance, controlled color, and controlled color shift with viewing angle (incident light angle) at 100% thickness (1.0 scaling factor) as well as at thickness scaling factors in the range of 0.6 (60%) to 0.85 (85%), which correspond to article surface angles of 0 degrees (for 100% thickness), to 40 degrees (for 85% thickness), and to 70 degrees (for 60% thickness), respectively, along with all surface angles and thickness scaling factors in between. To calculate the optical performance for each thickness scaling factor, the 100% thickness layer design has all of its layers scaled by the same amount (the thickness scaling factor) and the optical results are re-calculated using transfer matrix method techniques according to principles understood by those with ordinary skill in the field of the disclosure. Optical index dispersion curves are measured for sputter deposited films of $SiO_2$, $SiO_xN_y$, and $SiN_x$, (or other materials employed in the layers of the optical coating 120) and these index dispersion values are input into the optical models, according to principles understood by those of ordinary skill in the field of the disclosure.

Figure 18B:
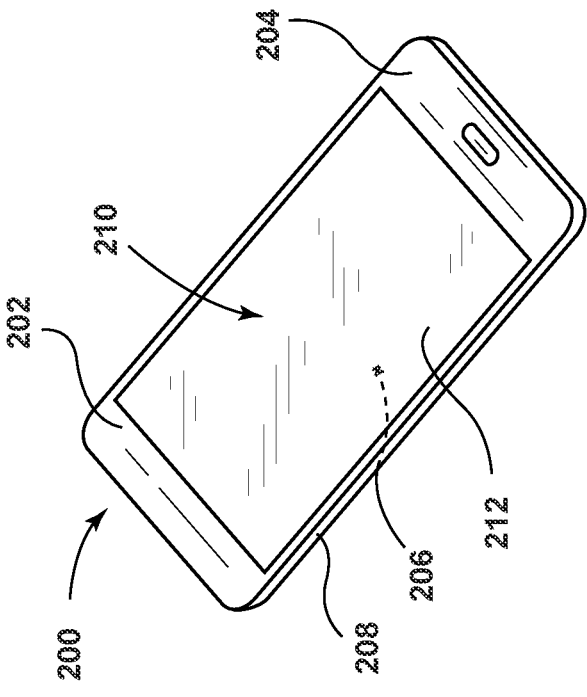
FIG. 18B is a perspective view of the exemplary electronic device of FIG. 18A.
Figure 18A:
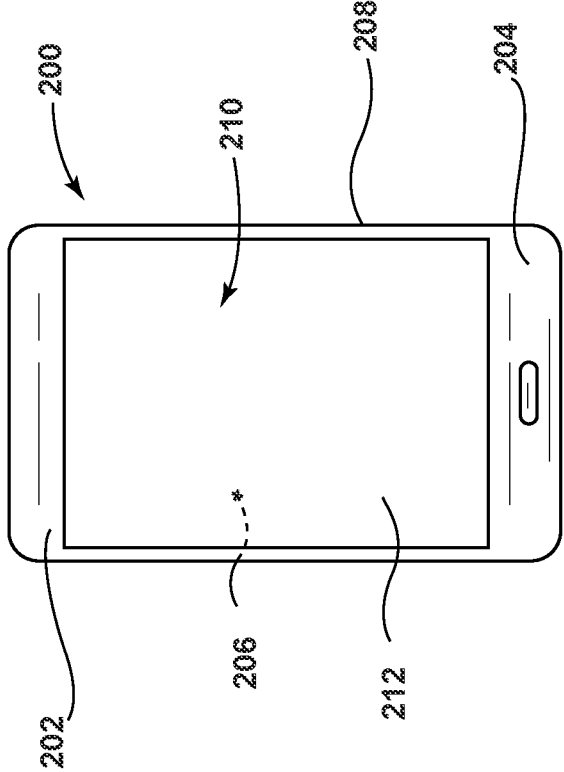
FIG. 18A is a plan view of an exemplary electronic device incorporating any of the coated articles disclosed herein.

The coated articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the coated articles disclosed herein is shown in FIGS. 18A and 18B. Specifically, FIGS. 18A and 18B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least one of the cover substrate 212 or a portion of housing 202 may include any of the coated articles disclosed herein.

EXAMPLES

Various embodiments will be further clarified by the following examples. The optical properties (e.g., photopic reflectance and transmittance) of the examples were modeled using a computation. The computation was carried out using the thin-film design program "Essential Macleod" available from Thin Film Center, Inc. of Tucson AZ. The spectral transmittance was computed on a 1 nm interval for a selected wavelength range. Transmittance at each wavelength of a given coated article was calculated based on inputted layer thicknesses and refractive indices of each layer. Refractive index values for materials of the coatings were experimentally derived or found in available literature. To experimentally determine the refractive index of a material, dispersion curves for the materials of the coating materials were prepared. Layers of each coating material were formed onto silicon wafers by DC, RF or RF superimposed DC reactive sputtering from a silicon or an aluminum target at a temperature of about 50° C. using ion assist. The wafer was heated to 200° C. during deposition of some layers and targets having a 3 inch diameter were used. Reactive gases used included nitrogen and oxygen; argon was used as the inert gas. The RF power was supplied to the silicon target at 13.56 Mhz and DC power was supplied to the Si target, Al target and other targets.

The refractive indices (as a function of wavelength) of each of the formed layers and the glass substrate were measured using spectroscopic ellipsometry. The refractive indices thus measured were then used to calculate reflectance spectra for the examples. The examples use a single refractive index value in their descriptive tables for convenience, which corresponds to a point selected from the dispersion curves at about 550 nm wavelength.

Comparative examples are supplied as a comparison to the performance of the coatings, and these comparative examples may have inferior optical performance when deposited on a non-planar substrate.

Comparative Example 1

Figure 10A:
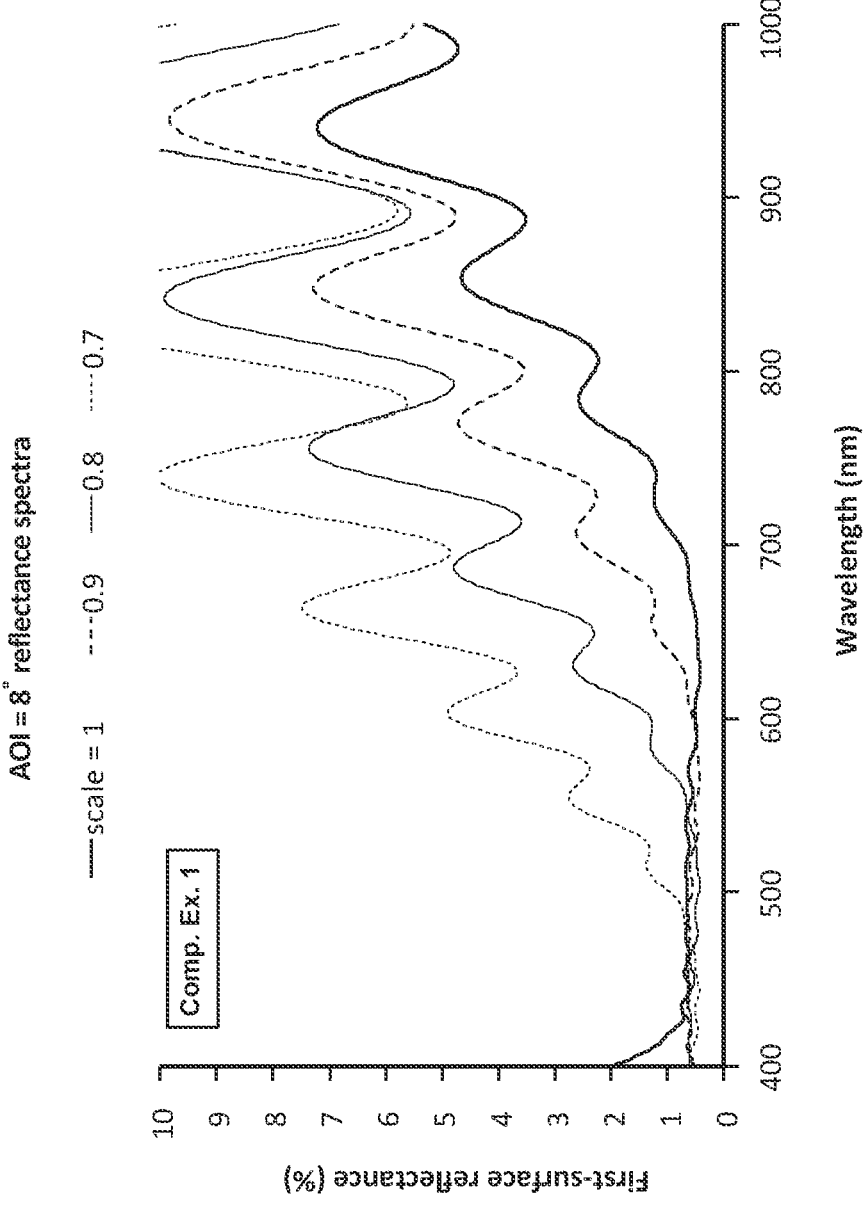
FIG. 10A is a plot of first-surface phototopic reflectance v. wavelength at a near-normal light incidence angle (8 degrees) for a comparative optical coating at four optical coating thickness scaling factor values.
Figure 10B:
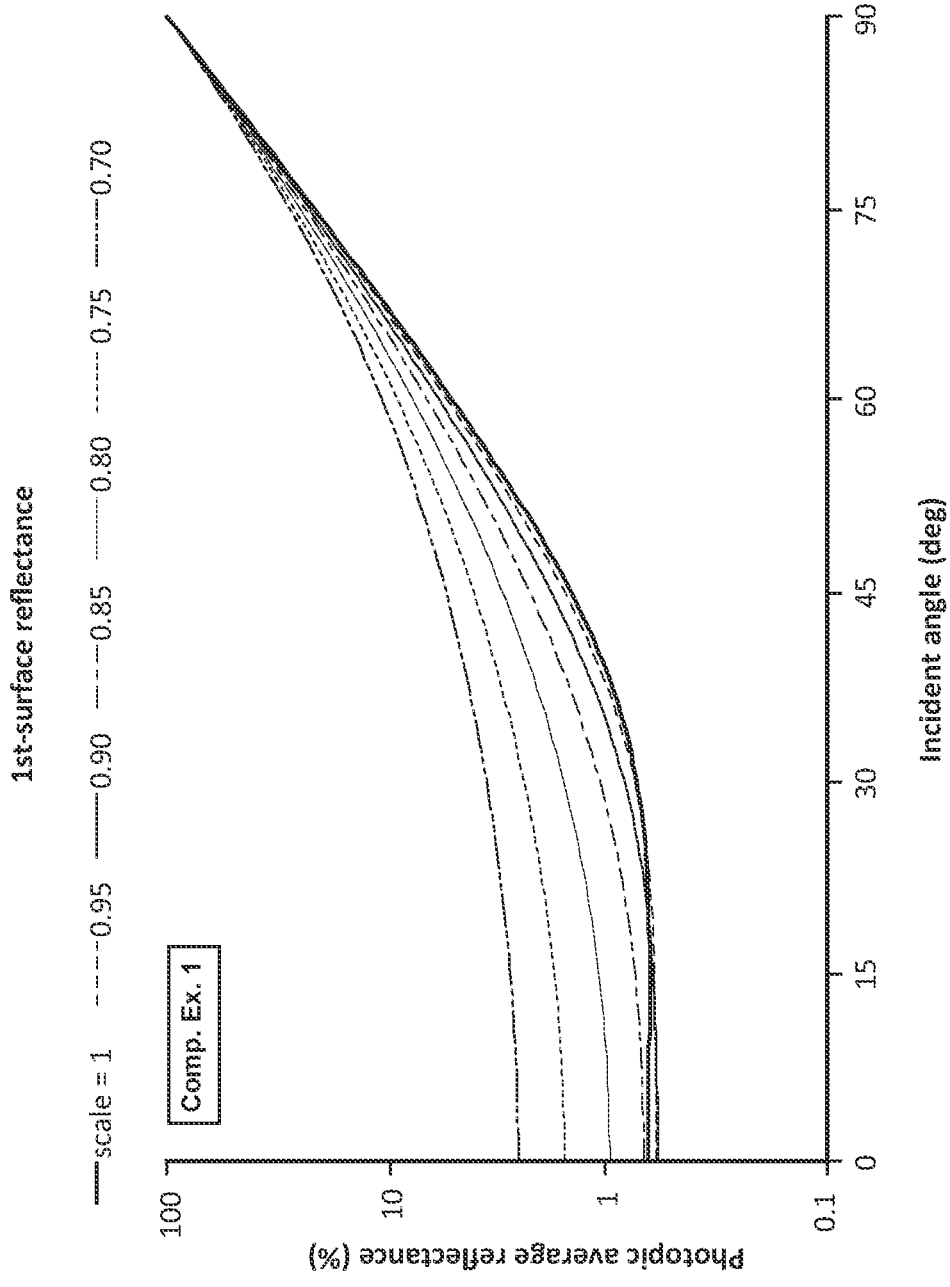
FIG. 10B is a plot of first-surface photopic average reflectance v. incident light (viewing) angle for the comparative optical coating of FIG. 10A at seven optical coating thickness scaling factor values.
Figure 10C:
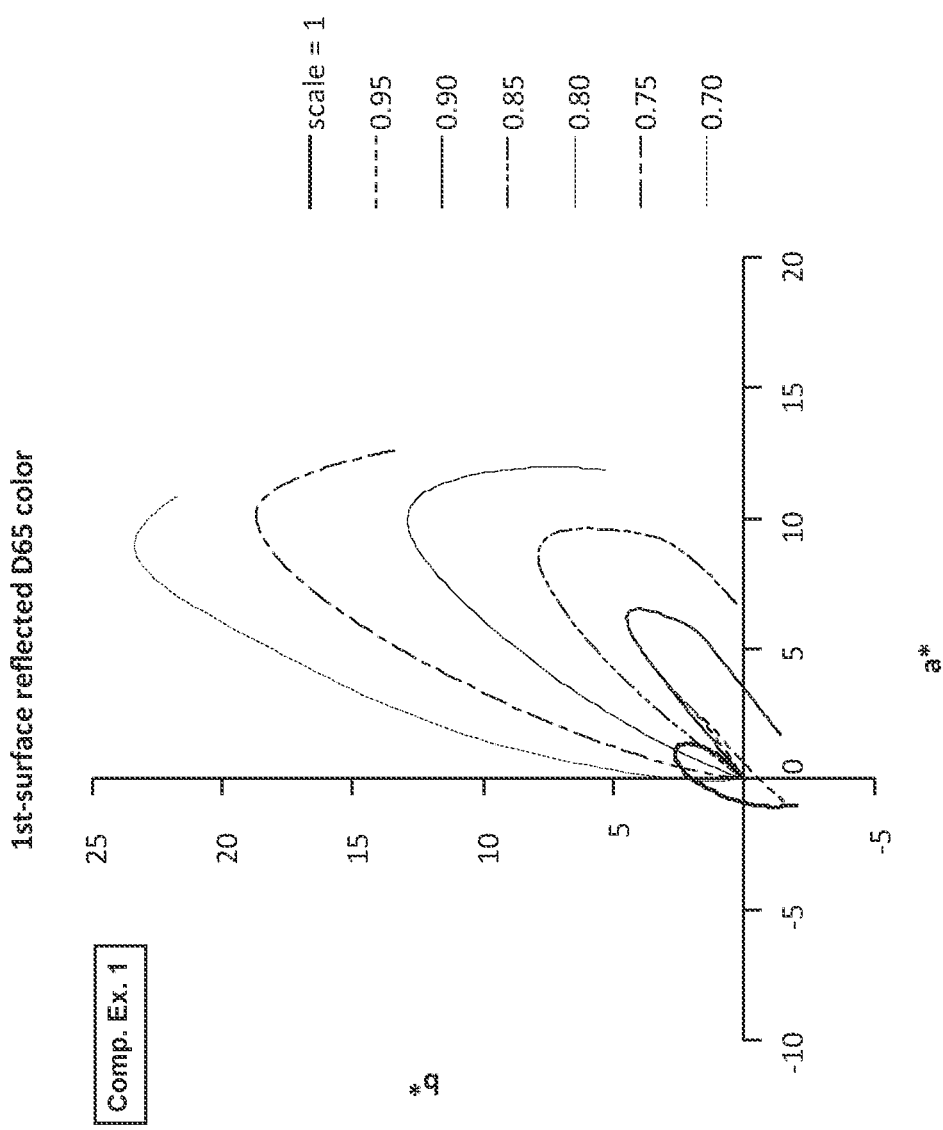
FIG. 10C is a plot of first-surface reflected color with a D65 illuminant for all viewing angles from 0 to 90 degrees for the comparative optical coating of FIG. 10A at seven optical coating thickness scaling factor values.

A planar glass substrate was coated with the comparative coating of Table 1 below, designated Comp. Ex. 1. Optical properties of the Comp. Ex. 1 are shown in FIGS. 10A-10C. In particular, FIG. 10A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 10B is a plot of first-surface photopic average reflectance v. incident light (viewing) angle at seven optical coating thickness scaling factor values, 1, 0.95, 0.9, 0.85, 0.80, 0.75 and 0.7, each of which corresponds to part surface angles of 0 degrees, about 25 degrees, about 35 degrees, about 43 degrees, about 50 degrees, about 55 degrees and about 60 degrees, respectively (see FIG. 9). Further, FIG. 10C is a plot of first-surface reflected color with a D65 illuminant for all viewing angles from 0 to 90 degrees at the seven optical coating thickness scaling factor values employed in FIG. 10B.

As is evident from Table 1 and FIGS. 10A-10C, the comparative example (Comp. Ex. 1) has a low reflectance at normal incidence and full 100% thickness. Nevertheless, its relatively narrow bandwidth of low reflectance (from about 400 nm to 700 nm) leads to increased reflectance and color as the coating is reduced in thickness according to prescribed scaling factors greater than about 0.9. In particular, the photopic average reflectance rises above 1% for all viewing angles for scale factors of 0.75 or less, and rises above 1% for scale factors of 0.80 or less for all viewing angles of 15 degrees or greater. Further, the range of color (considering all viewing angles from 0 to 90 degrees) rises well above values of b*=5 and a*=5 for thickness scaling factors of 0.85 or less, corresponding to part surface angles of about 40 degrees or more.

TABLE 1

| | Comparative Ex. 1, Coated Glass Article | | |
| Layer | Material | Refractive index @ 550 nm | Layer thickness (nm) |
|---|---|---|---|
| N/A | Air | 1 | N/A |
| 1 | SiO$_2$ | 1.48 | 90.87 |
| 2 | Si$_3$N$_4$ | 2.01 | 152.03 |
| 3 | SiO$_2$ | 1.48 | 16.01 |
| 4 | Si$_3$N$_4$ | 2.01 | 44.09 |
| 5 | SiO$_2$ | 1.48 | 8.62 |
| 6 | SiON | 1.94 | 2000 |
| 7 | SiO$_2$ | 1.48 | 8.6 |
| 8 | SiON | 1.94 | 44.96 |
| 9 | SiO$_2$ | 1.48 | 29.54 |
| 10 | SiON | 1.94 | 26.3 |
| 11 | SiO$_2$ | 1.48 | 50.87 |
| 12 | SiON | 1.94 | 8.59 |
| Substrate | Glass - Corning ® Gorilla ® Glass 3 | 1.51 | 1.0 mm |

Example 1

Figure 11A:
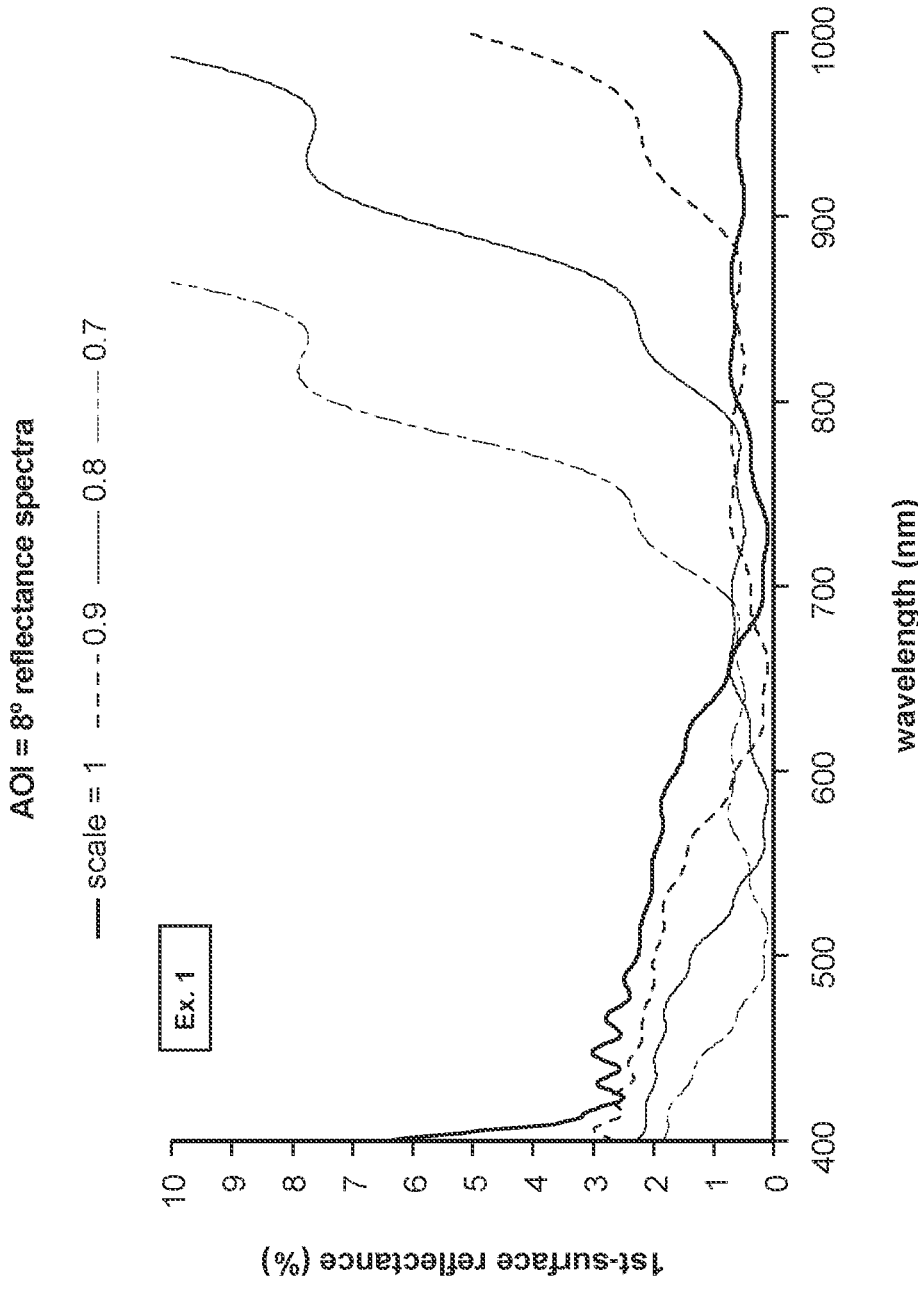
FIG. 11A is a plot of first-surface phototopic reflectance v. wavelength at a near-normal light incidence angle (8 degrees) for an exemplary optical coating of the disclosure at four optical coating thickness scaling factor values.
Figure 11B:
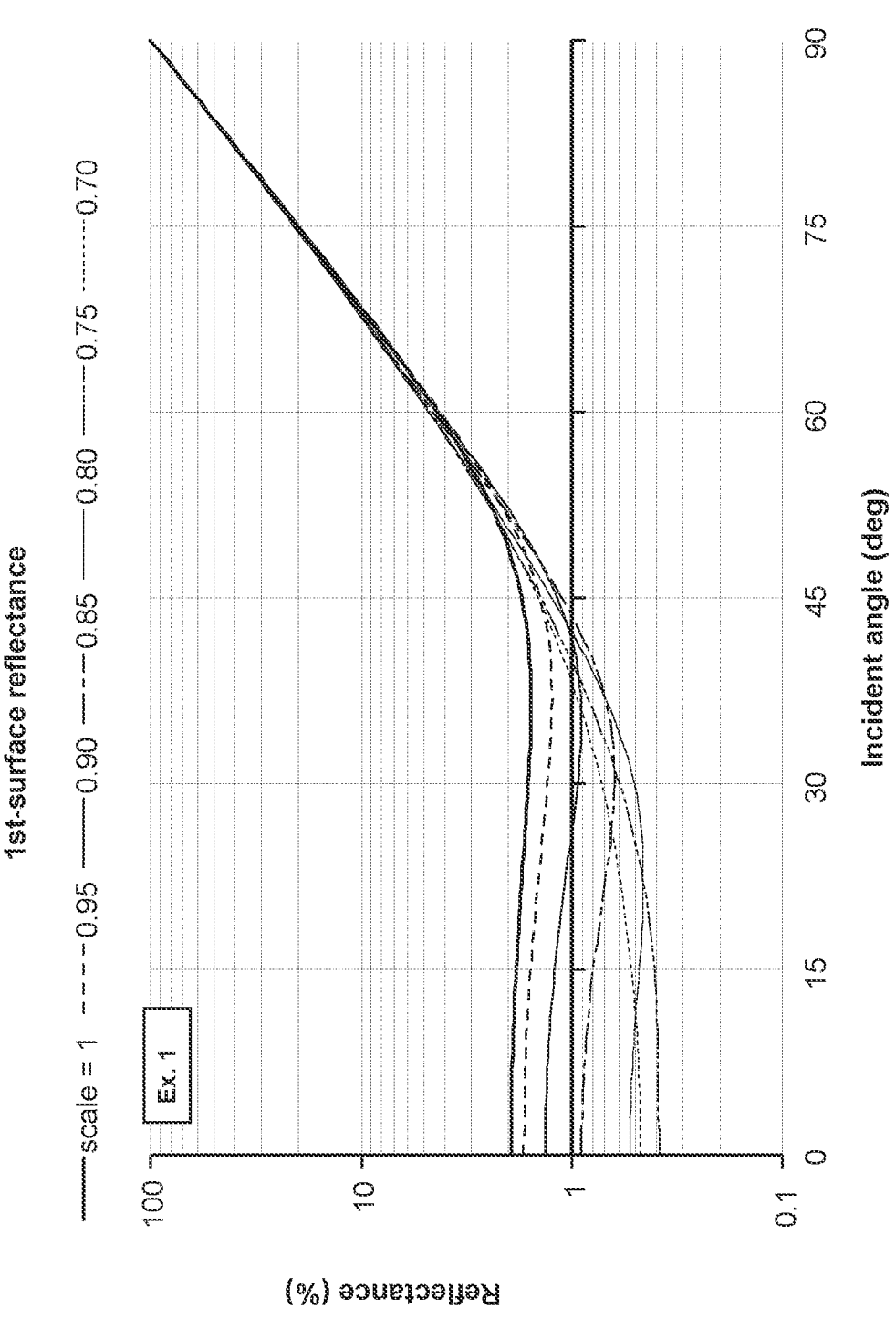
FIG. 11B is a plot of first-surface photopic average reflectance v. incident light (viewing) angle for the exemplary optical coating of FIG. 11A at seven optical coating thickness scaling factor values.
Figure 11C:
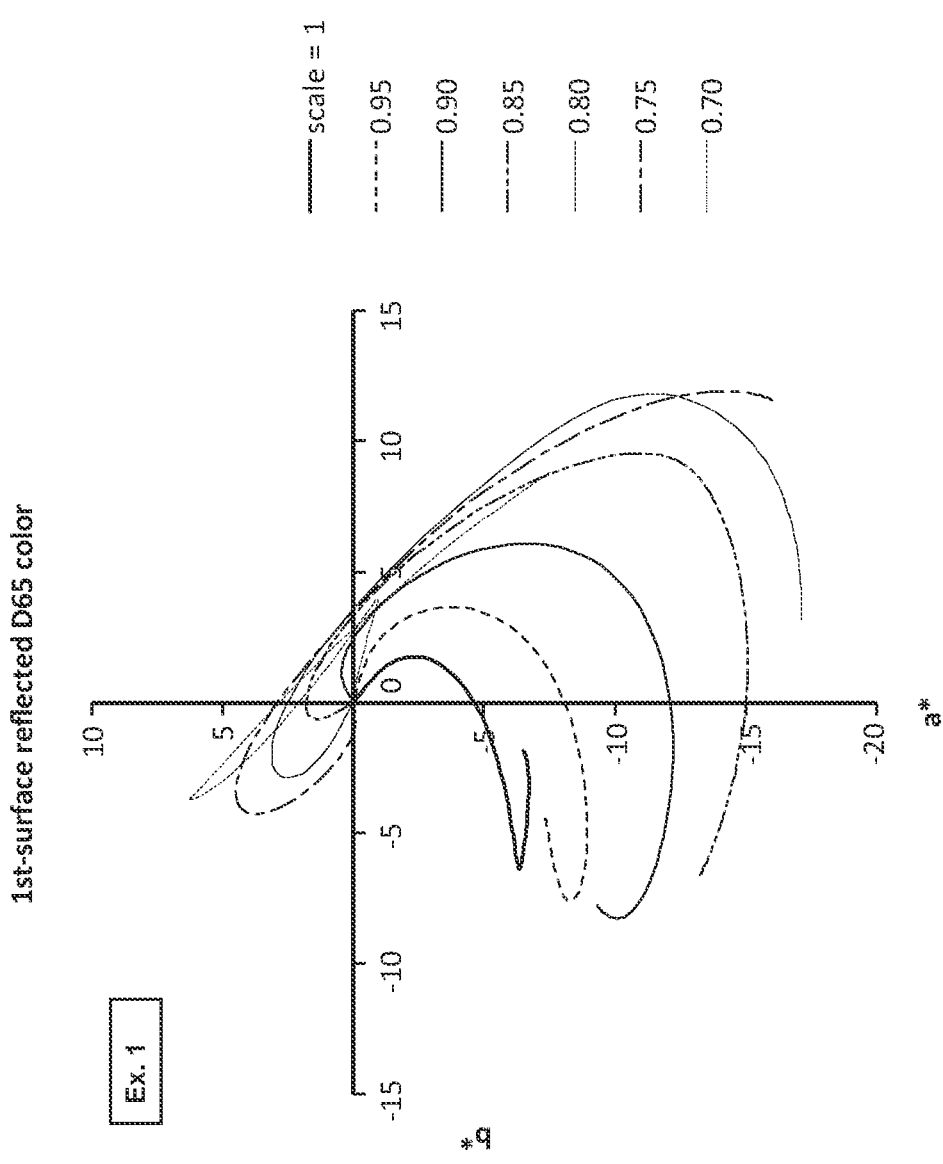
FIG. 11C is a plot of first-surface reflected color with a D65 illuminant for all viewing angles from 0 to 90 degrees for the exemplary optical coating of FIG. 11A at seven optical coating thickness scaling factor values.

A planar glass substrate was coated with the exemplary coating of Table 2 below, designated Ex. 1, according to the principles of the disclosure. In Ex. 1, the glass substrate had a borosilicate composition (e.g., 75 mol % SiO$_2$, 10 mol % B$_2$O$_3$, 8.6 mol % Na$_2$O, 5.6 mol % K$_2$O, and 0.7 mol % BaO). Optical properties of the Ex. 1 coated article are shown in FIGS. 11A-11C. In particular, FIG. 11A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 11B is a plot of first-surface photopic average reflectance v. incident light (viewing) angle at seven optical coating thickness scaling factor values, 1, 0.95, 0.9, 0.85, 0.80, 0.75 and 0.7, each of which corresponds to part surface angles of 0 degrees, about 25 degrees, about 35 degrees, about 43 degrees, about 50 degrees, about 55 degrees and about 60 degrees, respectively (see FIG. 9). Further, FIG. 11C is a plot of first-surface reflected color with a D65 illuminant for all viewing angles from 0 to 90 degrees at the seven optical coating thickness scaling factor values employed in FIG. 11B.

As is evident from Table 2 and FIGS. 11A-11C, the exemplary coated article of this example (Ex. 1) has a single-surface photopic average reflectance of less than 2% at 100% coating thickness, as well as for all coating thickness scaling factors from 70% to 100%. Ex. 1 also demonstrates these reflectance values for all thickness scaling factors from 70% to 100% and for all incident light (viewing) angles from 0 (normal) to 45 degrees. Ex. 1 also demonstrates a first-surface reflectance of less than 3% for all wavelengths from 410 nm to 750 nm (i.e., a maximum reflectance in this wavelength range) at normal incidence for all thickness scaling factors from 70% to 100%. Ex. 1 also exhibits a first-surface reflectance of less than 3% at 100% thickness for all wavelengths from 410 nm to 1000 nm.

As is also evident from Table 2 and FIGS. 11A-11C, the coated article of this example (Ex. 1) further demonstrates a first-surface reflected color at normal incidence that has b*<5, or <0, for all thickness scaling factors from 70% to 100%. Ex. 1 also demonstrates a reflected color b*<5, or even <0, for thickness scaling factors from 70% to 100% for all viewing angles from 0 to 25 degrees.

It is also evident from Table 2 and FIGS. 11A-11C that the coated article of this example (Ex. 1) further demonstrates a reflected color b*<5, <2, or <0, for all thickness scaling factors from 80% to 100% and for all viewing angles from 0 to 50 degrees. These results also demonstrate that the coated article of this example (Ex. 1) has a combined reflected color (a*+b*)<10, <5 or <4, for all thickness scaling factors from 70% to 100%, for all viewing angles from 0 to 90 degrees. In addition, the results in Table 2 and FIGS. 11A-11C further demonstrate that the coated article of this example (Ex. 1) is indicative of a coated article having any of the foregoing photopic reflectance and reflected color values with a major surface having at least one flat or planar portion with 100% coating thickness, the flat or planar portion having a photopic average transmittance of >90%, or >93%, and a near-normal incidence transmitted color having −2<b*<2 and −1<a*<1.

TABLE 2

| | | Ex. 1, Coated Glass Article | |
| Layer | Material | Refractive index @ 550 nm | Layer thickness (nm) |
| --- | --- | --- | --- |
| N/A | Air | 1 | N/A |
| 1 | SiO$_2$ | 1.48 | 112.4 |
| 2 | Si$_3$N$_4$ | 2.01 | 145.8 |
| 3 | SiO$_2$ | 1.48 | 45.0 |
| 4 | Si$_3$N$_4$ | 2.01 | 19.1 |
| 5 | SiO$_2$ | 1.48 | 121.5 |
| 6 | Si$_3$N$_4$ | 2.01 | 11.7 |
| 7 | SiO$_2$ | 1.48 | 60.6 |
| 8 | Si$_3$N$_4$ | 2.01 | 31.9 |
| 9 | SiO$_2$ | 1.48 | 17.6 |
| 10 | SiON | 1.94 | 2000 |
| 11 | SiO$_2$ | 1.48 | 7.1 |
| 12 | SiON | 1.94 | 54.9 |
| 13 | SiO$_2$ | 1.48 | 23.8 |
| 14 | SiON | 1.94 | 39.3 |
| 15 | SiO$_2$ | 1.48 | 46.3 |
| 16 | SiON | 1.94 | 22.1 |
| 17 | SiO$_2$ | 1.48 | 64.3 |
| 18 | SiON | 1.94 | 8.7 |
| 19 | SiO$_2$ | 1.48 | 25.0 |
| Substrate | Glass - borosilicate | 1.52 | 1.0 mm |

Example 2

Figure 12A:
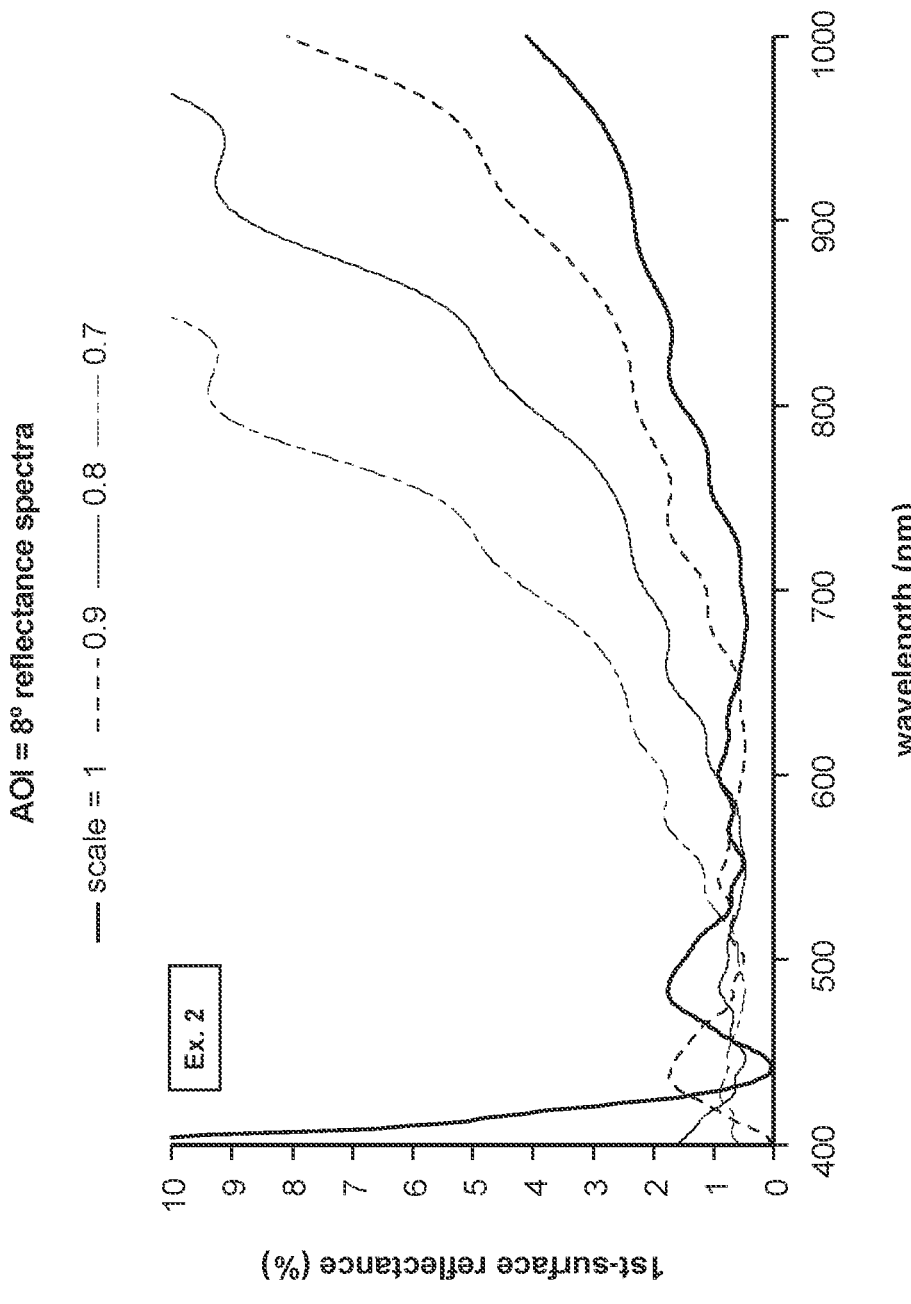
FIG. 12A is a plot of first-surface phototopic reflectance v. wavelength at a near-normal light incidence angle (8 degrees) for an exemplary optical coating of the disclosure at four optical coating thickness scaling factor values.
Figure 12B:
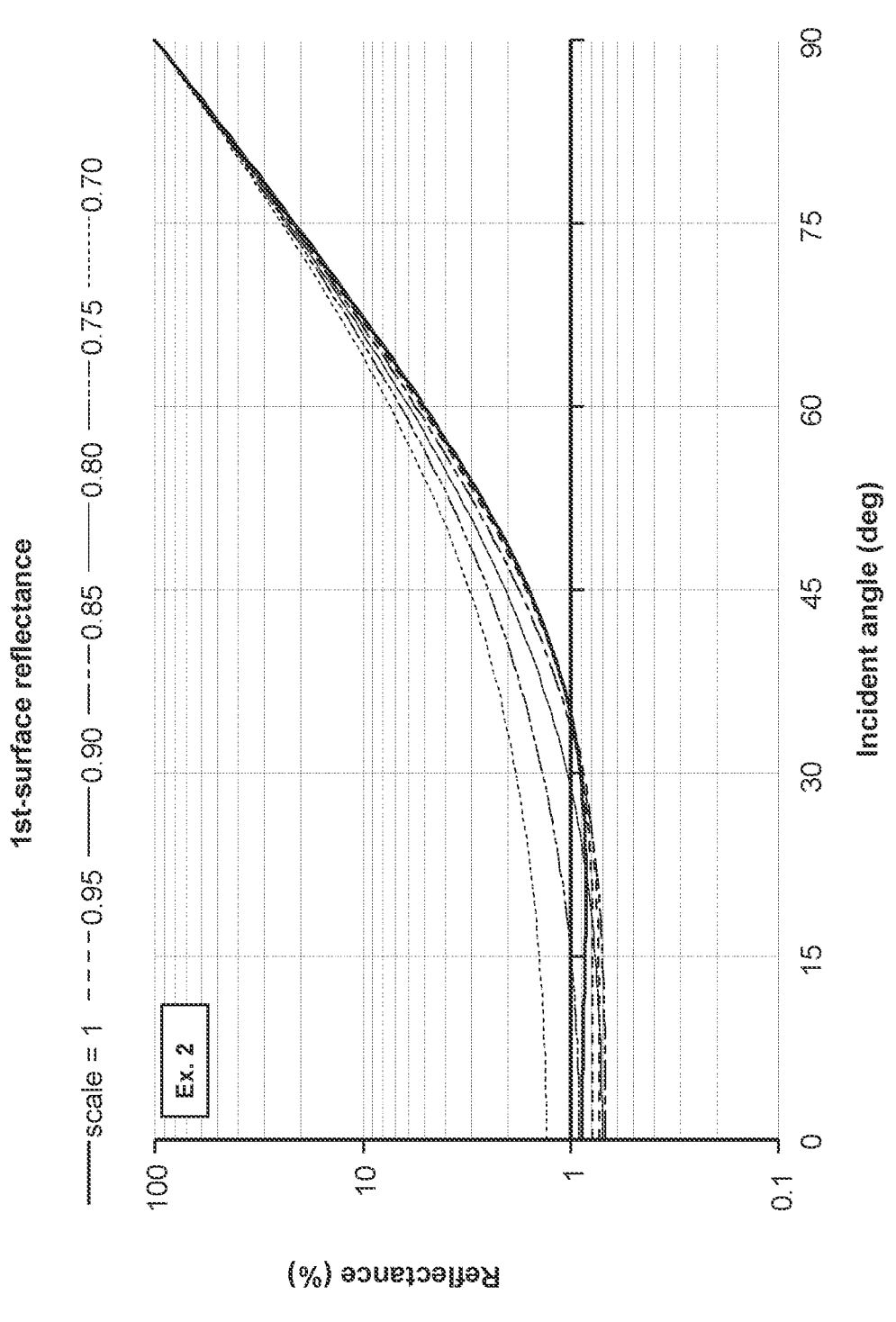
FIG. 12B is a plot of first-surface photopic average reflectance v. incident light (viewing) angle for the exemplary optical coating of FIG. 12A at seven optical coating thickness scaling factor values.
Figure 12C:
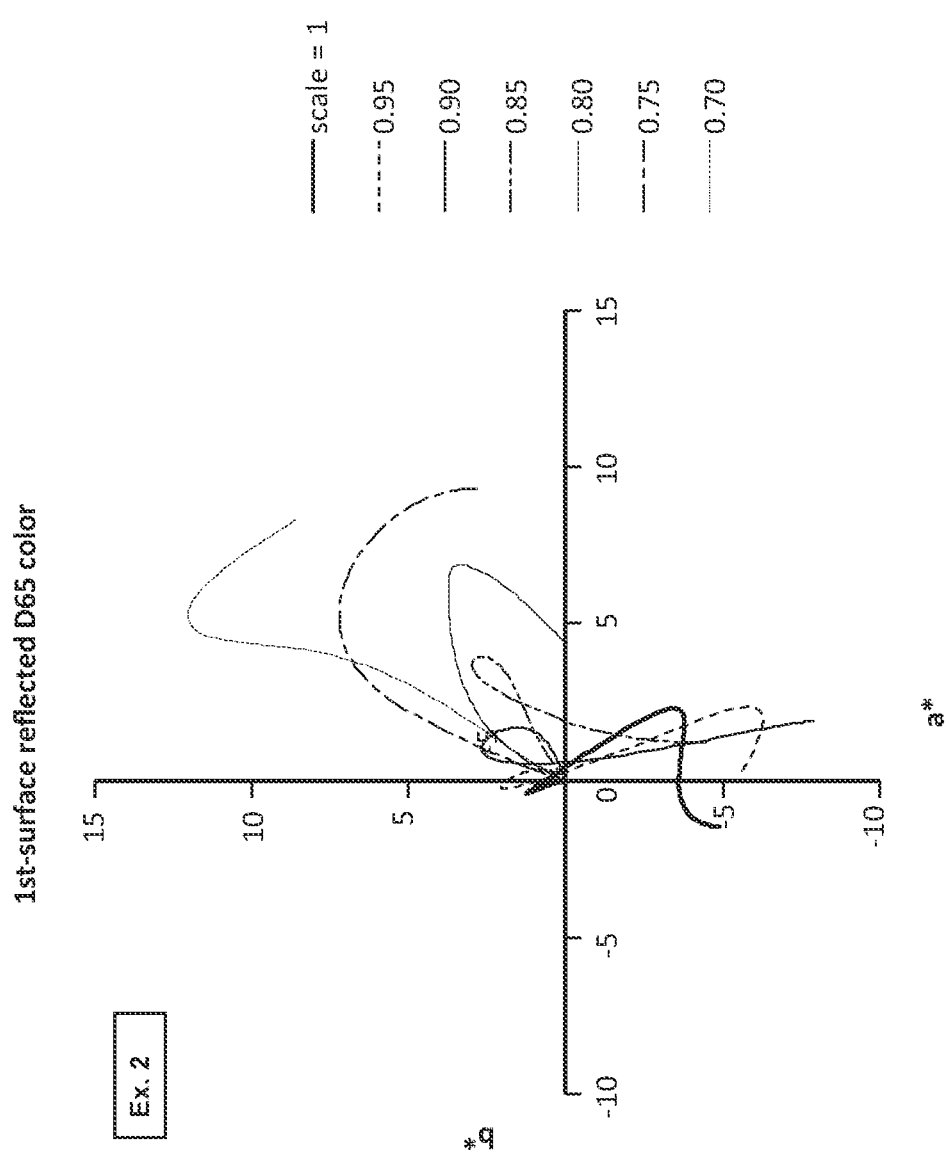
FIG. 12C is a plot of first-surface reflected color with a D65 illuminant for all viewing angles from 0 to 90 degrees for the exemplary optical coating of FIG. 12A at seven optical coating thickness scaling factor values.

A planar glass substrate was coated with the exemplary coating of Table 3 below, designated Ex. 2, according to the principles of the disclosure. Optical properties of the Ex. 2 coated article are shown in FIGS. 12A-12C. In particular, FIG. 12A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 12B is a plot of first-surface photopic average reflectance v. incident light (viewing) angle at seven optical coating thickness scaling factor values, 1, 0.95, 0.9, 0.85, 0.80, 0.75 and 0.7, each of which corresponds to part surface angles of 0 degrees, about 25 degrees, about 35 degrees, about 43 degrees, about 50 degrees, about 55 degrees and about 60 degrees, respectively (see FIG. 9). Further, FIG. 12C is a plot of first-surface reflected color with a D65 illuminant for all viewing angles from 0 to 90 degrees at the seven optical coating thickness scaling factor values employed in FIG. 12B.

As is evident from Table 3 and FIGS. 12A-12C, the exemplary coated article of this example (Ex. 2) has a single-surface photopic average reflectance of less than 1% at 100% coating thickness, as well as for all coating thickness scaling factors from 80% to 100%. Ex. 2 also demonstrates these reflectance values for all thickness scaling factors from 80% to 100% and for all incident light (viewing) angles from 0 (normal) to 25 degrees. Ex. 2 also demonstrates a first-surface reflectance of less than 3% for all wavelengths from 425 nm to 670 nm (i.e., a maximum reflectance in this wavelength range) at normal incidence for all thickness scaling factors from 70% to 100%. Ex. 2 also exhibits a first-surface reflectance of less than 3% at 100% thickness for all wavelengths from 425 nm to 950 nm.

As is also evident from Table 3 and FIGS. 12A-12C, the coated article of this example (Ex. 2) further demonstrates a first-surface reflected color at normal incidence that has b*<5, or <1, for all thickness scaling factors from 80% to 100%. Ex. 2 also demonstrates a reflected color b*<5 for thickness scaling factors from 80% to 100% for all viewing angles from 0 to 90 degrees.

It is also evident from Table 3 and FIGS. 12A-12C that the coated article of this example (Ex. 2) further demonstrates a reflected color b*<0, for all thickness scaling factors from 85% to 100% and for all viewing angles from 0 to 25 degrees. These results also demonstrate that the coated article of this example (Ex. 2) has a combined reflected color (a*+b*)<10, or <7, for all thickness scaling factors from 85% to 100%, for all viewing angles from 0 to 90 degrees. It is also evident from these results that the coated article of this example (Ex. 2) exhibits an absolute first-surface reflected color shift (i.e., square root of (a*$^2$+b*$^2$))<10, or <8.5, for all thickness scaling factors from 80% to 100% and for all viewing angles from 0 to 90 degrees. In addition, the results in Table 3 and FIGS. 12A-12C further demonstrate that the coated article of this example (Ex. 2) is indicative of a coated article having any of the foregoing photopic reflectance and reflected color values with a major surface having at least one flat or planar portion with 100% coating thickness, the flat or planar portion having a photopic average transmittance of >90%, or >93%, and a near-normal incidence transmitted color having −2<b*<2 and −1<a*<1.

TABLE 3

| | | Ex. 2, Coated Glass Article | |
| Layer | Material | Refractive index @ 550 nm | Layer thickness (nm) |
| --- | --- | --- | --- |
| N/A | Air | 1 | N/A |
| 1 | SiO$_2$ | 1.48 | 94.1 |
| 2 | Si$_3$N$_4$ | 2.01 | 151.85 |
| 3 | SiO$_2$ | 1.48 | 35.78 |

TABLE 3-continued

| | Ex. 2, Coated Glass Article | | |
| --- | --- | --- | --- |
| Layer | Material | Refractive index @ 550 nm | Layer thickness (nm) |
| 4 | $Si_3N_4$ | 2.01 | 27.78 |
| 5 | $SiO_2$ | 1.48 | 51.83 |
| 6 | $Si_3N_4$ | 2.01 | 23.16 |
| 7 | $SiO_2$ | 1.48 | 50.08 |
| 8 | $Si_3N_4$ | 2.01 | 38.68 |
| 9 | $SiO_2$ | 1.48 | 24.58 |
| 10 | SiON | 1.94 | 2000 |
| 11 | $SiO_2$ | 1.48 | 8 |
| 12 | SiON | 1.94 | 56.09 |
| 13 | $SiO_2$ | 1.48 | 26.68 |
| 14 | SiON | 1.94 | 39.32 |
| 15 | $SiO_2$ | 1.48 | 50.82 |
| 16 | SiON | 1.94 | 21.57 |
| 17 | $SiO_2$ | 1.48 | 67.12 |
| 18 | SiON | 1.94 | 8.14 |
| 19 | $SiO_2$ | 1.48 | 20 |
| Substrate | Glass - Corning ® Gorilla ® Glass 3 | 1.51 | 1.0 mm |

Example 3

Figure 13A:
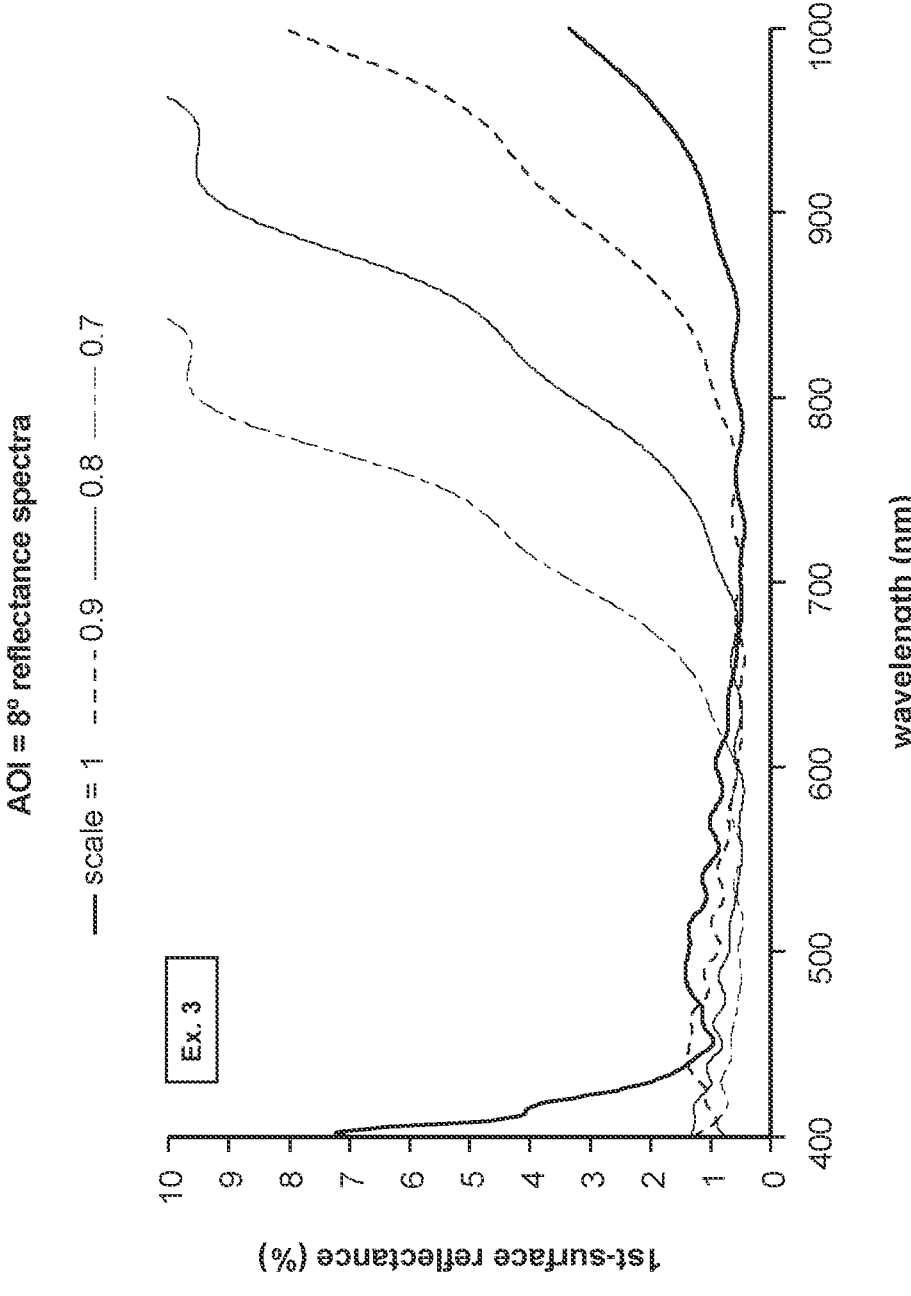
FIG. 13A is a plot of first-surface phototopic reflectance v. wavelength at a near-normal light incidence angle (8 degrees) for an exemplary optical coating of the disclosure at four optical coating thickness scaling factor values.
Figure 13B:
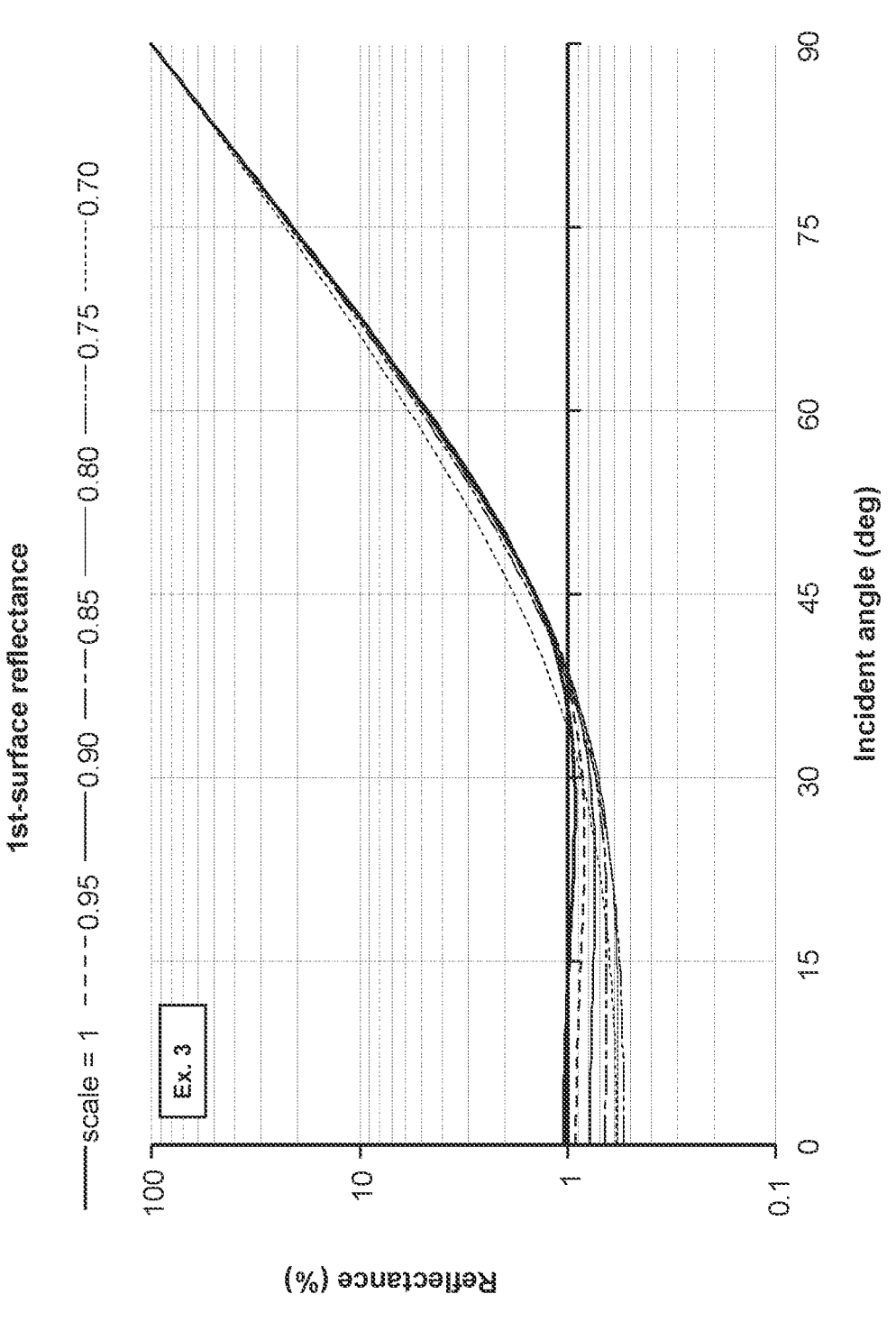
FIG. 13B is a plot of first-surface photopic average reflectance v. incident light (viewing) angle for the exemplary optical coating of FIG. 13A at seven optical coating thickness scaling factor values.
Figure 13C:
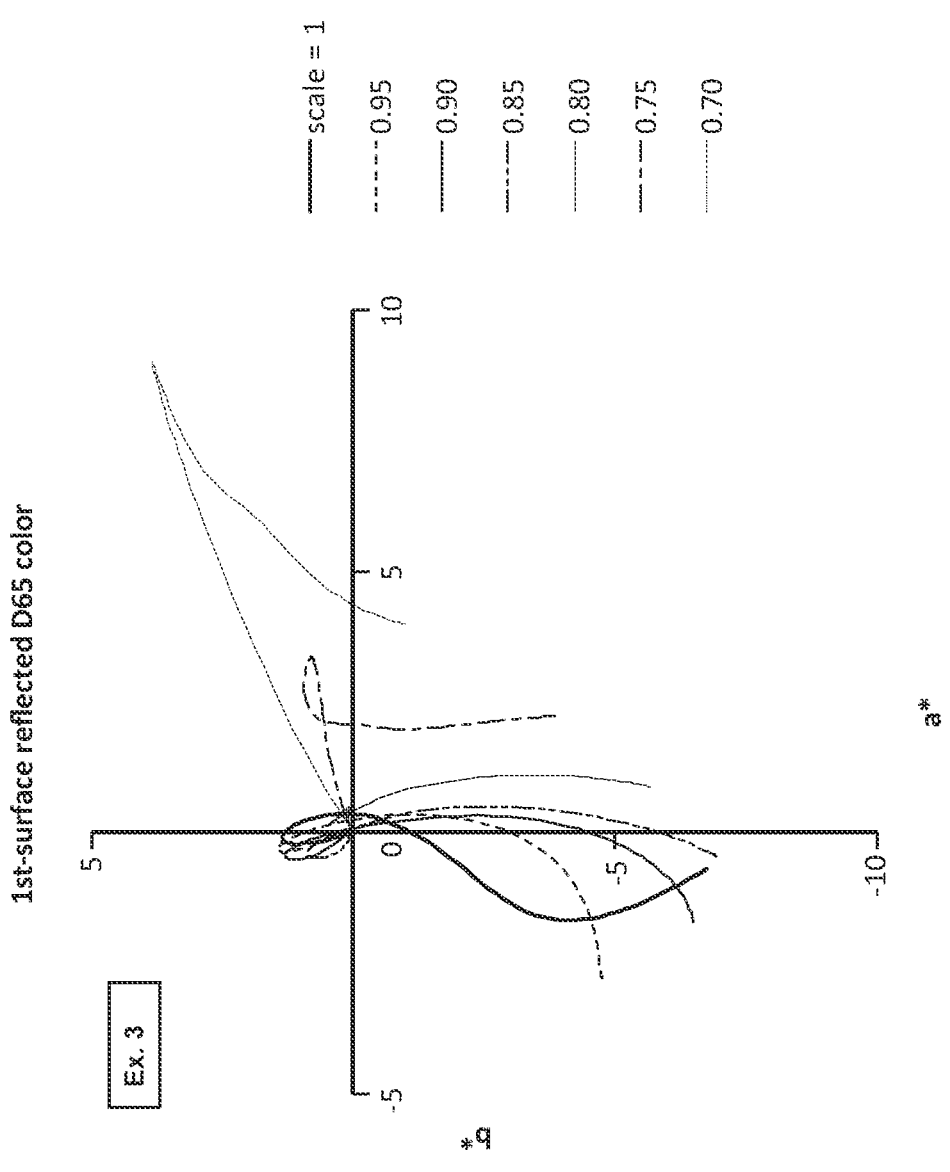
FIG. 13C is a plot of first-surface reflected color with a D65 illuminant for all viewing angles from 0 to 90 degrees for the exemplary optical coating of FIG. 13A at seven optical coating thickness scaling factor values.

A planar glass substrate was coated with the exemplary coating of Table 4 below, designated Ex. 3, according to the principles of the disclosure. Optical properties of the Ex. 3 coated article are shown in FIGS. 13A-13C. In particular, FIG. 13A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 13B is a plot of first-surface photopic average reflectance v. incident light (viewing) angle at seven optical coating thickness scaling factor values, 1, 0.95, 0.9, 0.85, 0.80, 0.75 and 0.7, each of which corresponds to part surface angles of 0 degrees, about 25 degrees, about 35 degrees, about 43 degrees, about 50 degrees, about 55 degrees and about 60 degrees, respectively (see FIG. 9). Further, FIG. 13C is a plot of first-surface reflected color with a D65 illuminant for all viewing angles from 0 to 90 degrees at the seven optical coating thickness scaling factor values employed in FIG. 13B.

As is evident from Table 4 and FIGS. 13A-13C, the exemplary coated article of this example (Ex. 3) has a single-surface photopic average reflectance of less than 1.2%, or even less than 1.1%, at 100% coating thickness, as well as for all coating thickness scaling factors from 80% to 100%, or even from 70% to 100%. Ex. 3 also demonstrates these reflectance values for all thickness scaling factors from 80% to 100%, or even from 70% to 100%, and for all incident light (viewing) angles from 0 (normal) to 35 degrees. Ex. 3 also demonstrates a first-surface reflectance of less than 2% for all wavelengths from 430 nm to 670 nm (i.e., a maximum reflectance in this wavelength range) at normal incidence for all thickness scaling factors from 70% to 100%. Ex. 3 also exhibits a first-surface reflectance of less than 2% at 100% thickness for all wavelengths from 430 nm to 950 nm.

As is also evident from Table 4 and FIGS. 13A-13C, the coated article of this example (Ex. 3) further demonstrates a first-surface reflected color at normal incidence that has b*<5, <1, or <0 for all thickness scaling factors from 70% to 100%. Ex. 3 also demonstrates a reflected color −10<b*<2 and/or −5<a*<5, for all thickness scaling factors from 75% to 100% for all viewing angles from 0 to 90 degrees.

It is also evident from Table 4 and FIGS. 13A-13C that the coated article of this example (Ex. 3) further demonstrates a combined reflected color (a*+b*)<10, <8, or <5, for all thickness scaling factors from 75% to 100%, for all viewing angles from 0 to 90 degrees. It is also evident from these results that the coated article of this example (Ex. 3) exhibits an absolute first-surface reflected color shift (i.e., square root of $(a^{*2}+b^{*2})$)<10, or <8, for all thickness scaling factors from 75% to 100% and for all viewing angles from 0 to 90 degrees. In addition, the results in Table 4 and FIGS. 13A-13C further demonstrate that the coated article of this example (Ex. 3) is indicative of a coated article having any of the foregoing photopic reflectance and reflected color values with a major surface having at least one flat or planar portion with 100% coating thickness, the flat or planar portion having a photopic average transmittance of >90%, or >93%, and a near-normal incidence transmitted color having −2<b*<2 and −1<a*<1.

TABLE 4

| | Ex. 3, Coated Glass Article | | |
| --- | --- | --- | --- |
| Layer | Material | Refractive index @ 550 nm | Layer thickness (nm) |
| N/A | Air | 1 | N/A |
| 1 | $SiO_2$ | 1.48 | 103.22 |
| 2 | $Si_3N_4$ | 2.01 | 150.91 |
| 3 | $SiO_2$ | 1.48 | 40.52 |
| 4 | $Si_3N_4$ | 2.01 | 25.78 |
| 5 | $SiO_2$ | 1.48 | 68.3 |
| 6 | $Si_3N_4$ | 2.01 | 23.8 |
| 7 | $SiO_2$ | 1.48 | 44.04 |
| 8 | $Si_3N_4$ | 2.01 | 37.24 |
| 9 | $SiO_2$ | 1.48 | 15.85 |
| 10 | SiON | 1.94 | 2000 |
| 11 | $SiO_2$ | 1.48 | 8 |
| 12 | SiON | 1.94 | 56.09 |
| 13 | $SiO_2$ | 1.48 | 26.68 |
| 14 | SiON | 1.94 | 39.32 |
| 15 | $SiO_2$ | 1.48 | 50.82 |
| 16 | SiON | 1.94 | 21.57 |
| 17 | $SiO_2$ | 1.48 | 67.12 |
| 18 | SiON | 1.94 | 8.14 |
| 19 | $SiO_2$ | 1.48 | 20 |
| Substrate | Glass - Corning ® Gorilla ® Glass 3 | 1.51 | 1.0 mm |

Referring again to the Comparative Example, Example 1 and Example 3, each of the coated articles of these examples (i.e., Comp. Ex. 1, Ex. 1 and Ex. 3) are characterized by Berkovich indentation hardness values >12 GPa at an indentation depth of 100 nm or more, and >14 GPa at an indentation depth of 500 nm or greater. Specific results from hardness testing of the samples of the Comparative Example, Example 1 and Example 3 are shown below in Table 5.

TABLE 5

| Measured Hardness Values from Comparative Ex. 1, Ex. 1 and Ex. 3 | | | |
|---|---|---|---|
| | Berkovich Nanoindentation Hardness (GPa) | | |
| Coated Article Designs | 100 nm depth | 500 nm depth | Max hardness |
| Ex. 1 | 12.4 | 14.3 | 15.0 |
| Ex. 3 | 13.0 | 15.5 | 16.0 |
| Comp. Ex. 1 | 13.5 | 17.7 | 17.9 |

Example 4

Figure 14A:
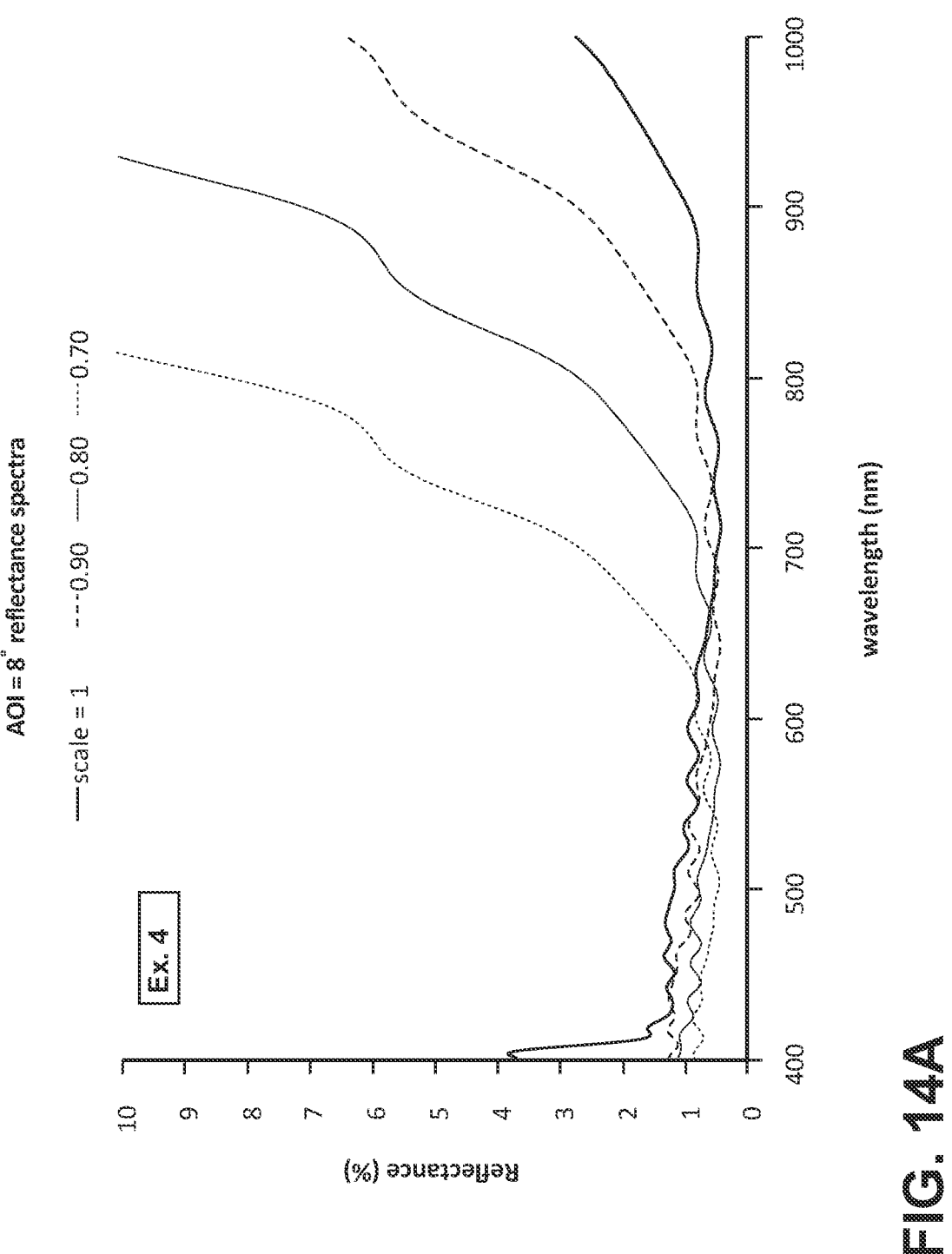
FIG. 14A is a plot of first-surface phototopic reflectance v. wavelength at a near-normal light incidence angle (8 degrees) for an exemplary optical coating of the disclosure at four optical coating thickness scaling factor values.
Figure 14B:
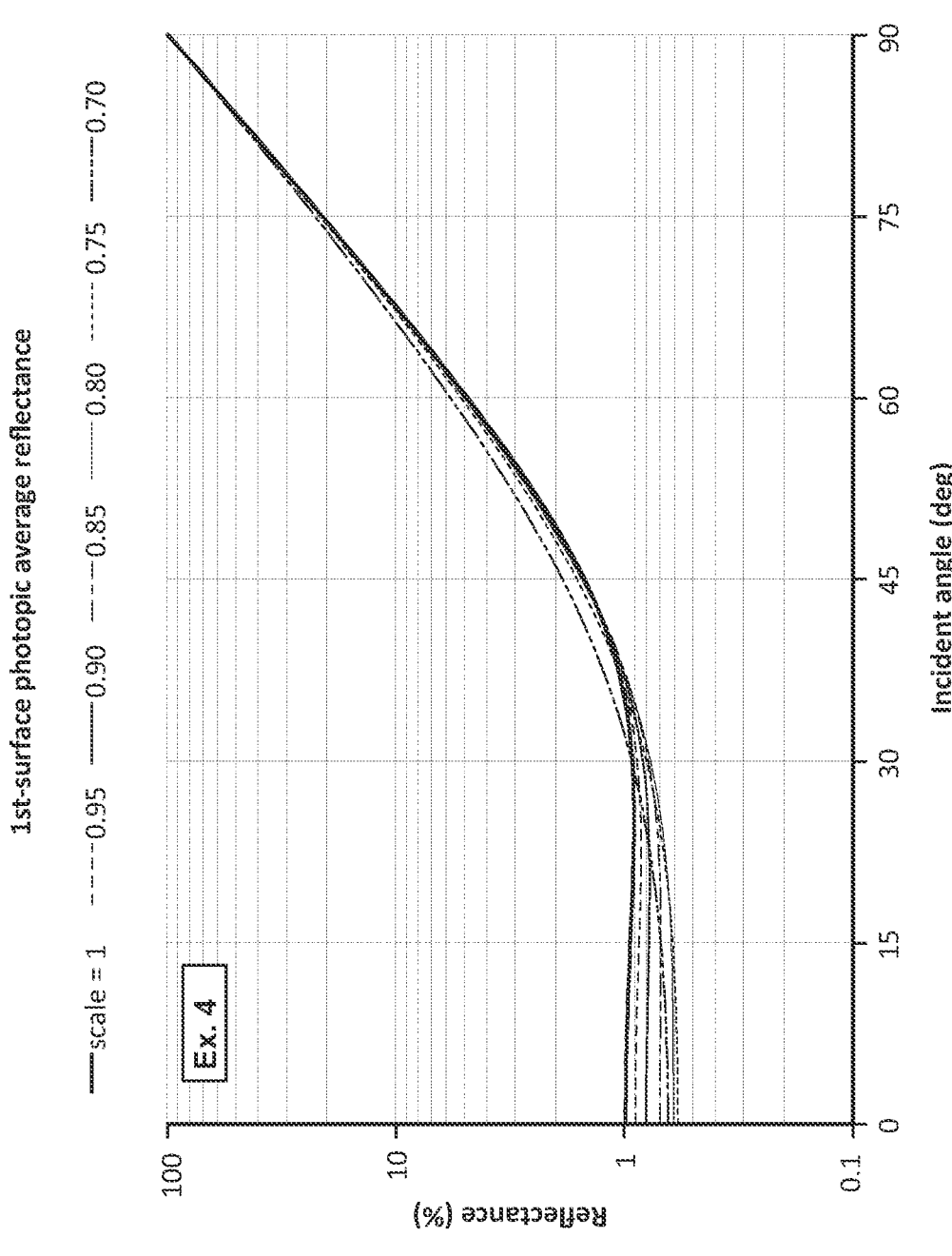
FIG. 14B is a plot of first-surface photopic average reflectance v. incident light (viewing) angle for the exemplary optical coating of FIG. 14A at seven optical coating thickness scaling factor values.
Figure 14C:
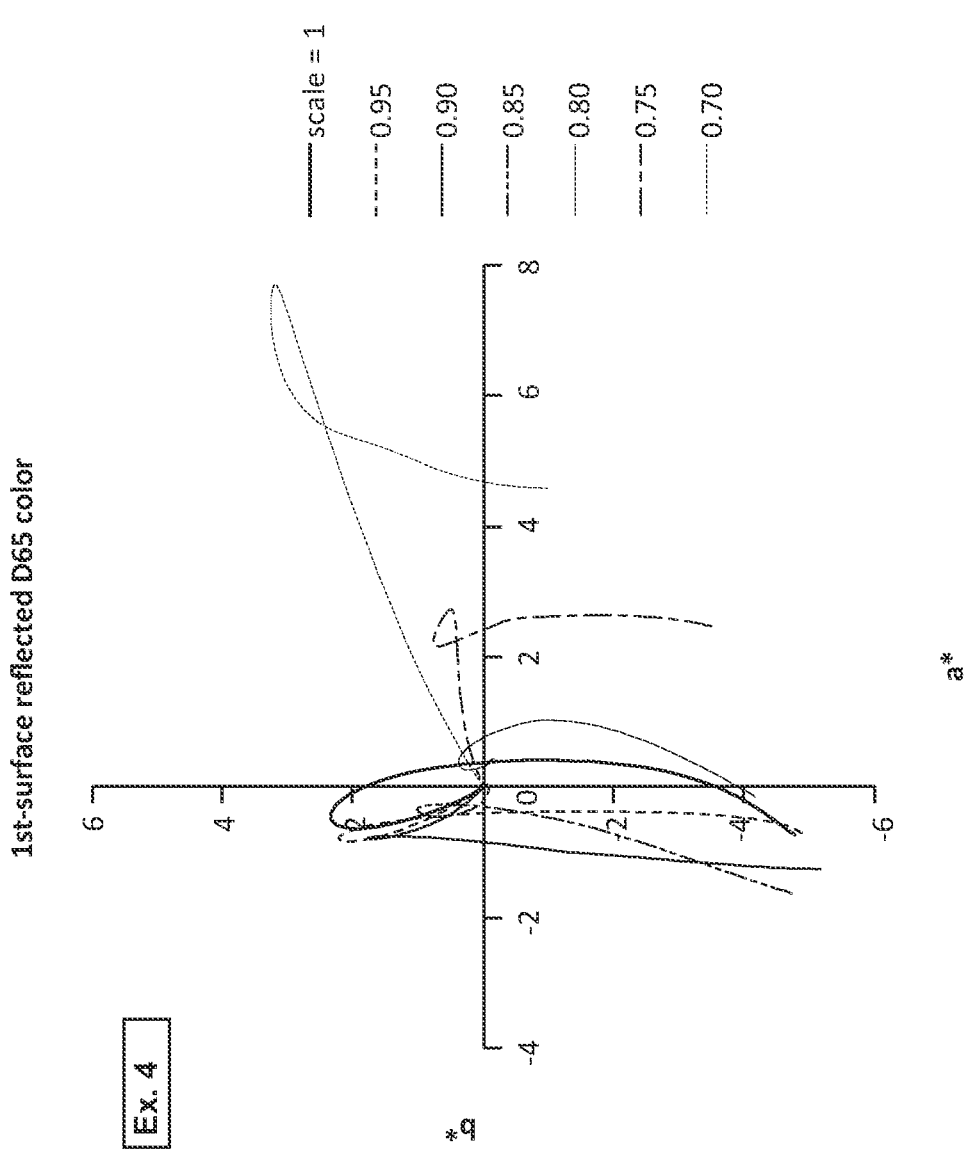
FIG. 14C is a plot of first-surface reflected color with a D65 illuminant for all viewing angles from 0 to 90 degrees for the exemplary optical coating of FIG. 14A at seven optical coating thickness scaling factor values.

A planar glass substrate was coated with the exemplary coating of Table 6 below, designated Ex. 4, according to the principles of the disclosure. In Ex. 4, the glass substrate is Corning® Gorilla® Glass 3. Optical properties of the Ex. 4 coated article are shown in FIGS. 14A-14C. In particular, FIG. 14A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 14B is a plot of first-surface photopic average reflectance v. incident light (viewing) angle at seven optical coating thickness scaling factor values, 1, 0.95, 0.9, 0.85, 0.80, 0.75 and 0.7, each of which corresponds to part surface angles of 0 degrees, about 25 degrees, about 35 degrees, about 43 degrees, about 50 degrees, about 55 degrees and about 60 degrees, respectively (see FIG. 9). Further, FIG. 14C is a plot of first-surface reflected color with a D65 illuminant for all viewing angles from 0 to 90 degrees at the seven optical coating thickness scaling factor values employed in FIG. 14B.

As is evident from Table 6 and FIGS. 14A-14C, the exemplary coated article of this example (Ex. 4) has a single-surface photopic average reflectance of less than 2% at 100% coating thickness, as well as for all coating thickness scaling factors from 70% to 100%. Further, Ex. 4 demonstrates a photopic average reflectance of less than 1.0% for all thickness scaling factors from 1.0 to 0.7 for all viewing angles from 0 to 30 degrees incidence. Ex. 4 also demonstrates these reflectance values for all thickness scaling factors from 70% to 100% and for all incident light (viewing) angles from 0 (normal) to 45 degrees. Ex. 4 also demonstrates a first-surface reflectance of less than 3% for all wavelengths from 410 nm to 700 nm (i.e., a maximum reflectance in this wavelength range) at normal incidence for all thickness scaling factors from 70% to 100%. Ex. 4 also exhibits a first-surface reflectance of less than 3% at 100% thickness for all wavelengths from 410 nm to 1000 nm.

As is also evident from Table 6 and FIG. 14C, the coated article of this example (Ex. 4) demonstrates a first-surface reflected color with minimal change or shifting as a function of viewing angle for both normal incidence and off-angle viewing for all thickness scaling factors from 1 down to 0.80. As is also evident from FIG. 14C, normal incidence color stays within a range of ±2, referenced to 100% thickness scaling, in both a* and b* for all thickness scaling factors in the range of 0.8 to 1.0 (b*=−5.5 to −2.5, a*=−1.8 to +0.2 for all scaling factors in this range, at normal incidence).

TABLE 6

| Ex. 4, Coated Glass Article | | | |
|---|---|---|---|
| Layer | Material | Refractive index @ 550 nm | Layer thickness (nm) |
| N/A | Air | 1 | N/A |
| 1 | $SiO_2$ | 1.48 | 102.3 |
| 2 | $Si_3N_4$ | 2.01 | 152.6 |
| 3 | $SiO_2$ | 1.48 | 44.65 |
| 4 | $Si_3N_4$ | 2.01 | 24.9 |
| 5 | $SiO_2$ | 1.48 | 81.1 |
| 6 | $Si_3N_4$ | 2.01 | 25.2 |
| 7 | $SiO_2$ | 1.48 | 46.3 |
| 8 | $Si_3N_4$ | 2.01 | 38.4 |
| 9 | $SiO_2$ | 1.48 | 14.6 |
| 10 | SiON | 1.94 | 2100 |
| 11 | $SiO_2$ | 1.48 | 8 |
| 12 | SiON | 1.94 | 56.1 |
| 13 | $SiO_2$ | 1.48 | 26.7 |
| 14 | SiON | 1.94 | 39.3 |
| 15 | $SiO_2$ | 1.48 | 50.8 |
| 16 | SiON | 1.94 | 21.6 |
| 17 | $SiO_2$ | 1.48 | 67.1 |
| 18 | SiON | 1.94 | 8.1 |
| 19 | $SiO_2$ | 1.48 | 20 |
| Substrate | Glass - Corning ® Gorilla ® Glass 3 | 1.51 | 1.0 mm |

Example 4A

According to this example, variants of the optical coating of the prior example (Ex. 4) were fabricated with the same configuration, except that the different thicknesses were employed for the scratch-resistant SiON layer (i.e., layer 10 in Table 6). In particular, three sets of optical coating samples were fabricated according to the principles of the disclosure according to Table 6, but with scratch-resistant coating thicknesses of 2000 nm (Ex. 4A), 1500 nm (Ex. 4B) and 1000 nm (Ex. 4C), respectively.

Optical and mechanical properties associated with the samples of this example were obtained and reported below in Table 6A. As is evident from Table 6A, the optical performance of the variants of Ex. 4 (i.e., from the prior example), denoted as Ex. 4A, 4B and 4C, are substantially overlapping, and generally agree with the modeled results for Ex. 4 depicted in FIGS. 14A-14C. The optical property ranges provided in Table 6A are measured results representing more than 10 fabricated samples for each sample group (i.e., Exs. 4A, 4B and 4C), with some amount of typical fabrication variation, as well as typical measurement variation.

With regard to the mechanical properties listed in Table 6A, the hardness values at an indentation depth of 500 nm show some reduction with decreasing thickness of the scratch-resistant layer (i.e., layer 10, which ranges from 2.0 μm, 1.5 μm, and 1.0 μm in this example), but still remains high at values of 15 GPa or greater. These hardness levels associated with a scratch-resistant layer within an optical coating have corresponded to high scratch and abrasion resistance measurement results. Based on these results, it is also believed that the maximum hardness levels of each of the coating designs in this example will remain fairly stable with coating thinning at curved or angled portions of articles employing them. This is believed to be due to the fact that while the hard layers (e.g., $Si_3N_4$ and SiON) are being thinned, the softer layers (SiO2) are being thinned as well when the coating is deposited on a curved or angled surface.

TABLE 6A

| | Exs. 4A, 4B and 4C, Coated Glass Articles | | |
|---|---|---|---|
| Optical Coating Example | Ex. 4A (same as Ex. 4, w/2.0 μm thick layer 10) | Ex. 4B (same as Ex. 4, w/1.5 μm thick layer 10) | Ex. 4C (same as Ex. 4, w/1.0 μm thick layer 10) |
| 1-side Reflectance | 0.99 to 1.23 | 0.97 to 1.13 | 0.79 to 0.95 |
| 2-side Reflectance | 4.77 to 5.05 | 4.75 to 4.86 | 4.63 to 4.70 |
| 2-side Transmittance | 94.20 to 94.37 | 94.09 to 94.38 | 94.20 to 94.42 |
| 2-side Reflected a* color | −1.09 to −0.64 | −0.88 to −0.26 | −0.35 to 0.10 |
| 2-side Reflected b* color | −1.46 to −1.08 | −1.52 to −0.99 | −1.45 to −0.84 |
| 2-side Transmitted a* color | 0.07 to 0.13 | 0.03 to 0.12 | −0.04 to 0.03 |
| 2-side Transmitted b* color | 0.52 to 0.63 | 0.79 to 0.94 | 0.91 to 1.04 |
| Berkovich Hardness @ 500 nm depth | 16.00 GPa | 15.65 Gpa | 15.09 GPa |

Figure 15:
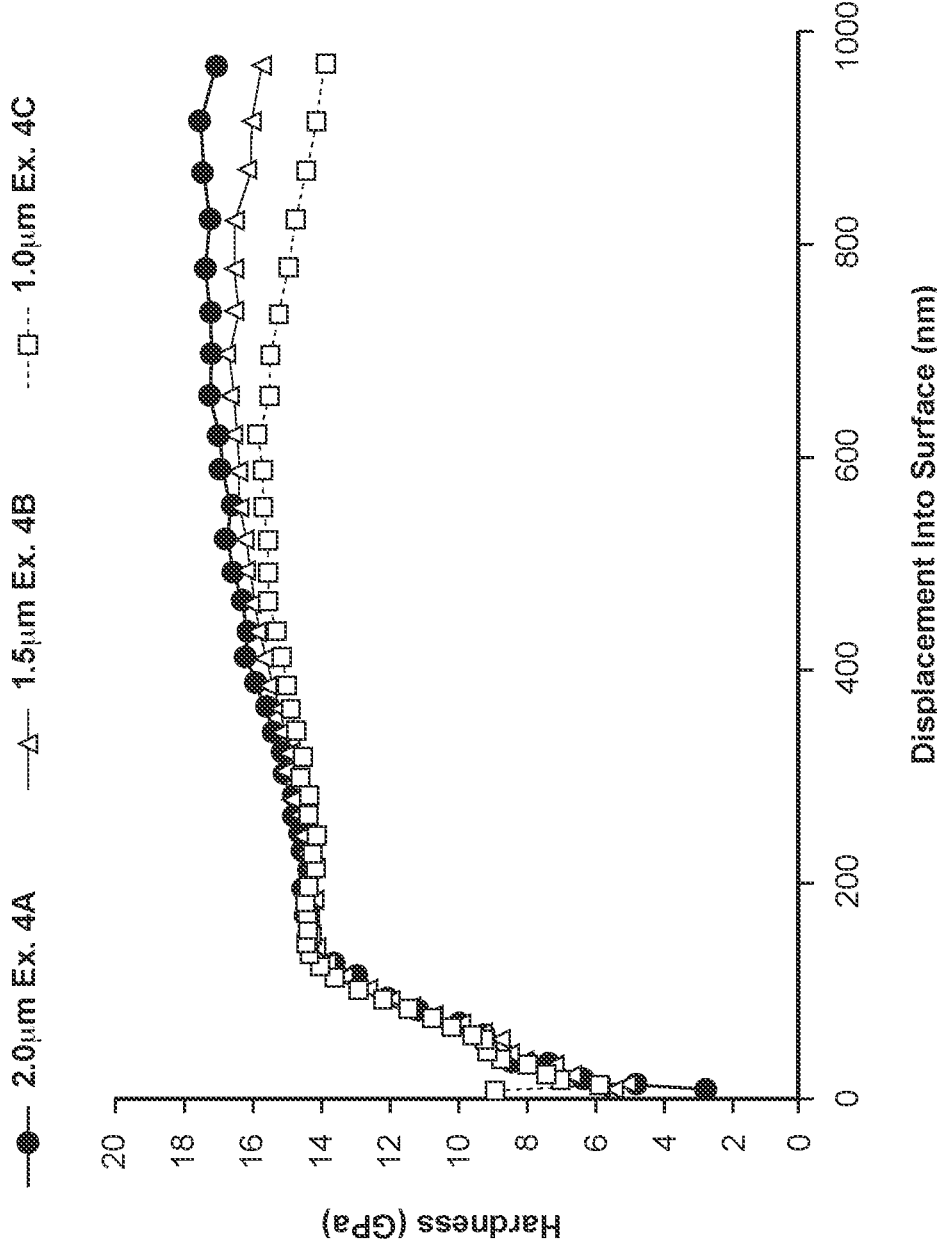
FIG. 15 is a plot of hardness (GPa) vs. indentation depth (nm) of three (3) variants of the exemplary optical coating depicted in FIGS. 14A-14C.

Referring now to FIG. 15, a plot of Berkovich hardness (GPa) vs. indentation depth (nm) of three (3) variants (Ex. 4A, 4B and 4C) of the exemplary optical coating depicted in FIGS. 14A-14C is provided. Further, the hardness data associated with indentation depths of 100 nm and 500 nm and the maximum observed hardness observed for each of the samples is reported below in Table 6B. As is evident from FIG. 15 and Table 6B, each of the sample groups exhibited comparable hardness property results, indicative of good optical coating hardness performance. For example, each of the sample groups (Exs. 4A-4C) exhibited a hardness of at least 12.5 GPa at an indentation depth of 100 nm, 15.5 GPa at an indentation depth of 500 nm, and a maximum hardness of at least 15.8 GPa.

TABLE 6B

| | Exs. 4A, 4B and 4C, Coated Glass Articles | | |
|---|---|---|---|
| | | Hardness (GPa) | |
| Optical Coating Example | 100 nm depth | 500 nm depth | Max |
| Ex. 4A (same as Ex. 4, w/2.0 μm thick layer 10) | 12.5 | 16.5 | 17.5 |
| Ex. 4B (same as Ex. 4, w/1.5 μm thick layer 10) | 12.5 | 16.1 | 16.7 |
| Ex. 4C (same as Ex. 4, w/1.0 μm thick layer 10) | 12.9 | 15.5 | 15.8 |

EXAMPLES

Figure 16A:
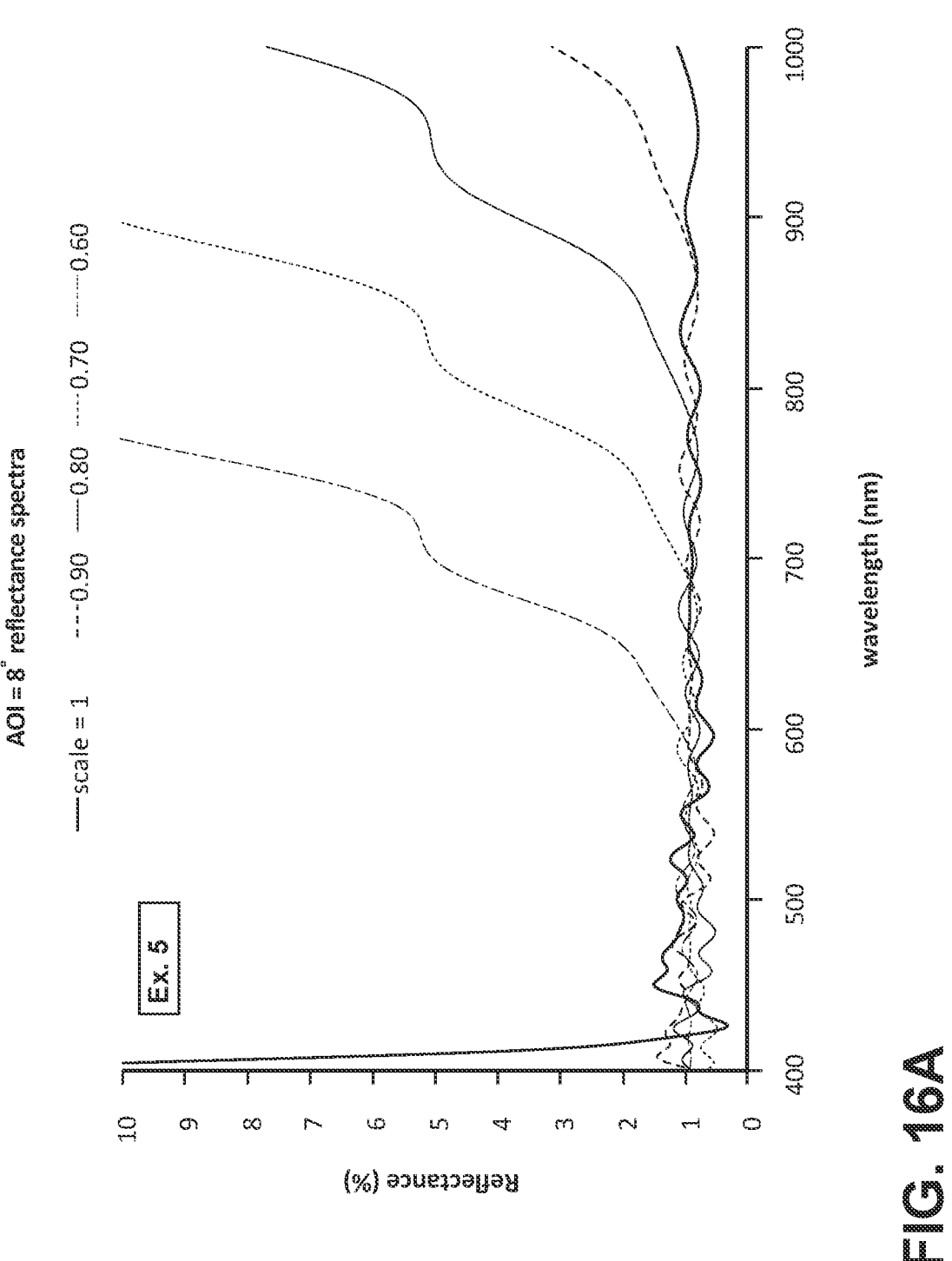
FIG. 16A is a plot of first-surface phototopic reflectance v. wavelength at a near-normal light incidence angle (8 degrees) for an exemplary optical coating of the disclosure at four optical coating thickness scaling factor values.
Figure 16B:
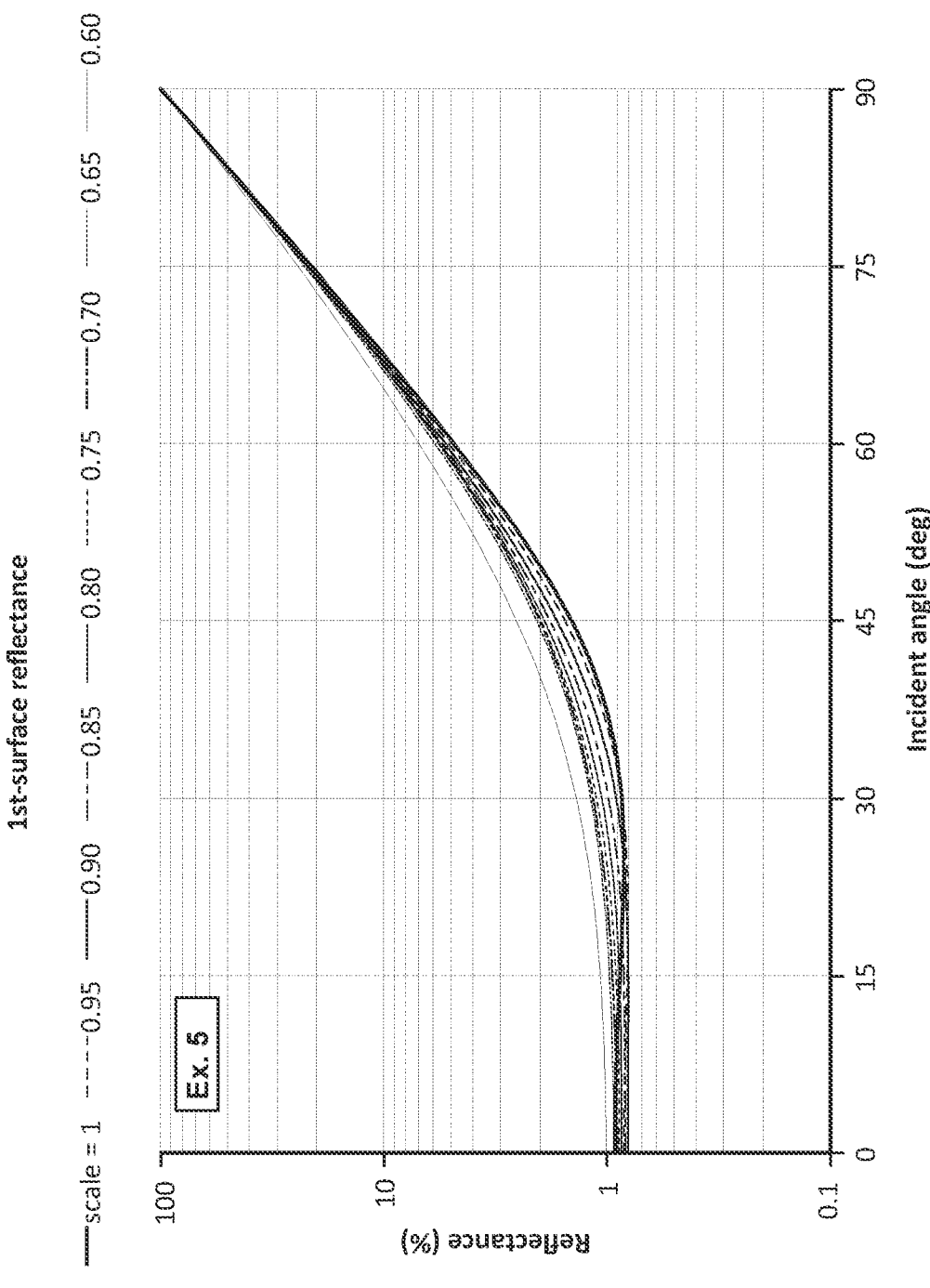
FIG. 16B is a plot of first-surface photopic average reflectance v. incident light (viewing) angle for the exemplary optical coating of FIG. 16A at nine optical coating thickness scaling factor values.
Figure 16C:
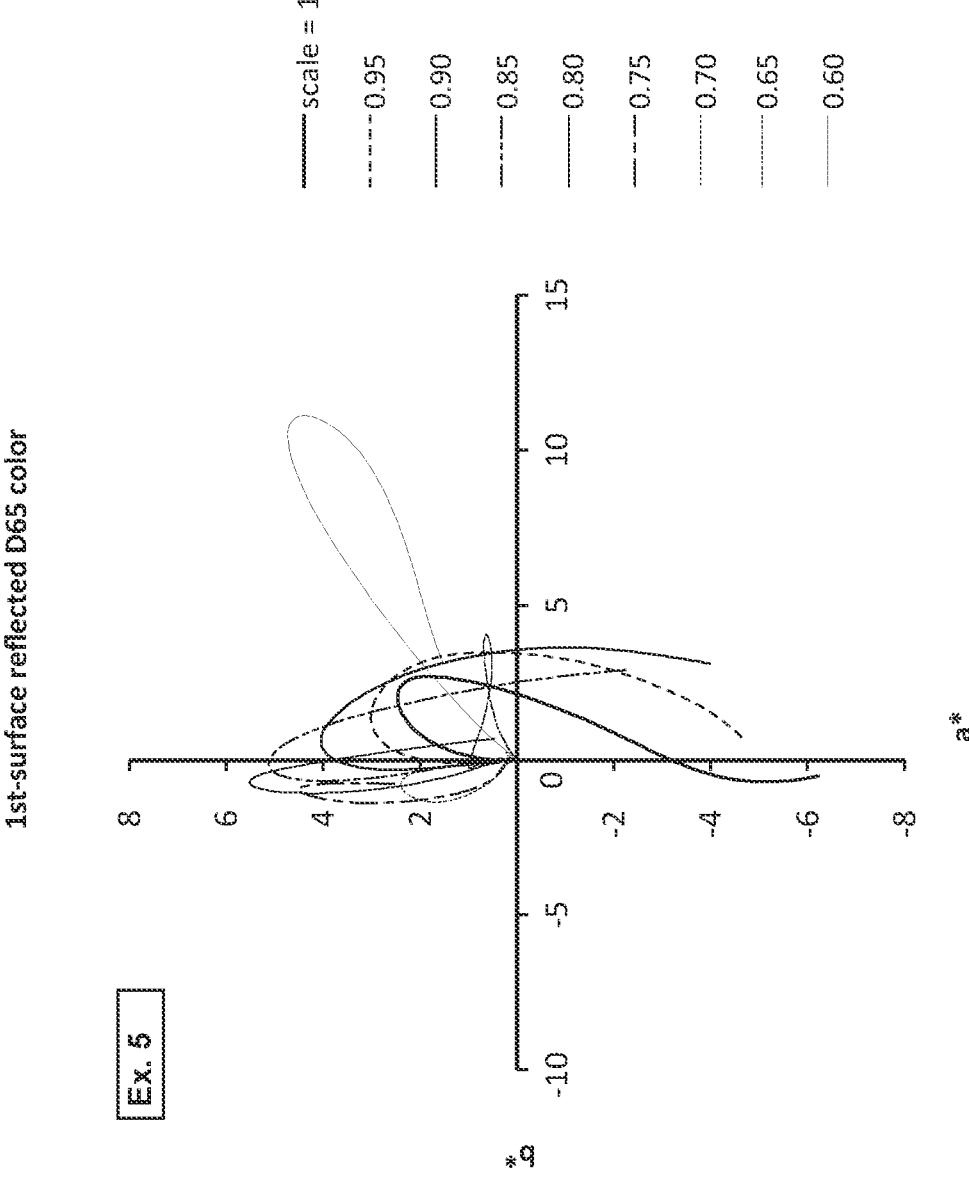
FIG. 16C is a plot of first-surface reflected color with a D65 illuminant for all viewing angles from 0 to 90 degrees for the exemplary optical coating of FIG. 16A at nine optical coating thickness scaling factor values.

A planar glass substrate was coated with the exemplary coating of Table 7 below, designated Ex. 5, according to the principles of the disclosure. In Ex. 5, the glass substrate is Corning® Gorilla® Glass 3. Optical properties of the Ex. 5 coated article are shown in FIGS. 16A-16C. In particular, FIG. 16A is a plot of first-surface phototopic reflectance v. wavelength at a near-normal light incidence angle (8 degrees) at four optical coating thickness scaling factor values, 1, 0.9, 0.8 and 0.7, each of which corresponds to part surface angles of 0 degrees, about 35 degrees, about 50 degrees and about 60 degrees, respectively (see FIG. 9). FIG. 16B is a plot of first-surface photopic average reflectance v. incident light (viewing) angle at nine optical coating thickness scaling factor values, 1, 0.95, 0.9, 0.85, 0.80, 0.75, 0.7, 0.65 and 0.6, each of which corresponds to part surface angles of 0 degrees, about 25 degrees, about 35 degrees, about 43 degrees, about 50 degrees, about 55 degrees, about 60 degrees, about 65 degrees, and about 70 degrees, respectively (see FIG. 9). Further, FIG. 16C is a plot of first-surface reflected color with a D65 illuminant for all viewing angles from 0 to 90 degrees at the nine optical coating thickness scaling factor values employed in FIG. 16B.

As is evident from Table 7 and FIG. 16A, the exemplary coated article of this example (Ex. 5) has a single-surface photopic maximum reflectance of less than 1.5% and a ~0.92% average photopic reflectance at 100% coating thickness for an extended bandwidth from 420 nm to beyond 1000 nm for a near-normal light incidence (8 degrees). With regard to FIG. 16B, a plot of first-surface photopic average reflectance v. incident light (viewing) angle is provided for the exemplary optical coating of this example (Ex. 5) at nine optical coating thickness scaling factor values. Notably, the photopic average reflectance is less than 1.0% for all thinning factors from 1.0 to 0.65 for all viewing angles from 0 to 20 degrees incidence. As is also evident from Table 7 and FIG. 16C, the coated article of this example (Ex. 5) demonstrates a first-surface reflected color with minimal change or shifting as a function of viewing angle for both normal incidence and off-angle viewing for all thickness scaling factors from 1 down to 0.60. All angles are within b*=±7 and a*=−2 to +12 (absolute color values) for all viewing angles and all thinning factors from 1.0 to 0.6.

TABLE 7

| | Ex. 5, Coated Glass Article | | |
|---|---|---|---|
| Layer | Material | Refractive index @ 550 nm | Layer thickness (nm) |
| N/A | Air | 1 | N/A |
| 1 | $SiO_2$ | 1.47 | 110.48 |
| 2 | $Si_3N_4$ | 2.07 | 46.67 |
| 3 | $SiO_2$ | 1.47 | 9.79 |
| 4 | $Si_3N_4$ | 2.07 | 101.68 |
| 5 | $SiO_2$ | 1.47 | 33.23 |
| 6 | $Si_3N_4$ | 2.07 | 35.52 |
| 7 | $SiO_2$ | 1.47 | 72.63 |
| 8 | $Si_3N_4$ | 2.07 | 28.27 |
| 9 | $SiO_2$ | 1.47 | 55.55 |
| 10 | $Si_3N_4$ | 2.07 | 38.83 |
| 11 | $SiO_2$ | 1.47 | 20.46 |
| 12 | SiON | 1.95 | 2000 |
| 13 | $SiO_2$ | 1.48 | 8.00 |
| 14 | SiON | 1.95 | 52.16 |
| 15 | $SiO_2$ | 1.48 | 23.11 |
| 16 | SiON | 1.95 | 36.08 |
| 17 | $SiO_2$ | 1.48 | 33.68 |
| 18 | SiON | 1.95 | 17.08 |
| 19 | $SiO_2$ | 1.48 | 34.62 |

TABLE 7-continued

Ex. 5, Coated Glass Article

| Layer | Material | Refractive index @ 550 nm | Layer thickness (nm) |
|-------|----------|----------------------------|----------------------|
| 20 | SiON | 1.95 | 13.32 |
| 21 | SiO$_2$ | 1.48 | 58.75 |
| 22 | SiON | 1.95 | 8.00 |
| 23 | SiO$_2$ | 1.48 | 25.00 |
| Substrate | Glass - Corning ® Gorilla ® Glass 3 | 1.51 | 1.0 mm |

Figures 17A, 17B:
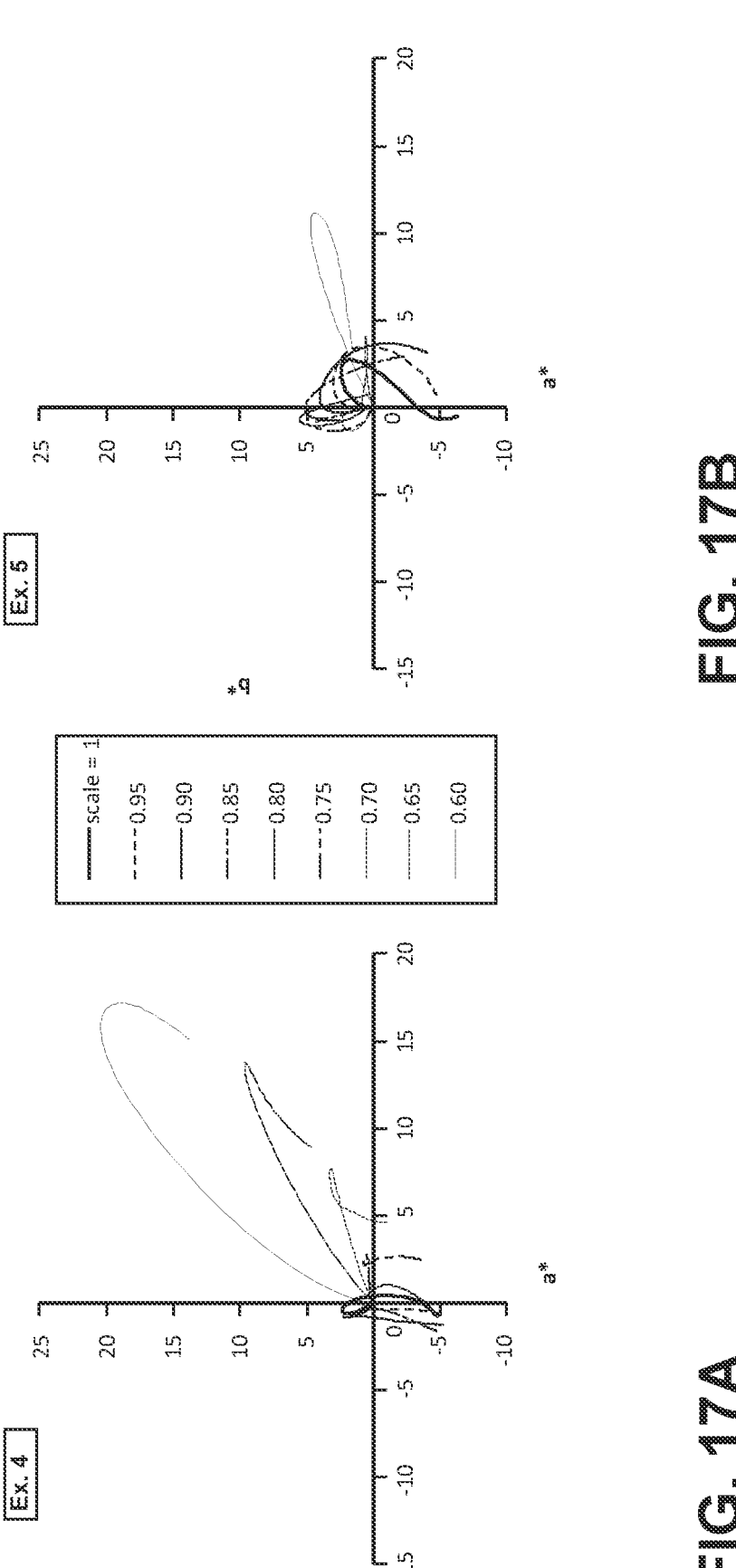
FIGS. 17A and 17B are plots of first-surface reflected color with a D65 illuminant for all viewing angles from 0 to 90 degrees for the exemplary optical coatings of the disclosure depicted in FIGS. 14C and 16C, respectively, at nine optical coating thickness scaling factor values.

Referring now to FIGS. 17A and 17B, plots are provided of first-surface reflected color with a D65 illuminant for all viewing angles from 0 to 90 degrees for the exemplary optical coatings of the disclosure depicted in FIGS. 14C and 16C (i.e., Exs. 4 and 5), respectively, at nine optical coating thickness scaling factor values from 1.0 to 0.6. Note that while the Ex. 5 design has a slightly larger range of variation in color than the Ex. 4 design at thinning factors from 1.0 to 0.75, the Ex. 5 design is significantly improved in color control for thinning factors from 0.7 to 0.6, thus enabling coating of articles with higher angles of part surface curvature (or features with angled surfaces). As such, the Ex. 4 design may be preferred for applications with part surface angles leading to coating thinning factors from 1.0 to 0.75, the Ex. 5 design may be preferred for applications with part surface angles leading to coating thinning factors from 0.7 to 0.6.

The various features described in the specification may be combined in any and all combinations, for example, as listed in the following embodiments.

Embodiment 1. A coated article comprising:

a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 60 degrees; and an optical coating disposed on at least the first portion and the second portion of the major surface, the optical coating forming an anti-reflective surface, wherein:

(a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; and (b) the coated article exhibits a single side maximum light reflectance of about 3% or less as measured at the anti-reflective surface at the first portion and the second portion of the substrate, wherein the single side maximum light reflectance of the first portion is measured at a first incident illumination angle relative to the first direction, wherein the first incident illumination angle comprises an angle in the range from about 0 degrees to about 45 degrees from the first direction, wherein the single side maximum light reflectance of the second portion is measured at two or more second incident illumination angles, each of the second incident illumination angles relative to a respective second direction of the plurality of second directions, wherein each of the second incident illumination angles comprises an angle in the range from about 0 degrees to about 45 degrees from the respective second direction, and further wherein the single side maximum light reflectance at the first portion is measured over an optical wavelength regime in a range of from about 425 nm to about 950 nm.

Embodiment 2. The coated article of embodiment 1, wherein the angle between the first direction and one of the second directions is in a range from about 10 degrees to about 20 degrees, and the angle between the first direction and another of the second directions is in a range from about 20 degrees to about 60 degrees.

Embodiment 3. The coated article of embodiment 1, wherein the angle between the first direction and one of the second directions is in a range from about 10 degrees to about 20 degrees, and the angle between the first direction and another of the second directions is in a range from about 40 degrees to about 60 degrees.

Embodiment 4. The coated article of any one of embodiments 1-3, wherein the optical coating comprises a first anti-reflective coating, a scratch-resistant layer over the first anti-reflective coating, and a second anti-reflective coating over the scratch-resistant layer which defines the anti-reflective surface, wherein the first anti-reflective coating comprises at least a low RI layer and a high RI layer, and the second anti-reflective coating comprises at least a low RI layer and a high RI layer.

Embodiment 5. The coated article of embodiment 4, wherein the at least a low RI layer in each of the first and the second anti-reflective coatings comprises silicon oxide, wherein the at least a high RI layer in the first anti-reflective coating comprises silicon oxynitride, wherein the at least a high RI layer in the second anti-reflective coating comprises silicon nitride, and further wherein the scratch-resistant layer comprises silicon oxynitride.

Embodiment 6. The coated article of embodiment 4 or embodiment 5, wherein the optical coating comprises a capping layer over the second anti-reflective coating, the capping layer comprising a low RI material.

Embodiment 7. The coated article of any one of embodiments 4-6, wherein each adjacent low RI layer and high RI layer in each of the first and second anti-reflective coatings, respectively, define a period, N, and further wherein N is from 2 to 12.

Embodiment 8. The coated article of any one of embodiments 4-7, wherein the total thickness of the optical coating is from about 2 μm to about 4 and the combined total thickness of the first anti-reflective coating and the second anti-reflective coatings is from about 500 nm to about 1000 nm.

Embodiment 9. The coating article of any one of embodiments 4-8, wherein the thickness of the scratch-resistant layer is from about 200 nm to about 3000 nm.

Embodiment 10. A coated article comprising:

a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 50 degrees; and an optical coating disposed on at least the first portion and the second portion of the major surface, the optical coating forming an anti-reflective surface, wherein:

(a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; and (b) the first surface reflected color of the coated article at the first portion and the second portion of the major surface is b*<about 5, as measured by the reflectance color coordinates in the (L*, a*, b*) colorimetry system under an International Commission on Illumination D65 illuminant, wherein the reflected color at the first portion is measured at a first incident illumination angle relative to the first direction, wherein the first incident illumination angle comprises an angle in the range from about 0 degrees to about 90 degrees from the first direction, wherein the reflected color at the second portion is measured at two or more second incident illumination angles, each of the second incident illumination angles relative to a respective second direction of the plurality of second directions, wherein each of the second incident illumination angles comprises an angle in a range from about 0 degrees to about 90 degrees from the respective second direction and the second illumination angles differ from one another by at least 10 degrees.

Embodiment 11. The coated article of embodiment 10, wherein the angle between the first direction and one of the second directions is in a range from about 10 degrees to about 20 degrees, and the angle between the first direction and another of the second directions is in a range from about 20 degrees to about 60 degrees.

Embodiment 12. The coated article of embodiment 10, wherein the angle between the first direction and one of the second directions is in a range from about 10 degrees to about 20 degrees, and the angle between the first direction and another of the second directions is in a range from about 40 degrees to about 60 degrees.

Embodiment 13. The coated article of any one of embodiments 10-12, wherein the reflected color of the coated article at the first portion and the second portion of the major surface is b*<about 3, as measured by the reflectance color coordinates in the (L*, a*, b*) colorimetry system under an International Commission on Illumination D65 illuminant.

Embodiment 14. The coated article of any one of embodiments 10-12, wherein the reflected color of the coated article at the first portion and the second portion of the major surface is (a*+b*)<about 10, as measured by the reflectance color coordinates in the (L*, a*, b*) colorimetry system under an International Commission on Illumination D65 illuminant.

Embodiment 15. The coated article of any one of embodiments 10-14, wherein the optical coating comprises a first anti-reflective coating, a scratch-resistant layer over the first anti-reflective coating, and a second anti-reflective coating over the scratch-resistant layer which defines the anti-reflective surface, wherein the first anti-reflective coating comprises at least a low RI layer and a high RI layer, and the second anti-reflective coating comprises at least a low RI layer and a high RI layer.

Embodiment 16. The coated article of embodiment 15, wherein the at least a low RI layer in each of the first and the second anti-reflective coatings comprises silicon oxide, wherein the at least a high RI layer in the first anti-reflective coating comprises silicon oxynitride, wherein the at least a high RI layer in the second anti-reflective coating comprises silicon nitride, and further wherein the scratch-resistant layer comprises silicon oxynitride.

Embodiment 17. The coated article of embodiment 15 or embodiment 16, wherein the coated article exhibits at the first portion of the substrate and at the second portion of the substrate a hardness of about 11 GPa or greater at an indentation depth of about 100 nm or greater as measured on the anti-reflective surface by a Berkovich Indenter Hardness Test.

Embodiment 18. The coated article of any one of embodiments 10-12, wherein the reflected color of the coated article at the first portion and the second portion of the major surface is b*<about 5, wherein the reflected color at the first portion is measured at a plurality of first incident illumination angles relative to the first direction, the plurality of first incident illumination angles comprising an illumination angle from 0 degrees to 20 degrees and an illumination angle from 55 degrees to 85 degrees, and further wherein the reflected color at the second portion is measured at a plurality of second incident illumination angles relative to the second directions, the plurality of second incident illumination angles comprising an illumination angle from 0 degrees to 20 degrees and an illumination angle from 55 degrees to 85 degrees.

Embodiment 19. The coated article of any one of embodiments 15-18, wherein the total thickness of the optical coating is from about 2 μm to about 4 and the combined total thickness of the first anti-reflective coating and the second anti-reflective coatings is from about 500 nm to about 1000 nm.

Embodiment 20. The coating article of any one of embodiments 15-19, wherein the thickness of the scratch-resistant layer is from about 200 nm to about 3000 nm.

Embodiment 21. A coated article comprising:

a substrate having a major surface, the major surface comprising a first portion and a second portion, wherein the second portion is curved or faceted, and further wherein a first direction that is normal to the first portion of the major surface is not equal to a plurality of second directions that are normal to the second portion of the major surface, and the angle between the first direction and each of the second directions is in a range from about 10 degrees to about 50 degrees; and an optical coating disposed on at least the first portion and the second portion of the major surface, the optical coating forming an anti-reflective surface, wherein:

(a) the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test;

(b) the coated article exhibits a photopic average light reflectance of about 2% or less as measured at the anti-reflective surface at the first portion and the second portion of the substrate, wherein the single side maximum light reflectance of the first portion is measured at a first incident illumination angle relative to the first direction, wherein the first incident illumination angle comprises an angle in the range from about 0 degrees to about 45 degrees from the first direction, wherein the single side maximum light reflectance of the second portion is measured at two or more second incident illumination angles, each of the second incident illumination angles relative to a respective second direction of the plurality of second directions, wherein each of the second incident illumination angles comprises an angle in the range from about 0 degrees to about 45 degrees from the respective second direction, and further wherein the photopic average light reflectance at the first portion and second portion is measured over an optical wavelength regime in a range of from about 425 nm to about 950 nm;

(c) the first surface reflected color of the coated article at the first portion and the second portion of the major surface is b*<about 5, as measured by the reflectance color coordinates in the (L*, a*, b*) colorimetry system under an International Commission on Illumination D65 illuminant, wherein the reflected color at the first portion is measured at a first incident illumination angle relative to the first direction, wherein the first incident illumination angle comprises an angle in the range from about 0 degrees to about 90 degrees from the first direction, and wherein the reflected color at the second portion is measured at two or more second incident illumination angles, each of the second incident illumination angles relative to a respective second direction of the plurality of second directions, wherein each of the second incident illumination angles comprises an angle in a range from about 0 degrees to about 90 degrees from the respective second direction and the second illumination angles differ from one another by at least 10 degrees.

Embodiment 22. The coated article of embodiment 21, wherein the angle between the first direction and one of the second directions is in a range from about 10 degrees to about 20 degrees, and the angle between the first direction and another of the second directions is in a range from about 20 degrees to about 60 degrees.

Embodiment 23. The coated article of embodiment 22, wherein the angle between the first direction and one of the second directions is in a range from about 10 degrees to about 20 degrees, and the angle between the first direction and another of the second directions is in a range from about 40 degrees to about 60 degrees.

Embodiment 24. The coated article of any one of embodiments 21-23, wherein the optical coating comprises a first anti-reflective coating, a scratch-resistant layer over the first anti-reflective coating, and a second anti-reflective coating over the scratch-resistant layer which defines the anti-reflective surface, wherein the first anti-reflective coating comprises at least a low RI layer and a high RI layer, and the second anti-reflective coating comprises at least a low RI layer and a high RI layer.

Embodiment 25. The coated article of any one of embodiments 21-23, wherein the at least a low RI layer in each of the first and the second anti-reflective coatings comprises silicon oxide, wherein the at least a high RI layer in the first anti-reflective coating comprises silicon oxynitride, wherein the at least a high RI layer in the second anti-reflective coating comprises silicon nitride, and further wherein the scratch-resistant layer comprises silicon oxynitride.

Embodiment 26. The coated article of embodiment 24 or embodiment 25, wherein the optical coating comprises a capping layer over the second anti-reflective coating, the capping layer comprising a low RI material.

Embodiment 27. The coated article of any one of embodiments 24-26, wherein each adjacent low RI layer and high RI layer in each of the first and second anti-reflective coatings, respectively, define a period, N, and further wherein N is from 2 to 12.

Embodiment 28. The coated article of any one of embodiments 21-27, wherein the total thickness of the optical coating is from about 2 $\mu$m to about 4 and the combined total thickness of the first anti-reflective coating and the second anti-reflective coatings is from about 500 nm to about 1000 nm.

Embodiment 29. The coating article of any one of embodiments 21-28, wherein the thickness of the scratch-resistant layer is from about 200 nm to about 3000 nm.

Embodiment 30. A consumer electronic product, comprising:

a housing having a front surface, a back surface and side surfaces;

electrical components at least partially within the housing, the electrical components including at least a controller, a memory, and a display, the display at or adjacent the front surface of the housing; and a cover substrate disposed over the display, wherein at least one of a portion of the housing or the cover substrate comprises the coated article of embodiment 1.

Embodiment 31. A consumer electronic product, comprising:

a housing having a front surface, a back surface and side surfaces;

electrical components at least partially within the housing, the electrical components including at least a controller, a memory, and a display, the display at or adjacent the front surface of the housing; and a cover substrate disposed over the display, wherein at least one of a portion of the housing or the cover substrate comprises the coated article of embodiment 10.

Embodiment 32. A consumer electronic product, comprising:

a housing having a front surface, a back surface and side surfaces;

electrical components at least partially within the housing, the electrical components including at least a controller, a memory, and a display, the display at or adjacent the front surface of the housing; and a cover substrate disposed over the display, wherein at least one of a portion of the housing or the cover substrate comprises the coated article of embodiment 21.

Embodiment 33. The coated article of embodiment 4 or embodiment 5, wherein each adjacent low RI layer and high RI layer in each of the first and second anti-reflective coatings, respectively, define a period, N, and further wherein N is from 6 to 12, wherein the thickness of the scratch-resistant layer is from about 1000 nm to 3000 nm, wherein the optical coating further comprises a capping layer comprising $SiO_2$ over the second anti-reflective coating and a low RI layer comprising $SiO_2$ between the substrate and the first anti-reflective coating.

Embodiment 34. The coated article of embodiment 15 or embodiment 16, wherein each adjacent low RI layer and high RI layer in each of the first and second anti-reflective coatings, respectively, define a period, N, and further wherein N is from 6 to 12, wherein the thickness of the scratch-resistant layer is from about 1000 nm to 3000 nm, wherein the optical coating further comprises a capping layer comprising $SiO_2$ over the second anti-reflective coating and a low RI layer comprising $SiO_2$ between the substrate and the first anti-reflective coating.

Embodiment 35. The coated article of embodiment 24 or embodiment 25, wherein each adjacent low RI layer and high RI layer in each of the first and second anti-reflective coatings, respectively, define a period, N, and further wherein N is from 6 to 12, wherein the thickness of the scratch-resistant layer is from about 1000 nm to 3000 nm, wherein the optical coating further comprises a capping layer comprising $SiO_2$ over the second anti-reflective coating and a low RI layer comprising $SiO_2$ between the substrate and the first anti-reflective coating.

What is claimed is:

1. A coated article comprising:
a substrate having a major surface, the major surface comprising a first portion and a second portion, wherein the first portion is planar and the second portion is curved or faceted, and further wherein a first direction that is normal to the first portion of the major surface is not equal to a plurality of second directions that are normal to the second portion of the major surface, and the angle between the first direction and each of the second directions is in a range from about 20 degrees to about 60 degrees; and
an optical coating disposed on at least the first portion and the second portion of the major surface, the optical coating forming an anti-reflective surface, wherein:
the coated article exhibits at the first portion of the substrate and at the second portion of the substrate a hardness of about 8 GPa or greater at an indentation depth of about 100 nm or greater as measured on the anti-reflective surface by a Berkovich Indenter Hardness Test; and
wherein a physical thickness of the optical coating disposed on the second portion is 95% or less of a physical thickness of the optical coating disposed on the first portion, and further wherein at least one of:
(c1) the angle between the first direction and each of the second directions is in the range of from 30 degrees to 35 degrees and the physical thickness of the optical coating disposed on the second portion is 90% or greater of the physical thickness of the optical coating disposed on the first portion,
(c2) the angle between the first direction and each of the second directions is in the range of from 35 degrees to 45 degrees and the physical thickness of the optical coating disposed on the second portion is 85% or greater of the physical thickness of the optical coating disposed on the first portion, and
(c3) the angle between the first direction and each of the second directions is in the range of from 50 degrees to 60 degrees and the physical thickness of the optical coating disposed on the second portion is 70% or greater of the physical thickness of the optical coating disposed on the first portion.

2. The coated article of claim 1, wherein at least one of:
(c1) the angle between the first direction and each of the second directions is in the range of from 30 degrees to 35 degrees and the physical thickness of the optical coating disposed on the second portion is from 90% to 95% of the physical thickness of the optical coating disposed on the first portion,
(c2) the angle between the first direction and each of the second directions is in the range of from 35 degrees to 40 degrees and the physical thickness of the optical coating disposed on the second portion is from 85% to 90% of the physical thickness of the optical coating disposed on the first portion, and
(c3) the angle between the first direction and each of the second directions is in the range of from 50 degrees to 60 degrees and the physical thickness of the optical coating disposed on the second portion is from 70% to 80% of the physical thickness of the optical coating disposed on the first portion.

3. The coated article of claim 1, wherein the optical coating comprises a first anti-reflective coating, a scratch-resistant layer over the first anti-reflective coating, and a second anti-reflective coating over the scratch-resistant layer which defines the anti-reflective surface, wherein the first anti-reflective coating comprises at least a low RI (refractive index) layer and a high RI layer, and the second anti-reflective coating comprises at least a low RI layer and a high RI layer, wherein the at least high RI layer in the first anti-reflective coating comprises silicon oxynitride, wherein the at least at high RI layer in the second anti-reflective coating comprises silicon nitride, and further wherein the scratch-resistant layer comprises silicon oxynitride.

4. The coated article of claim 1, wherein the coated article exhibits at the first portion of the substrate and at the second portion of the substrate a hardness of about 11 GPa or greater at an indentation depth of about 100 nm or greater as measured on the anti-reflective surface by a Berkovich Indenter Hardness Test.

5. The coated article of claim 1, wherein the coated article exhibits a single side maximum light reflectance of about 8% or less as measured at the anti-reflective surface at the first portion and the second portion of the substrate, wherein the single side maximum light reflectance of the first portion is measured at a first incident illumination angle relative to the first direction, wherein the first incident illumination angle comprises an angle in the range from about 0 degrees to about 45 degrees from the first direction, wherein the single side maximum light reflectance of the second portion is measured at two or more second incident illumination angles, each of the second incident illumination angles relative to a respective second direction of the plurality of second directions, wherein each of the second incident illumination angles comprises an angle in the range from about 0 degrees to about 45 degrees from the respective second direction,
wherein the single side maximum light reflectance at the first portion is measured over an optical wavelength regime in a range of from about 425 nm to about 950 nm.

6. The coated article of claim 5, wherein the coated article exhibits a single side maximum light reflectance of about 3% or less as measured at the anti-reflective surface at the first portion and the second portion of the substrate.

7. The coated article of claim 1, wherein a first surface reflected color of the coated article at the first portion and the second portion of the major surface is b*<about 5, as measured by the reflectance color coordinates in the (L*, a*, b*) colorimetry system under an International Commission on Illumination D65 illuminant, wherein the reflected color at the first portion is measured at a first incident illumination angle relative to the first direction, wherein the first incident illumination angle comprises an angle in the range from about 0 degrees to about 90 degrees from the first direction, wherein the reflected color at the second portion is measured at two or more second incident illumination angles, each of the second incident illumination angles relative to a respective second direction of the plurality of second directions, wherein each of the second incident illumination angles comprises an angle in a range from about 0 degrees to about 90 degrees from the respective second direction and the second illumination angles differ from one another by at least 10 degrees.

8. The coated article of claim 7, wherein the first surface reflected color of the coated article at the first portion and the second portion of the major surface is b*<about 3, as measured by the reflectance color coordinates in the (L*, a*, b*) colorimetry system under an International Commission on Illumination D65 illuminant.

9. The coated article of claim 7, wherein the first surface reflected color of the coated article at the first portion and the second portion of the major surface is (a*+b*)<about 10, as measured by the reflectance color coordinates in the (L*, a*, b*) colorimetry system under an International Commission on Illumination D65 illuminant.

10. The coated article of claim 7, wherein the first surface reflected color of the coated article at the first portion and the second portion of the major surface is b*<about 5, wherein the reflected color at the first portion is measured at a plurality of first incident illumination angles relative to the first direction, the plurality of first incident illumination angles comprising an illumination angle from 0 degrees to 20 degrees and an illumination angle from 55 degrees to 85 degrees, and further wherein the reflected color at the second portion is measured at a plurality of second incident illumination angles relative to the second directions, the plurality of second incident illumination angles comprising an illumination angle from 0 degrees to 20 degrees and an illumination angle from 55 degrees to 85 degrees.

* * * * *